(12) United States Patent
Shimomae et al.

(10) Patent No.: US 7,494,002 B2
(45) Date of Patent: Feb. 24, 2009

(54) CONVEYANCE APPARATUS, AND WEIGHING AND PACKAGING SYSTEM PROVIDED THEREWITH

(75) Inventors: Yoshinobu Shimomae, Ritto (JP); Seisaku Iwasa, Ritto (JP); Takashi Kimura, Ritto (JP); Yuji Yokota, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 238 days.

(21) Appl. No.: 11/560,364

(22) Filed: Nov. 16, 2006

(65) Prior Publication Data

US 2007/0256909 A1 Nov. 8, 2007

Related U.S. Application Data

(60) Provisional application No. 60/823,253, filed on Aug. 23, 2006.

(30) Foreign Application Priority Data

Nov. 17, 2005 (JP) .............................. 2005-332319
Nov. 21, 2005 (JP) .............................. 2005-335658

(51) Int. Cl.
   *B65G 47/24* (2006.01)
(52) U.S. Cl. ............... 198/431; 198/377.04; 414/798.2; 414/798.5
(58) Field of Classification Search ... 198/377.01–377.1, 198/431; 414/798.2, 798.5
   See application file for complete search history.

(56) References Cited

U.S. PATENT DOCUMENTS

| | | | | |
|---|---|---|---|---|
| 875,009 A * | 12/1907 | Stiebel | .................. | 198/377.02 |
| 1,854,453 A * | 4/1932 | Cramer | .................. | 198/377.06 |
| 2,642,212 A * | 6/1953 | Currivan | ...................... | 53/252 |
| 4,394,899 A * | 7/1983 | Fluck | .......................... | 198/408 |
| 5,460,481 A | 10/1995 | Prakken | | |
| 5,941,365 A * | 8/1999 | Ritter | .......................... | 198/380 |
| 6,079,939 A * | 6/2000 | Smets | ..................... | 414/798.5 |
| 6,953,113 B2 * | 10/2005 | Iwasa et al. | ............... | 198/419.1 |
| 7,168,550 B2 * | 1/2007 | Schroder | ............... | 198/377.03 |

FOREIGN PATENT DOCUMENTS

| JP | S49-58567 A | 6/1974 |
|---|---|---|
| JP | H06-507598 A | 9/1994 |
| JP | 9-104526 A | 4/1997 |
| JP | H09-104526 A | 4/1997 |
| JP | 2003-2523 A | 1/2003 |
| JP | 2003-212338 A | 7/2003 |

* cited by examiner

*Primary Examiner*—Mark A Deuble
(74) *Attorney, Agent, or Firm*—Global IP Counselors, LLP

(57) ABSTRACT

A conveyance apparatus is disclosed which includes a delivery device that delivers an article supplied in a horizontal position from a conveyor to an accumulation and conveyance apparatus, and delivery tables which receive the article and move the same to a standing position by rotating to the standing position, and which also deliver the article while orderly placing the same from front to rear in a bucket by moving forward; and a drive unit comprising a synchronous pulley, a synchronous timing belt, and a motor, which rotate and move the delivery tables in synchronization with the movement of the bucket. In addition, a rotation shaft, which is a rotation support point of the delivery table, is located above a lower end portion of the delivery table in the standing position.

32 Claims, 64 Drawing Sheets

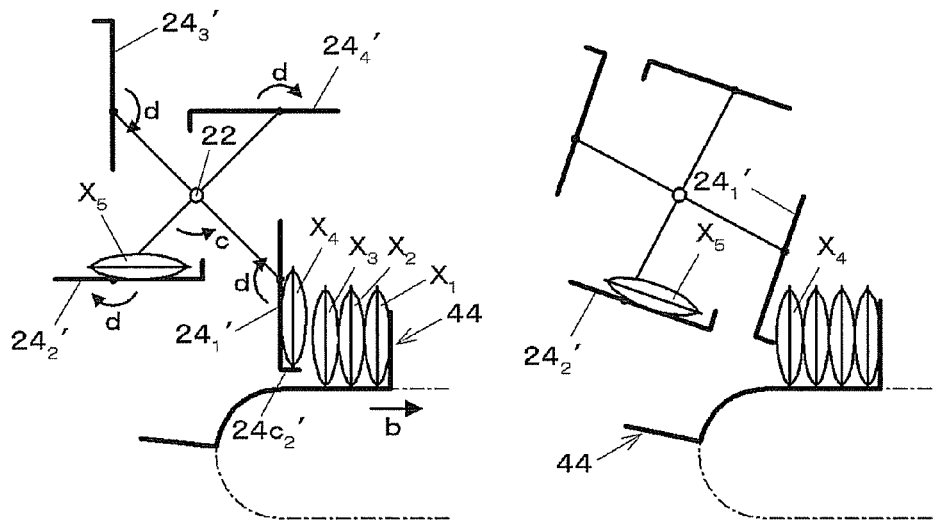
Fig. 14A
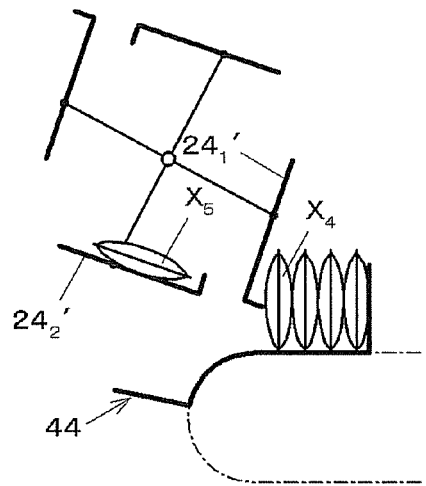
Fig. 14B
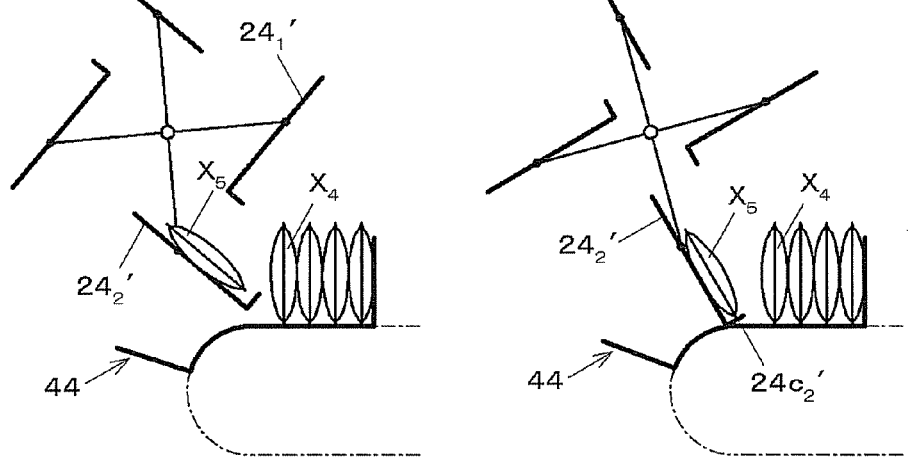
Fig. 14C
Fig. 14D
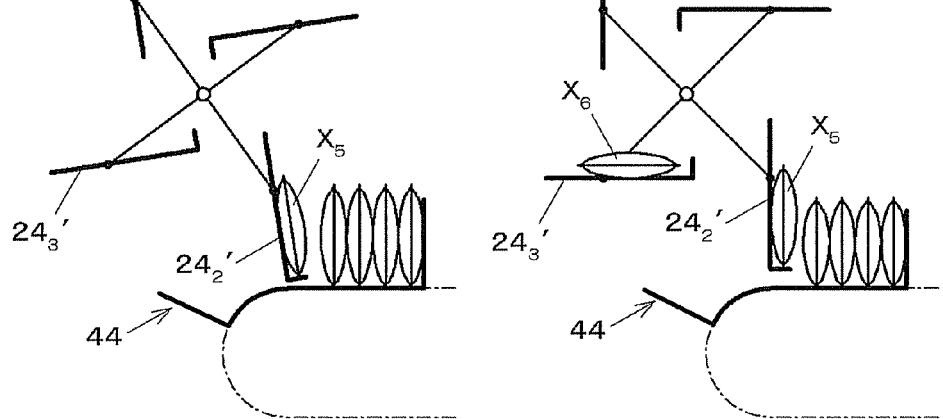
Fig. 14E
Fig. 14F

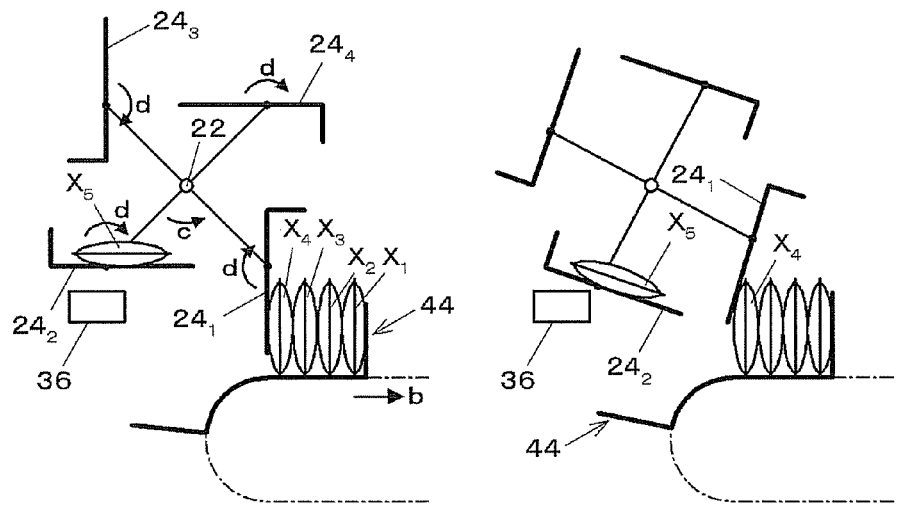
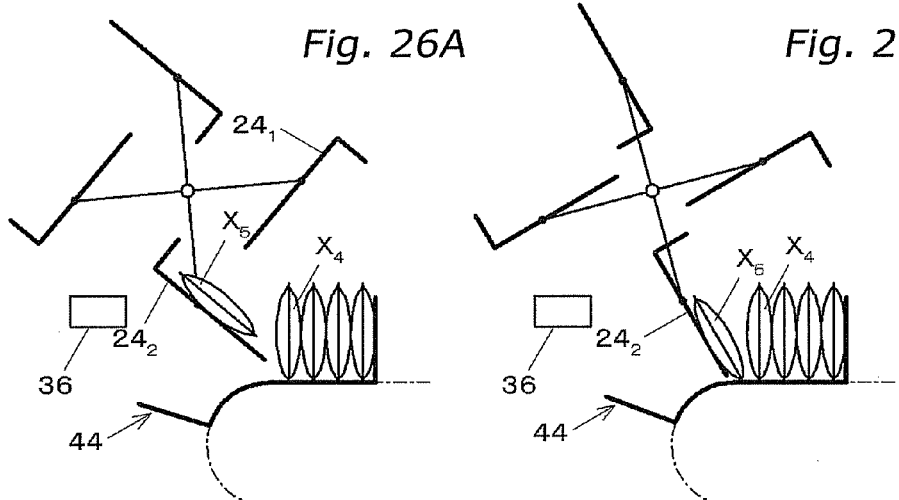
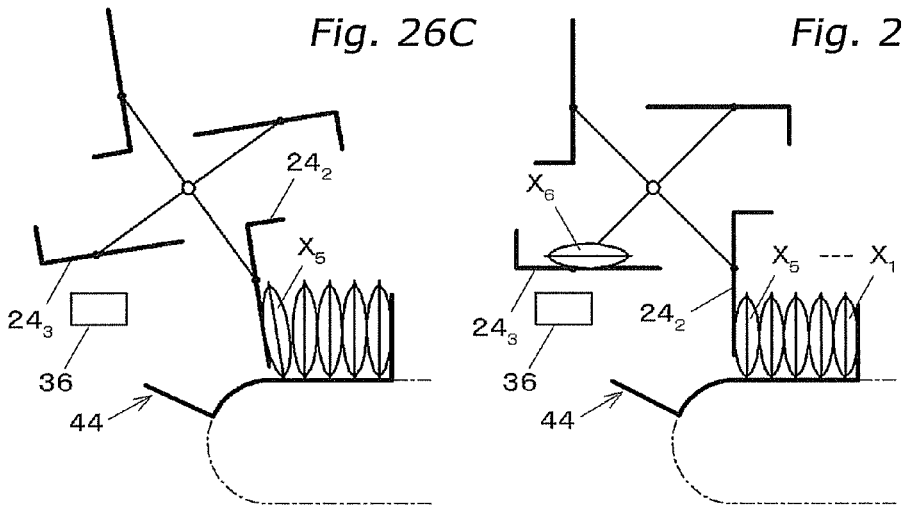
Fig. 26A  Fig. 26B
Fig. 26C  Fig. 26D
Fig. 26E  Fig. 26F

CONVEYANCE APPARATUS, AND WEIGHING AND PACKAGING SYSTEM PROVIDED THEREWITH

CROSS-REFERENCE TO RELATED APPLICATIONS

This application claims priority to U.S. Provisional Patent Application No. 60/823,253, filed on Aug. 23, 2006, and Japan Patent Application Nos. 2005-332319 and 2005-335658. The entire disclosures of U.S. Provisional Patent Application No. 60/823,253 and Japan Patent Application Nos. 2005-332319 and 2005-335658 are hereby incorporated herein by reference.

BACKGROUND OF THE INVENTION

1. Field of the Invention

The present invention relates to the technical field of conveying articles, and more particularly to a conveyance apparatus configured to receive relatively flat articles at a receiving point, accumulate a predetermined number of the articles in a standing position, and deliver the articles to a discharging point.

2. Background Information

Conventionally, in some cases, a predetermined number of packaged articles such as snack foods are accumulated in a predetermined position, and then packed in cardboard boxes or large bags to be shipped. Further, in recent years, a need has developed to improve productivity by automating the accumulation process.

In addressing this need, for example, there are provided conveyance apparatuses disclosed in Japanese Patent Application Publication No. 2003-212338 and Japanese Patent Application Publication No. 09-104526. First, as shown in FIG. 16, the conveyance apparatus disclosed in Japanese Patent Application Publication No. 2003-212338 includes two buckets 110, 110 for holding a plurality of flat articles X . . . X received at a receiving point P1 in a state of being accumulated in a front-to-back direction; four-looped endless chains 120 . . . 120 for circularly conveying the buckets 110, 110 from the receiving point P1 through a discharging point P2; and a position changing device 130 for changing the position of externally supplied articles X and for delivering the same to the buckets 110, 110.

In this case, the bucket 110 comprises a plurality of base plates 111' . . . 111' vertically disposed over the pair of endless chains 120, 120. Of these base plates 111' . . . 111', each base plate 111' at the foremost end and the base plate 111' at the rearmost end includes a standing portion (not shown), and a predetermined number of articles X . . . X are held between the standing portions. In addition, the position changing device 130 comprises a first conveyor 131 having a vertical running surface; a second conveyor 132 which is disposed on one side of the first conveyor 131 and twisted such that the running surface thereof is horizontal at the upstream end and vertical at the downstream end; a third conveyor 133 having a horizontal running surface, which is deposed below the first and the second conveyors 131, 132 and which extends to the receiving point P1; and a pair of fourth and fifth conveyors 134, 135 each having a vertical running surface, which are respectively connected to the downstream ends of the first and second conveyors 131, 132, and which are disposed above the third conveyor 133.

Accordingly, the articles X are moved from a horizontal position to a standing position by the position changing device 130 while being conveyed in the direction shown by the arrow. Then, each article X is delivered one by one to the bucket 110 at the receiving point P1. When the number of the articles X delivered reaches a predetermined number, the bucket 110 that holds these articles X so as to be accumulated in a front-to-rear direction is conveyed to the discharging point P2 as shown by the arrow.

Next, as shown in FIG. 17, the conveyance apparatus disclosed in Japanese Patent Application Publication No. 09-104526 includes a holding device 210 that holds a plurality of flat articles X . . . X received at the receiving point P1 so as to be accumulated in a front-to-rear direction; a pusher 220 that transfers the articles X . . . X held by the holding device 210 to a discharging point (not shown) as shown by the arrow; and a delivery device 230 that delivers the articles X supplied from the upstream side in the horizontal position to the holding device 210.

In this case, the holding device 210 includes round bar-shaped guide rails 211', 211' disposed at left and right sides in the conveying direction in order to hold the articles X in the standing position by engaging an upper ear of each article X in the standing position, and a table 212' which supports the articles X from below. In addition, the delivery device 230 includes a plurality of delivery tables 231 . . . 231 disposed on the running surface, which move the articles X from the horizontal position to the standing position, and also slightly move the articles X in the arrow direction, by rotating and horizontally moving along the trajectory shown by the dashed line.

Accordingly, the supplied articles X are moved from the horizontal position to the standing position by the delivery device 230 at the receiving point P1. Then each article X is delivered one by one to the holding device 210. The articles X are supported by the guide rails 211', 211' and the table 212' of the holding device 210. When a predetermined number of articles X are accumulated, the articles X are conveyed to the discharging point in close contact with each other by being pushed from behind by the pusher 220.

With the conveyance apparatus described in Japanese Patent Application Publication No. 2003-212338, the relatively long and large position changing device 130 that moves the articles X from the horizontal position to the standing position in advance is needed. Consequently, the entire apparatus becomes larger, which will be a problem when cost and/or installation space is limited. In addition, on the downstream side of the position changing device 130, the articles X are sandwiched between the pair of fourth and fifth conveyors 134, 135, whose running surfaces are vertical, so that the articles X will be in the standing position. However, for example, when the thicknesses of packaged articles X having the same contents vary in each packaged article X, or when the frictional properties and flexibility of the packaging materials of the packaged articles X are different in each packaged article X, it may not be possible to stably maintain the standing position of the articles X.

On the other hand, the conveyance apparatus according to Japanese Patent Application Publication No. 09-104526 receives the articles X in the horizontal position at the delivery device 230 via the delivery table 231, and then moves the articles X from the horizontal position to the standing position by means of the rotation of the delivery table 231. Therefore, unlike the conveyance apparatus described in Japanese Patent Application Publication No. 2003-212338, problems such as an increased size of the conveyance apparatus or the instability of the position of the articles X do not exist. However, as shown in FIG. 17, when the position of each article X is changed, the delivery table 231 largely rotates about a mounting base on the running surface as a rotation support point, so that the centrifugal force F' acting on the articles X will be large, which may cause a problem in which the articles X jump off of the delivery table 231. This problem becomes apparent when the accumulation process is accelerated, i.e., the rotation of the delivery table 231 is accelerated in order to reduce the interval between the delivery of the articles X to the holding device 210.

In view of the above, it will be apparent to those skilled in the art from this disclosure that there exists a need for an improved conveyance apparatus in which the accumulation process can be accelerated when a plurality of relatively flat articles received at a receiving point are conveyed to the discharging point, with the articles being held so as to be accumulated in a front-to-rear direction in the standing position. This invention addresses this need in the art as well as other needs, which will become apparent to those skilled in the art from this disclosure.

SUMMARY OF THE INVENTION

A conveyance apparatus according to a first aspect of the present invention is a conveyance apparatus that comprises a holding unit; a conveying unit; and a delivery unit. The holding unit holds a plurality of articles received at a predetermined receiving point so as to be accumulated in a front-to-rear direction. The conveying unit transfers the holding unit from the receiving point through a discharging point. The delivery unit delivers externally supplied articles to the holding unit at the receiving point. Then, the delivery unit sequentially receives the articles at a predetermined receiving position, and places the articles in a standing position by means of rotation. Further, the delivery unit includes one or more delivery tables and a drive unit. Each delivery table delivers the articles to the holding unit by moving forward, while orderly placing the articles from front to back on the holding unit. The drive unit rotates and moves the delivery table forward in synchronization with the movement of the holding unit. In addition, the rotation support point of the delivery table is located above a lower end portion of the delivery table in the standing position.

Note that the above-described predetermined receiving position refers to, for example, a horizontal position and a position slightly inclined in a rotational direction from the horizontal position.

According to the conveyance apparatus of the first aspect of the present invention, each delivery table is moved to the standing position by the drive unit when each delivery table receives a flat article from the upstream side. Then, the drive unit causes each delivery table to deliver the received article to the holding unit and to simultaneously orderly place the articles from front to rear on the holding unit, so that the articles are held by the holding unit and are accumulated thereon in a front-to-rear direction in the standing position. In addition, the drive unit causes each delivery table to operate in synchronization with the operation of the holding unit, so that the accumulation process will be stable. Therefore, unlike conventional apparatuses, the present conveyance apparatus does not need to be additionally provided with a relatively long and large position changing device configured to move the articles to the standing position, therefore preventing the apparatus from increasing in size as a whole.

Further, unlike conventional position changing devices, the present position changing device does not sandwich the articles at the downstream end between a pair of transport conveyors each having a vertical running surface. Therefore, for example, even when the thicknesses of packaged articles having the same contents vary in each packaged article, or even when the frictional properties and flexibility of the packaging materials of the packaged articles are different in each packaged article, the articles can be moved to the standing position in a stable manner regardless of these differences.

Further, as shown in FIG. 18, a rotation support point A1 is located above a lower end portion A2 of a delivery table A in the standing position. Therefore, for example, when the delivery table A rotates in the direction of the arrow from the horizontal position shown by a solid line to the standing position shown by a two-dot chain line, the rotation radius R is smaller than the rotation radius R' that is determined when the rotation support point is located at the lower end portion A2 of the delivery table A, as is conventional. If the rotation is performed at a constant angular velocity, the centrifugal force F that acts on the articles X will be smaller than the centrifugal force F' that is generated when the rotation support point is located at the lower end portion A2. Consequently, the article X will be prevented from jumping out of the delivery table A at the time of position change, and therefore the accumulation process can be accelerated. Note that the reference numeral G in the figure shows the position of the center of gravity of the article X.

A conveyance apparatus according to a second aspect of the present invention is the conveyance apparatus according to the first aspect of the present invention, in which the drive unit is configured to rotate the one or more delivery tables and move the one or more delivery tables forward with a single drive source.

The conveying apparatus according to the second aspect of the present invention achieves the function of rotating the delivery table and the function of moving the delivery table forward with a single drive source. Therefore, it will be easy to conduct both operations in synchronization with each other, and the structure of the apparatus will be simplified.

A conveyance apparatus according to a third aspect of the present invention is the conveyance apparatus according to the first aspect of the present invention, in which the rotation support point is arranged substantially in the center of each delivery table.

According to the third aspect of the present invention, the rotation support point of each delivery table is arranged substantially in the center of each delivery table. Consequently, as easily understood from the above-mentioned FIG. 18, the rotation radius thereof will be the shortest, i.e., the centrifugal force acting on the article will be the smallest, therefore demonstrating the preferable effect of preventing the article from jumping out of the delivery table.

A conveyance apparatus according to a fourth aspect of the present invention is the conveyance apparatus according to the first aspect of the present invention, in which the rotation support point is located closer to the lower end portion of each delivery table when in the standing position.

According to the conveyance apparatus of the fourth aspect of the present invention, as shown in FIG. 19, the rotation support point A1 of the delivery table A is located closer to the lower end portion of the delivery table A when in the standing position (the length L1 is shorter than the length L2). Accordingly, for example, when the delivery table A is configured to rotate about the rotation support point A1 in a clockwise direction in order to change its position and to simultaneously move around another rotation support point B in a counterclockwise direction so as to move forward, the delivery table A will move within a narrow longitudinal range $H_L$ around the rotation support point B as shown by the bold two-dot chain line, which will therefore be advantageous in terms of installation space. Note that a longitudinal movement range $H_O$ of the delivery table A when the rotation support point A1 is located in substantially the center of the delivery table A (the length L1 is substantially equal to the length L2) is greater than the above-described longitudinal movement range $H_L$. A conveyance apparatus according to a fifth aspect of the present invention is the conveyance apparatus according to the first aspect of the present invention, in which the rotation support point is located closer to an upper end portion of each delivery table when in the standing position.

According to the conveyance apparatus of the fifth aspect of the present invention, as shown in FIG. 20, the rotation support point A1 of the delivery table A is located closer to the upper end portion of the delivery table A when in the standing position. Accordingly, for example, when the delivery table A rotates in the direction of the arrow from the horizontal position shown by the solid line to the standing position shown by the two-dot chain line, the centrifugal force F will act on the article X in a direction favorable for moving the article X forward and to the standing position. In other words, this structure is preferable to the prompt delivery of the article X to the holding unit, when the holding unit is located forward of and below the delivery table A that has received the article X from the upstream side. Note that the reference numeral G in the figure shows the position of the center of gravity of the article X.

A conveyance apparatus according to a sixth aspect of the present invention is the conveyance apparatus according to the first aspect of the present invention, in which the conveyance apparatus is configured such that the direction in which the articles are supplied to the delivery unit coincides with the direction in which the articles are delivered from the delivery unit to the holding unit. In addition, the conveyance apparatus is further provided with a movement control wall on the forward end portion of each delivery table, which prevents the articles from moving forward on each delivery table.

According to the conveyance apparatus of the sixth aspect of the present invention, when the conveyance apparatus is configured such that the direction in which the articles are supplied to each delivery unit coincides with the direction in which the articles are delivered from each delivery unit to the holding unit, the movement control wall is provided at the forward end portion of the delivery table, and prevents the articles from moving forward on each delivery table. Consequently, the externally supplied articles will be reliably received and held by the delivery table.

A conveyance apparatus according to a seventh aspect of the present invention is the conveyance apparatus according to the first aspect of the present invention, in which the conveyance apparatus is configured such that the direction in which the articles are supplied to the delivery unit intersects with the direction in which the articles are delivered from the delivery unit to the holding unit. In addition, the conveyance apparatus further comprises with a jump-out prevention wall arranged on a rear end portion of the delivery table, which prevents the articles from jumping out of each delivery table.

According to the conveyance apparatus of the seventh aspect of the present invention, when the conveyance apparatus is configured such that the direction in which the articles are supplied to the delivery unit intersects with the direction in which the articles are delivered from the delivery unit to the holding unit, the jump-out prevention wall will be provided at the rear end portion of each delivery table in the receiving position, which prevents the articles from jumping out of the delivery table. Consequently, this jump-out prevention wall reliably prevents the articles from jumping out of the delivery table, even when there is concern that an article may jump out of a delivery table because of the position of the article supplied to the delivery table.

A conveyance apparatus according to an eighth aspect of the present invention is the conveyance apparatus according to the first aspect of the present invention, in which the holding unit comprises a forward end holding member at the forward end thereof, the forward end holding member configured to hold the articles at the forward end thereof.

According to the conveyance apparatus of the eighth aspect of the present invention, the articles that are delivered to the holding unit and sequentially placed on the holding unit by each delivery table will be reliably received by the forward end holding member, so that the articles will be stably held in the standing position on the holding unit.

A conveyance apparatus according to a ninth aspect of the present invention is the conveyance apparatus according to the first aspect of the present invention, in which the holding unit comprises a plurality of individual holding members configured to hold the articles individually, the individual holding members arranged at intervals that are substantially equal to the thickness of each article, and configured so as to not interfere with each delivery table when delivering an article to the holding unit.

According to the conveyance apparatus of the ninth aspect of the present invention, each article is further stably held in the standing position on the holding unit by an individual holding member that holds each article, and thus the articles will be prevented from tipping over like dominos when in the standing position. Note that a configuration of the individual holding members that does not interfere with each delivery table is, for example, one in which the individual holding members are short, so that each delivery table and holding member do not interfere with each other, or a configuration in which each delivery table and holding member intersect with each other.

A conveyance apparatus according to a tenth aspect of the present invention is the conveyance apparatus according to the first aspect of the present invention, in which the receiving surface of each delivery table on which an article is received comprises an open portion. In addition, the conveyance apparatus further comprises a suction unit that holds an article received on the receiving surface by means of suction via the open portion.

According to the conveyance apparatus of the tenth aspect of the present invention, each delivery table rotates toward the standing position when each delivery table receives an externally supplied article at the receiving point, and will then move the article to the standing position and deliver the article to the holding unit.

In this case, the article received by each delivery table is held on the receiving surface by means of suction from the suction unit, consequently preventing the article from rotating, slipping, or jumping on the receiving surface. Therefore, the article will be received in a stable position at the receiving point, which as a result will achieve a conveyance apparatus in which the accumulation position of the articles will not be disturbed.

A conveyance apparatus according to an eleventh aspect of the present invention is the conveyance apparatus according to the tenth aspect of the present invention, in which the suction unit comprises a suction source and a suction chamber connected to the suction source. The suction chamber is arranged below each delivery table at the receiving point such that the suction chamber does not interfere with the movement of the delivery table. The suction chamber comprises a suction port that faces the open portion in the receiving surface of each delivery table.

According to the conveyance apparatus of the eleventh aspect of the present invention, the suction chamber of the suction unit can be fixed at a position that is below the delivery table at the receiving point such that the suction chamber does not interfere with the movement trajectory of the delivery table. Consequently, the holding and sucking operation can be achieved with a relatively simple structure.

A conveyance apparatus according to a twelfth aspect of the present invention is the conveyance apparatus according to the eleventh aspect of the present invention, in which the suction source generates a constant suction force in the suction chamber.

According to the conveyance apparatus of the twelfth aspect of the present invention, the suction source generates a constant suction force in the suction chamber, so that control of the suction is unnecessary. When a delivery table is positioned at the receiving point and receives an article, the suction power of the suction chamber will be applied to the receiving surface and the article will be held by suction. On the other hand, the further away the delivery table moves from the receiving point, the less suction power will be applied to the receiving surface, which will release the article from being held by suction. Consequently, the delivery of the article from a delivery table to the holding unit will be smoothly conducted.

A conveyance apparatus according to a thirteenth aspect of the present invention is the conveyance apparatus according to the eleventh aspect of the present invention, in which the suction port of the suction chamber is arranged at the end of the pathway in which the articles are supplied to the receiving surface of each delivery table.

According to the conveyance apparatus of thirteenth aspect of the present invention, the suction port of the suction chamber is arranged on the rear side of the receiving surface of each delivery table in the direction in which an article is supplied thereto. Usually, when the suction port of the suction chamber is arranged on the front side of the receiving surface of each delivery table in the direction in which an article is supplied thereto, an article, especially a light article, may not be held at an appropriate position on the receiving surface because such an article may be stopped at the front side of the receiving surface of each delivery table. However, with the structure of the present conveyance apparatus, the supplied article will be stopped and held by suction only when the article reaches the rear side of the receiving surface, therefore the above-described problem will be effectively eliminated.

A conveyance apparatus according to a fourteenth aspect of the present invention is the conveyance apparatus according to the eleventh aspect of the present invention, further comprising a control unit configured to control the timing at which the suction unit is applied and released.

According to the conveyance apparatus of the fourteenth aspect of the present invention, the timing at which the suction is applied and released will be precisely and accurately controlled by providing the control unit to the conveyance apparatus.

A conveyance apparatus according to a fifteenth aspect of the present invention is the conveyance apparatus according to the tenth aspect of the present invention, in which the suction unit comprises a suction source and a suction chamber connected to the suction source. The suction chamber is attached to the underside of each delivery table, and the suction chamber comprises a suction port that faces the open portion in the receiving surface of each delivery table.

According to the conveyance apparatus of the fifteenth aspect of the present invention, the suction chamber of the suction unit is attached to the receiving surface of each delivery table, so that the articles will be more reliably held by suction on the receiving surface of each delivery table.

A conveyance apparatus according to a sixteenth aspect of the present invention is the conveyance apparatus according to the fifteenth aspect of the present invention, in which the suction unit further comprises a suction passage that connects the suction source to the suction chamber, and a passage opening and closing mechanism configured to regulate communication between the suction source and the suction chamber.

According to the conveyance apparatus of the sixteenth aspect of the present invention, the passage opening and closing mechanism that regulates communication between the suction source and the suction chamber is provided midway along the suction passage that connects the suction source with the suction chamber, so as to apply and release the suction with a relatively simple mechanical structure.

A conveyance apparatus according to a seventeenth aspect of the present invention is the conveyance apparatus according to the fifteenth aspect of the present invention, further comprising a control unit configured to control the timing at which the suction unit applies and releases the suction.

According to the conveyance apparatus of the seventeenth aspect of the present invention, the timing at which the suction unit applies and releases the suction will be precisely and accurately controlled as a result of providing the control unit to the conveyance apparatus.

A conveyance apparatus according to an eighteenth aspect of the present invention is the conveyance apparatus according to the eleventh aspect of the present invention, in which the suction port extends over substantially the entire surface of the side of the suction chamber facing the underside of each delivery table.

According to the conveyance apparatus of the eighteenth aspect of the present invention, the suction port extends over substantially the entire surface of the side of the suction chamber facing the underside of each delivery table, so that the suction will be applied to the article over a wide range. As a result, the articles will be more reliably held by suction.

A conveyance apparatus according to a nineteenth aspect of the present invention is the conveyance apparatus according to the tenth aspect of the present invention, in which the receiving surface of each delivery table is formed into a concave shape.

According to the conveyance apparatus of the nineteenth aspect of the present invention, the receiving surface of each delivery table is formed into a concave shape. Usually, particularly when the article is a packaged article that is inflated in the center and when the receiving surface of each delivery table is flat, the contact area between the delivery table and the article received by the delivery table is small, and therefore the position of the article on the delivery table may be unstable. However, with the structure of the present conveyance apparatus, there will be a larger contact area between the article and the delivery table. As a result, the article will be favorably held on the delivery table, and the above-described problem will be reliably eliminated.

A weighing and packaging system according to a twentieth aspect of the present invention comprises the conveyance apparatus according to the tenth aspect of the present invention, wherein the weighing and packaging system is configured to weigh and package a material in order to form an article, and pack a predetermined number of accumulated articles into a container. The conveyance apparatus receives articles at the receiving point, and conveys them to the discharging point for packing.

According to the conveyance apparatus of the twentieth aspect of the present invention, it is possible to provide a weighing and packaging system that can achieve the same effect as obtained with the conveyance apparatus according to each aspect of the present invention.

A conveyance apparatus according to a twenty-first aspect of the present invention is the conveyance apparatus according to the first aspect of the present invention, in which each delivery table is configured such that the position thereof at which an article is received is slightly inclined from the horizontal position in a rotational direction.

According to the conveyance apparatus of the twenty-first aspect of the present invention, each delivery table rotates toward the standing position once each delivery table receives an externally supplied flat article at the receiving point, and will then move the article to the standing position. Then, each delivery table sequentially delivers the received article to the holding unit, and sequentially places the articles on the holding unit. Therefore, the articles are held in the standing position by the holding unit. Therefore, unlike conventional apparatuses, the conveyance apparatus does not need to be provided with a relatively long and large position changing device that moves the articles from the horizontal position to the standing position, therefore preventing the overall size of the apparatus from increasing.

Further, unlike conventional position changing devices, the present position changing device does not sandwich the articles at the downstream end between a pair of transport conveyors each having a vertical running surface in order to move the articles to the standing position. Therefore, for example, even when the thicknesses of packaged articles having the same contents vary in each packaged article, or even when frictional properties and flexibility of the packaging materials of the packaged articles are different in each packaged article, the articles can be moved to the standing position in a stable manner regardless of these differences.

Further, as shown in FIG. 53, when receiving a supplied article X, the delivery table A is in a position slightly inclined from the horizontal position in the rotational direction, i.e., in a position inclined by the angle α2 in the figure, and then the delivery table A rotates. Accordingly, as compared to the case where the receiving table receives the article X in the horizontal position and rotates, the rotation angle from the horizontal position to the standing position shown by the two-dot chain line is small in the present apparatus. As a result, the article X can be instantaneously moved to the standing position, which results in acceleration of the accumulation process.

Note that since the rotation angle is small, the centrifugal force prevents the article X from being thrown out from the delivery table A, which also results in acceleration of the accumulation process.

A conveyance apparatus according to a twenty-second aspect of the present invention is the conveyance apparatus according to the twenty-first aspect of the present invention, in which the rotation support point of the delivery table is located inward from a front end portion of the delivery table in the receiving position.

According to the conveyance apparatus of the twenty-second aspect of the present invention, as shown in FIG. 53, the rotation support point A1 of the delivery table A is located inward from the front end portion A2 of the delivery table A in the above-described receiving position. Consequently, when the delivery table A that has received the article X rotates, the length of rotation is shortened compared to the case where the rotation support point is located at the front end portion A2 of the delivery table A. Thus, a small driving force will suffice this purpose, and the rotation of the present apparatus will be faster when the driving force is the same between the conventional and present apparatuses, which further results in acceleration of the accumulation process.

A conveyance apparatus according to a twenty-third aspect of the present invention is the conveyance apparatus according to the twenty-first aspect of the present invention, in which the conveyance apparatus further comprises a carry-in unit configured to deliver the articles to the receiving position of each delivery table, and a conveying surface of the delivery unit is inclined so as to substantially coincide with the receiving position of each delivery table.

According to the conveyance apparatus of the twenty-third aspect of the present invention, the conveying surface of the carry-in unit on the article supply side is inclined so as to substantially coincide with the receiving surface of the delivery table on the article receiving side, so that the delivery and reception of the articles between the carry-in unit and the delivery table will be smoothly conducted. Consequently, the articles will be supplied onto each delivery table in a stable manner. As a result, the position of each article on the holding unit will be aligned, and therefore the downstream discharge process will be smoothly conducted.

A conveyance apparatus according to a twenty-fourth aspect of the present invention is the conveyance apparatus according to the twenty-first aspect of the present invention, further comprising a guide mechanism for aligning upper portions of the articles in the standing position to be delivered from the delivery unit to the holding unit. The guide mechanism includes a pushing member configured to push the articles from above, and a drive unit configured to move the pushing member up and down. The drive unit operates to move the pushing member up in synchronization with the delivery of each article before delivery to the holding unit, so that the pushing member will be moved to a position that does not disturb the delivery of each article, and the drive unit operates to move the pushing member down after each article is delivered.

According to the conveyance apparatus of the twenty-fourth aspect of the present invention, a guide mechanism for aligning the upper portions of the articles in the standing position is provided. In the case of packaged articles that are inflated in the center, usually, when the delivery unit receives such articles, moves the same to the standing position, and delivers the same to the holding unit while orderly placing the same on the holding unit, the heights of the articles delivered to the holding unit may vary along with the variation in the positions of the articles on the delivery table, or an article sandwiched between the articles may be pushed upward, causing a disturbance of the positions of the articles on the holding unit. Therefore, the downstream discharge process may not be smoothly conducted. However, with the structure of the present conveyance apparatus, the above-described problem will be reliably eliminated.

Further, the drive unit of the guide mechanism operates to move the pushing member up in synchronization with the delivery of the article from the delivery unit to the holding unit before each article is delivered, so that the pushing member will be moved to a position that does not disturb the delivery of the articles. The drive unit operates to move the pushing member down after each article is delivered, so that the pushing member will push the articles from above. Consequently, it will be possible to prevent interference between the pushing member and each delivery table, which may occur when the pushing member is fixedly arranged, and prevent interference between the pushing member and articles whose height vary and which are delivered to the holding unit, and therefore a smooth delivery of the articles will be achieved.

A conveyance apparatus according to a twenty-fifth aspect of the present invention is the conveyance apparatus according to the twenty-first aspect of the present invention, in which the holding unit further comprises a rear end holding member arranged on a rear end thereof. The rear end holding member is configured so as to not interfere with each delivery table when each delivery table delivers an article to the holding unit.

According to the conveyance apparatus of the twenty-fifth aspect of the present invention, the rearmost article held in the holding unit will be held by the rear end holding member. Consequently, even an article that is particularly flat and difficult to stand on its own will stably maintain its position while being conveyed. Further, since the rear end holding member and each delivery table will not interfere with each other, the rear end holding member and each delivery table can be operated in an intersecting manner, which will enable acceleration of the accumulation process.

A conveyance apparatus according to a twenty-sixth aspect of the present invention is the conveyance apparatus according to the twenty-first aspect of the present invention, in which the receiving surface of each delivery table is formed in a concave shape.

According to the conveyance apparatus of the twenty-sixth aspect of the present invention, the receiving surface of the delivery table is formed in a concave shape. Usually, particularly when an article is the above-described packaged article that is inflated in the center and when the receiving surface of the delivery table is flat, the contact area between the delivery table and the article received by the delivery table is small, and therefore the articles on the delivery table may be dislocated or rotated. In other words, the articles on each delivery table will have an irregular position and orientation, so that the articles may not be delivered in an appropriate state to the holding unit, and therefore a disturbance in the positions of the accumulated articles may occur. Even in such a case, in the present conveyance apparatus, since the receiving surface of each delivery table is formed in a concave shape, there will be a large contact area between the article and the delivery tables. As a result, the articles will be favorably gripped on the delivery tables, so that the above-described problem will be reliably eliminated.

A conveyance apparatus according to a twenty-seventh aspect of the present invention is the conveyance apparatus according to the first aspect of the present invention, in which the conveying surface of the conveying unit is inclined in the width direction. In addition, the conveyance apparatus further comprises a guide member arranged on a lower side of the inclined conveying surface, the guide member being configured to contact and guide a lateral portion of the articles held by the holding unit to be conveyed by the conveying unit.

According to the conveyance apparatus of the twenty-seventh aspect of the present invention, since the conveying surface of the conveying unit is inclined in the width direction, the articles moved to the standing position via the delivery unit, and delivered to the holding unit that is transferred by the conveying unit, will move to the lower side of the conveying surface, and lateral portions of the articles will come into contact with the guide member. As a result, the position of a lateral portion of each article will be aligned on the holding unit. In other words, the articles will be conveyed in a stable manner without disturbance in the arrangement thereof, and therefore the downstream discharge process will be smoothly conducted.

A conveyance apparatus according to a twenty-eighth aspect of the present invention is the conveyance apparatus according to the twenty-seventh aspect of the present invention, in which the conveying surface of the conveying unit is inclined downward in the downstream direction.

According to the conveyance apparatus of the twenty-eighth aspect of the present invention, the conveying surface of the conveying unit is inclined downward in the downstream direction. Usually, the holding unit is provided with a holding member and a rear end holding member, which hold accumulated articles from front and back. However, in the present invention, an article held in the standing position by the holding unit will be in a forwardly inclined position, and a front portion of the article will be held by the front end holding member, and thus the rear end holding member can be omitted.

A conveyance apparatus according to a twenty-ninth aspect of the present invention is the conveyance apparatus according to the first aspect of the present invention, in which each delivery table is configured such that the receiving position is slightly inclined from the horizontal position in the direction that is opposite the rotational direction. In addition, a movement control member that prevents the received articles from moving is provided on a lower side of the inclined delivery table.

According to the conveyance apparatus of the twenty-ninth aspect of the present invention, each delivery table rotates toward the standing position when each delivery table receives an externally supplied article at the receiving point, and this will consequently move the articles to the standing position. Then, each delivery table delivers the received article to the holding unit. Consequently, the articles will be held by the holding unit in the standing position. Therefore, unlike conventional apparatuses, the conveyance apparatus does not need to be provided with a relatively long and large position changing device that moves the articles from the horizontal position to the standing position, therefore preventing the overall size of the apparatus from increasing.

Further, unlike conventional position changing devices, the present position changing device does not sandwich the articles at the downstream end between a pair of transport conveyors each having a vertical running surface and does not move the article to the standing position. Therefore, for example, even when the thicknesses of packaged articles having the same contents vary in each packaged article, or even when the frictional properties and flexibility of the packaging materials of the packaged articles are different in each packaged article, the articles can be moved to the standing position in a stable manner regardless of these differences.

Further, when receiving an article, each delivery table is in a position slightly inclined from the horizontal position in a direction opposite that of the rotational direction, so that the article received will move in an inclined direction on each delivery table, and the movement thereof will be controlled by the movement control member. Therefore, the position of the article can be determined at the receiving point before the articles is received, which as a result will achieve a conveyance apparatus in which the accumulation position of the articles will not be disturbed.

A conveyance apparatus according to a thirtieth aspect of the present invention is the conveyance apparatus according to the twenty-ninth aspect of the present invention, further comprising a carry-in unit configured to deliver the articles to the receiving position of each delivery table. The conveying surface of the carry-in unit is inclined so as to substantially coincide with the receiving position of each delivery table.

According to the conveyance apparatus of the thirtieth aspect of the present invention, the conveying surface of the carry-in unit on the article supply side is inclined so as to substantially coincide with the receiving surface of each delivery table on the article receiving side, so that the delivery and receiving of the articles between the carry-in unit and each delivery table will be smoothly conducted. Further, the position of the articles will be inclined before the articles move to each delivery table, so that the effect of the inclination of the above-described delivery tables will be further facilitated.

A conveyance apparatus according to a thirty-first aspect of the present invention is the conveyance apparatus according to the first aspect of the present invention, further comprising a carry-in unit that delivers the articles to the receiving position, and the delivery unit comprising a direction switching unit configured to change the orientation of the articles before the articles are conveyed to the receiving position of each delivery table.

According to the conveyance apparatus of the thirty-first aspect of the present invention, the orientation of the articles that are conveyed in a certain direction are changed immediately before the articles reach the delivery unit, which for example enables the delivery unit to rotate the orientations of the articles to the standing position by 90 degrees, and the articles can be accumulated in a 90-degree rotated state. As a result, it will be possible to provide a conveyance apparatus capable of handling various accumulation patterns of articles.

A conveyance apparatus according to a thirty-second aspect of the present invention is the conveyance apparatus according to the tenth aspect of the present invention, further comprising a chamber portion in contact with the open portion of each delivery table, and a blowout portion configured to blowing out air from the receiving surface of each delivery table via the open portion. The chamber portion is connected to the suction unit and the blowout portion, and comprises a suction and holding area that will communicate with the suction unit, and a delivery area that will communicate with the blowout portion, in response to the position of each delivery table.

According to the conveyance apparatus of the thirty-second aspect of the present invention, a negative pressure sucked into the chamber portion and a positive pressure blown out therefrom are formed by the suction unit and the blowout portion. Therefore, in response to the movement of each delivery table, the process of securely holding an article on the receiving surface of each delivery table to discharging the articles in the standing position with respect to the holding unit can be more smoothly conducted.

A conveyance apparatus according to a thirty-third aspect of the present invention is the conveyance apparatus according to the thirty-second aspect of the present invention, in which the suction and holding area and the delivery area comprise a plurality of openings formed along the direction in which each delivery table moves.

According to the conveyance apparatus of the thirty-third aspect of the present invention, it is possible, with a simple structure, to switch between suctioning and discharging the articles on the receiving surface of each delivery table, by causing each delivery table to move while causing the same to contact with the opening of the chamber portion connected to each of the suction unit and the blowout portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7A shows a state in which the delivery table receives a new article; FIGS. 7B and 7C each show a state in which the delivery table is moving increasingly closer to a bucket; FIG. 7D shows a state in which the article has begun to be delivered from the delivery table to the bucket; FIG. 7E shows a state in which the delivery table is pushing the article substantially in a standing position in the bucket; and FIG. 7F shows a state in which the next delivery table receives a new article.

FIGS. 14A to 14F shows schematic lateral views of the operation of the delivery table in a chronological order. FIG. 14A shows a state in which the delivery table receives a new article; FIGS. 14B to 14D each shows a state in which the delivery table is moving increasingly closer to the bucket; FIG. 14E shows a state in which the delivery table is located behind the article at the rearmost end in the bucket; and FIG. 14F shows a state in which the next delivery table receives a new article.

FIGS. 26A to 26F show schematic lateral views of the operation of the delivery table in a chronological order. FIG. 26A shows a state in which the delivery table receives a new article; FIGS. 26B and 26C each show a state in which the delivery table is moving increasingly closer to the bucket; FIG. 26D shows a state in which the article has begun to be delivered from the delivery table to the bucket; FIG. 26E shows a state in which the delivery table is pushing an article substantially in the standing position in the bucket; and FIG. 26F is a state in which the next delivery table receives a new article.

FIG. 34A shows a state in which the delivery table receives a new article; and FIG. 34B shows a state in which the delivery table is moving increasingly closer to the bucket.

FIG. 36A shows a loading surface in a shallow V-shape, and FIG. 36B shows a loading surface in a curved shape.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
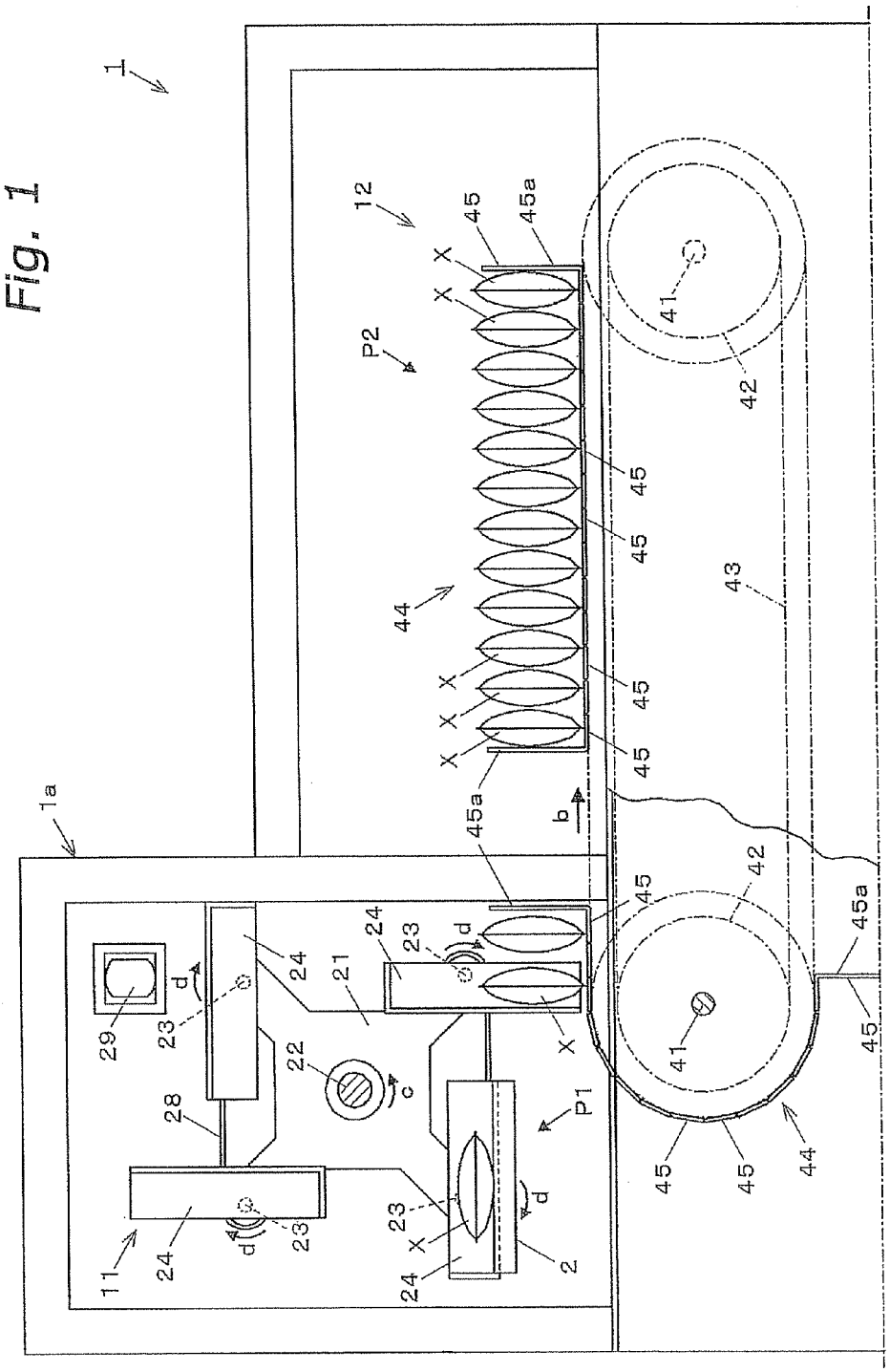
FIG. 1 is a lateral view of a conveyance apparatus according to a first embodiment of the present invention.
Figure 2:
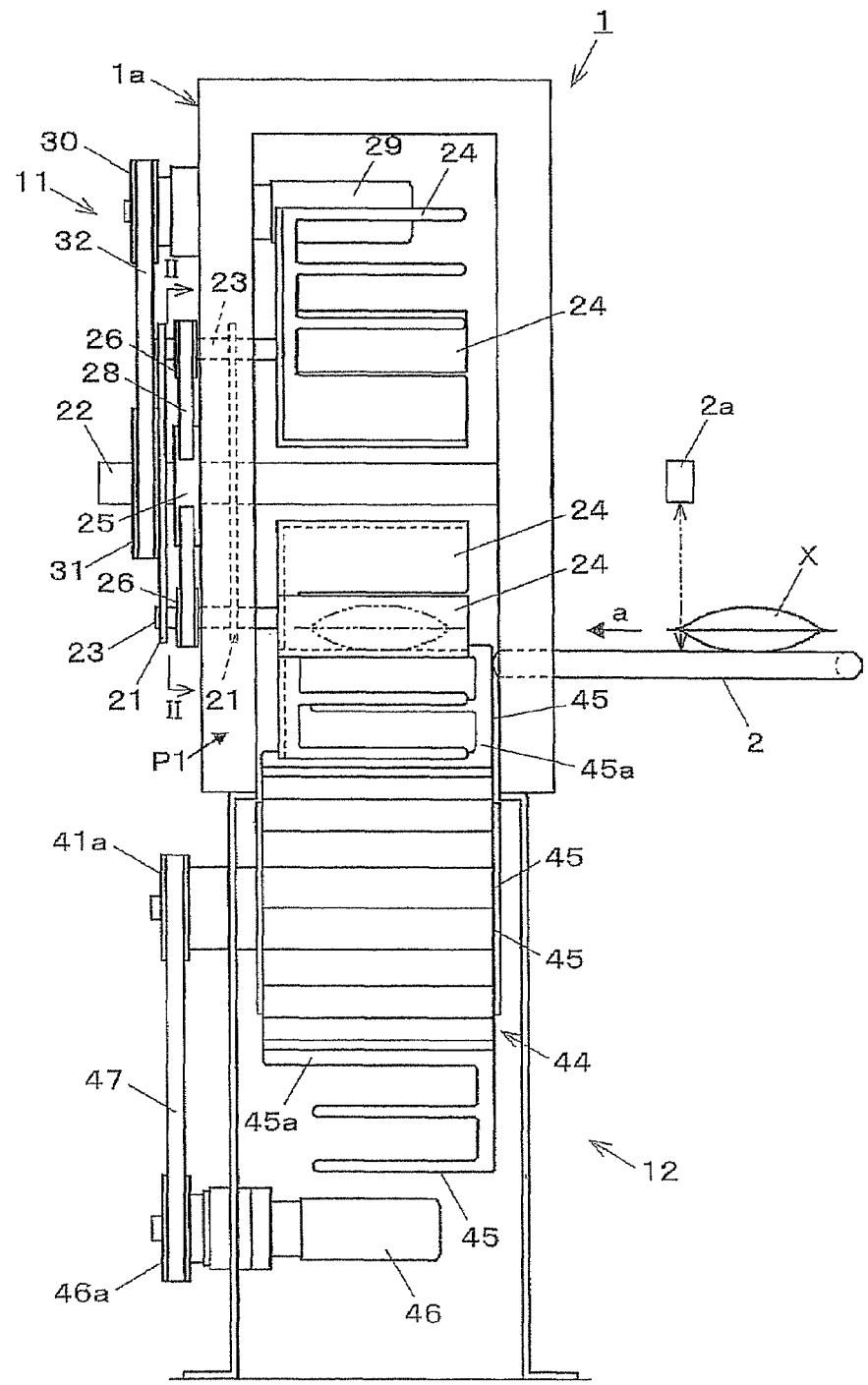
FIG. 2 is an plan view of the conveyance apparatus according to the first embodiment of the present invention.

A conveyance apparatus 1 according to the first embodiment shown in FIGS. 1 and 2 is coupled to a carry-in conveyor 2. The carry-in conveyor 2 conveys, in an arrow "a" direction, a relatively flat packaged article X, such as snack foods and the like, which is supplied in a horizontal position from the upstream side. The conveyance apparatus 1 receives the article X from the carry-in conveyor 2, moves the article X to a standing position, accumulates a predetermined number of the articles X, and then conveys the same from a receiving point P1 to a discharging point P2 as shown by the arrow "b". The conveyance apparatus 1 comprises, as main components, a delivery device 11 mounted to a main body case 1a and an accumulation and conveyance apparatus 12. Note that as shown in FIG. 2, a photoelectric thickness sensor 2a for measuring the thickness of each article X is provided above the carry-in conveyor 2.

The delivery device 11 receives the articles X one by one in the horizontal position from the carry-in conveyor 2 and moves the articles X to the standing position. Also, the delivery device 11 has a function of delivering the articles X to the accumulation and conveyance apparatus 12 installed at the front portion thereof, while orderly placing the articles X from front to rear on the accumulation and conveyance apparatus 12.

Figure 3:
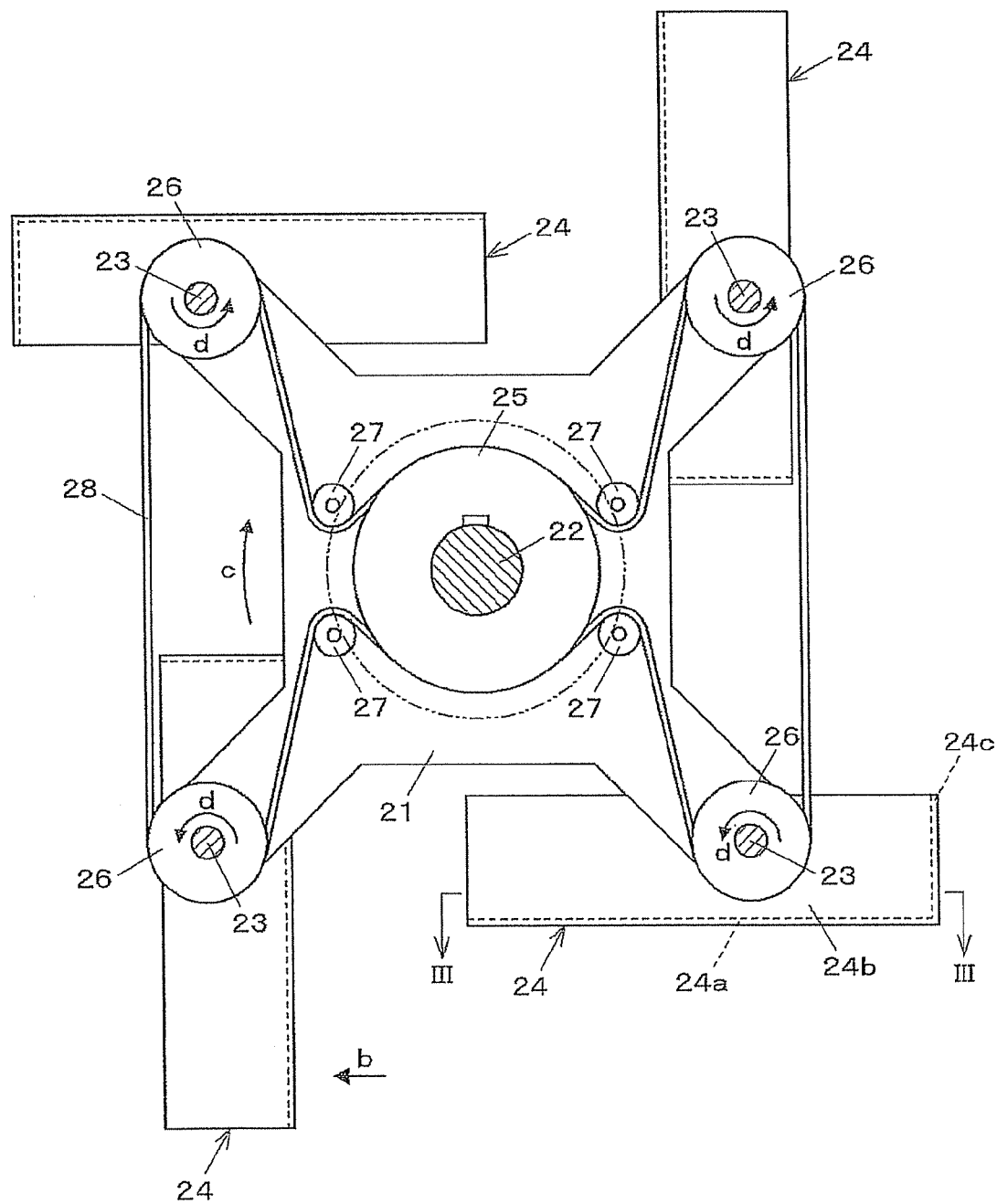
FIG. 3 is an enlarged view of a main portion of the conveyance apparatus taken in the direction of the arrow along line II-II of FIG. 2.

As shown in FIGS. 1 to 3, the delivery device 11 is provided with a pair of mutually coupled support plates 21, 21, which are located inside and outside the main body case 1a and include protruding portions that protrude in four perpendicular directions when viewed from the side; a fixed shaft 22 that penetrates through the center of the support plates 21, 21; rotation shafts 23 . . . 23 freely rotatably attached to each of the protruding portions; and delivery tables 24 . . . 24 respectively fixedly disposed on the rotation shafts 23 . . . 23. Each rotation shaft 23 is located above a lower end portion of each delivery table 24 in the standing position. More specifically, each rotation shaft 23 is located closer to an upper end portion of each delivery table 24 in the standing position (closer to a rear end portion of the delivery table 24 in the horizontal position).

Synchronous pulleys 25, 26 . . . 26 are fixedly disposed on the fixed shaft 22 and the rotation shafts 23 . . . 23. In such a case, the number of teeth of the synchronous pulley 25 is double that of the synchronous pulley 26. As shown in the figure, a single synchronous timing belt 28 is wound around the centrally located synchronous pulley 25 and the surrounding four synchronous pulleys 26 . . . 26 via four guide pulleys 27 . . . 27 provided so as to be located near the centrally located synchronous pulley 25 and to stand outward from the outside support plate 21. Note that, in FIGS. 2 and 3, in order to avoid complicating the drawings, the teeth of the synchronous pulley 25, 26 . . . 26 and a synchronous timing belt 28 are omitted.

A motor 29 is disposed in the main body case 1a at a relatively upper portion thereof. A timing belt 32 is wound around a pulley 30 mounted on an output axis of the motor 29 and around a pulley 31 fixedly disposed on the side opposite to the centrally located synchronous pulley 25 of the outside support plate 21. Consequently, the driving force of the motor 29 will be transmitted to the outside support plate 21, and due to the number of teeth described above, while the support plate 21 completes one rotation around the fixed shaft 22, i.e., the centrally located synchronous pulley 25, in the arrow "c" direction, each of the four synchronous pulleys 26 . . . 26, i.e., the rotation shafts 23 . . . 23 will completes two rotations in the arrow "d" direction via the synchronous timing belt 28.

In other words, when the motor 29 is driven, the delivery tables 24 . . . 24 fixedly disposed on the rotation shafts 23 . . . 23 will rotate in the arrow "d" direction and achieve the horizontal position and the standing position. Also, the delivery tables 24 . . . 24 will move forward, i.e., in the arrow "b" direction, via the rotation of the support plate 21 in the arrow "c" direction. In addition, when the support plate 21 completes one round in the arrow "c" direction, the delivery tables 24 . . . 24 will return to their original location and position. Note that the rotation and the forward movement are performed in synchronization with the movement of the accumulation and conveyance apparatus 12, which will be described below.

Figure 4:
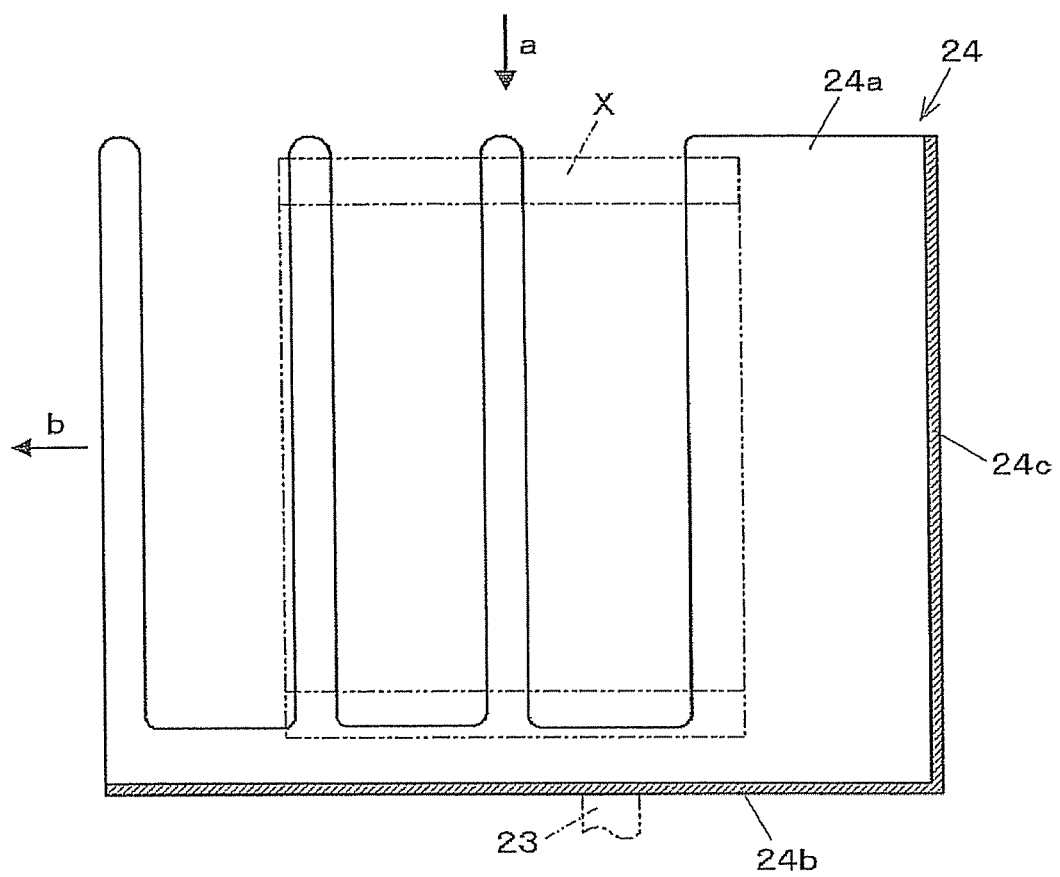
FIG. 4 is an enlarged sectional view of the main portion taken in the direction of the arrow along line III-III of FIG. 3.

As shown in FIGS. 3 and 4, each delivery table 24 is configured to receive an article X supplied in the arrow "a" direction and deliver the same in the arrow "b" direction intersecting the direction "a" in which each article X is supplied. The delivery table 24 includes a loading surface 24a and also a mounting wall 24b and a jump-out prevention wall 24c which extends vertically from the loading surface 24a. The loading surface 24a is a portion on which an article X supplied in the arrow "a" direction in the horizontal position is loaded, and is formed in a comb shape such that the loading surface 24a and the accumulation and conveyance apparatus 12 described below can intersect with each other. The mounting wall 24b is a portion to be coupled to the rotation shaft 23. The jump-out prevention wall 24c is located at the rear end portion of the delivery table 24 in the horizontal position, i.e., in a receiving position as shown in the figure. The jump-out prevention wall 24c is a portion that prevents the article X from jumping out of the delivery table 24 when the delivery table 24 rotates about the rotation shaft 23 as a support point and the loading surface 24a rotates forward, i.e., in the arrow "b" direction, so as to move from the horizontal position to the standing position.

As shown in FIGS. 1 and 2, the accumulation and conveyance apparatus 12 accumulates a predetermined number of the articles X in the standing position, which are delivered from the delivery device 11. Also, the accumulation and conveyance apparatus 12 transfers the articles X . . . X as a batch to the discharging point P2. This accumulation and conveyance apparatus 12 includes an upstream and downstream pair of support shafts 41, 41 freely rotatably supported in the main body case 1a, and four sprockets (FIG. 1 shows only one sprocket on each of the upstream and downstream sides) are mounted on each support shaft 41. Further, endless chains 43 . . . 43 (FIG. 1 shows only a single endless chain) are wound between each of upstream and downstream pair of sprockets 42 . . . 42.

Buckets 44, 44 that transfer the articles X . . . X in the standing position while holding the same in an accumulation state are coupled between the inside pair of endless chains 43, 43 and between the outside pair of endless chains 43, 43. Each bucket 44 comprises fourteen base plates 45 . . . 45 extending perpendicular to the conveying direction "b". Each base plate 45 is coupled to the endless chains 43, 43 via a spacer and the like (not shown). The front end portion of the front end base plate 45 and the back end portion of the back end base plate 45 are configured to extend vertically and are formed in an L-shape when viewed from the side. Also, standing portions 45a, 45a are formed in a comb shape when viewed from the front as described below. Further, as shown in the drawings, each bucket 44 holds twelve articles X . . . X in the standing position and in the accumulation state.

An upstream and downstream pair of motors 46, 46 (FIG. 2 shows only one on the upstream side) are disposed below the main body case 1a. The driving force of each motor 46 is transmitted to the support shaft 41 via a timing belt 47 wound around a pulley 46a mounted on the output axis of the motor 46 and a pulley 41a mounted on the support shaft 41. In other words, the driving force of one motor 46 is transmitted to the inside pair of sprockets 42, 42, and the other motor 46 is transmitted to the outside pair of sprockets 42, 42, so that each pair of endless chains 43, 43 independently run. Consequently, each bucket 44 is independently transferred.

Figure 5:
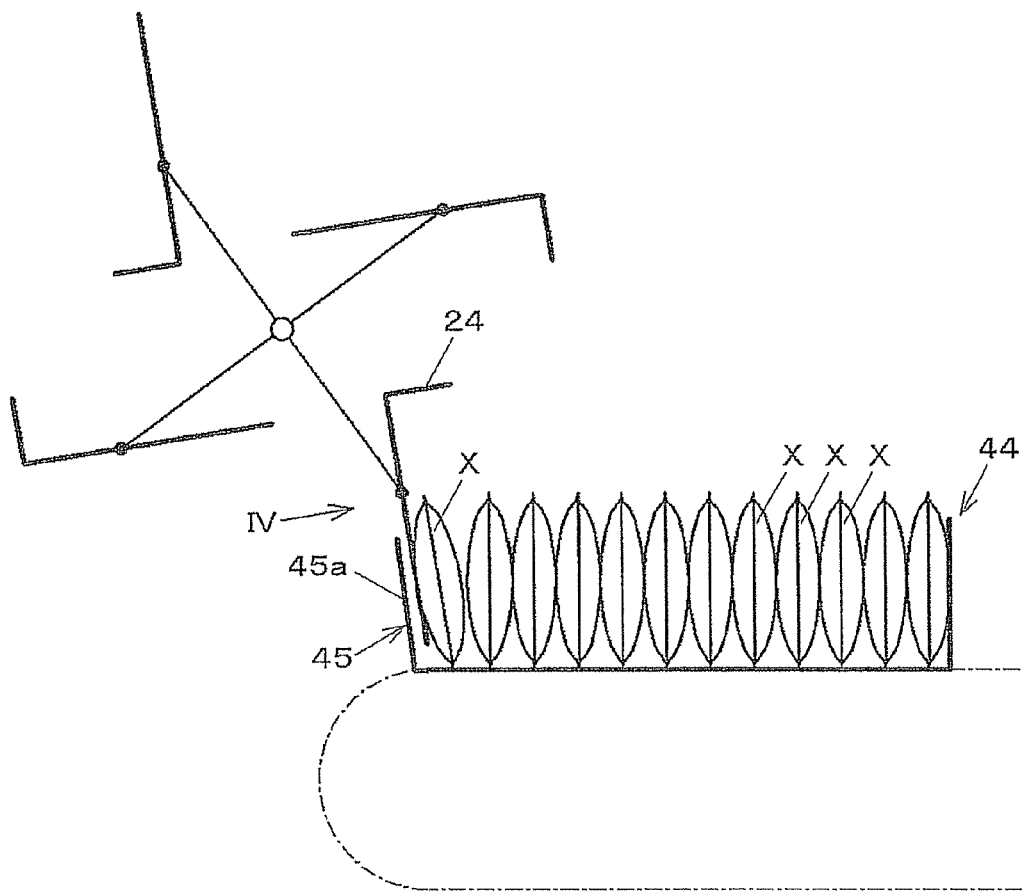
FIG. 5 is a schematic lateral view of a delivery table and a rearmost end of a bucket at the time of intersection.
Figure 6:
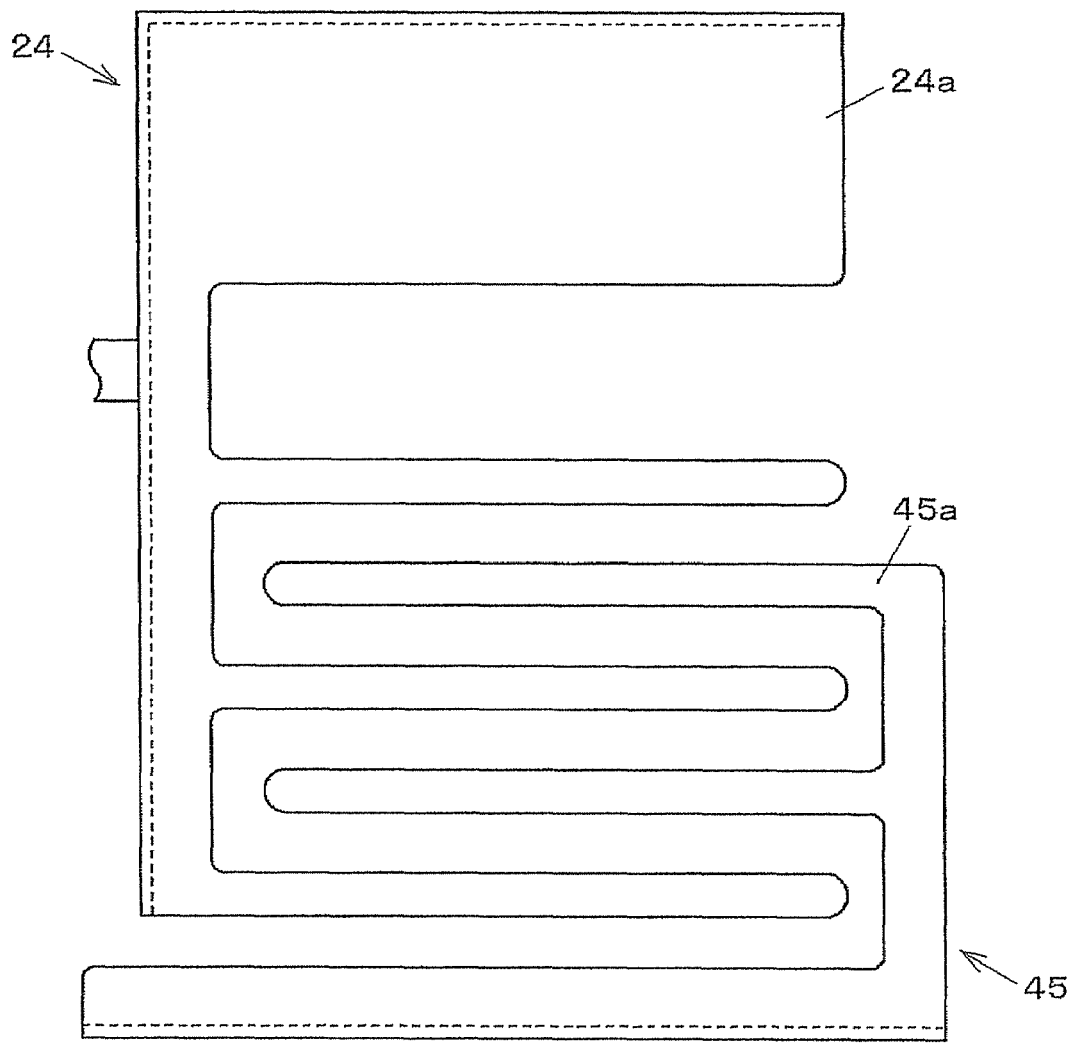
FIG. 6 is an enlarged view of the main portion taken in the IV direction of FIG. 5.

Here, the structure of the intersection between a delivery table 24 and the accumulation and the conveyance apparatus 12, i.e., the bucket 44, will be described. As an example, as shown in FIG. 5, the delivery table 24 and the standing portion 45a of the base plate 45 at the rear most end of the bucket 44 that holds a predetermined number of the articles X . . . X are configured so as to be able to intersect with each other in a positional relationship as shown in the figure. As shown in FIG. 6, the loading surface 24a of the delivery table 24 and the standing portion 45a of the base plate 45 are formed in a comb shape as shown in the figure so as to be able to move through each other without interfering with each other.

Next, the operation of this conveyance apparatus 1 will be described.

As shown in FIGS. 1 and 2, when the packaged articles X in the horizontal position are supplied from the carry-in conveyor 2 on the upstream side in the arrow "a" direction, each delivery table 24 of the delivery device 11 will receive an articles X, move the same to the standing position, and deliver the same to the bucket 44 of the accumulation and conveyance apparatus 12 in the arrow "b" direction. The thickness of each article X conveyed by the carry-in conveyor 2 is detected by the thickness sensor 2a, so that the way in which the bucket 44 is moved can be finely adjusted based on the detection result. Consequently, the articles X can be transferred in an appropriate manner to the bucket 44 according to varying bag thickness.

Figures 7A, 7B:
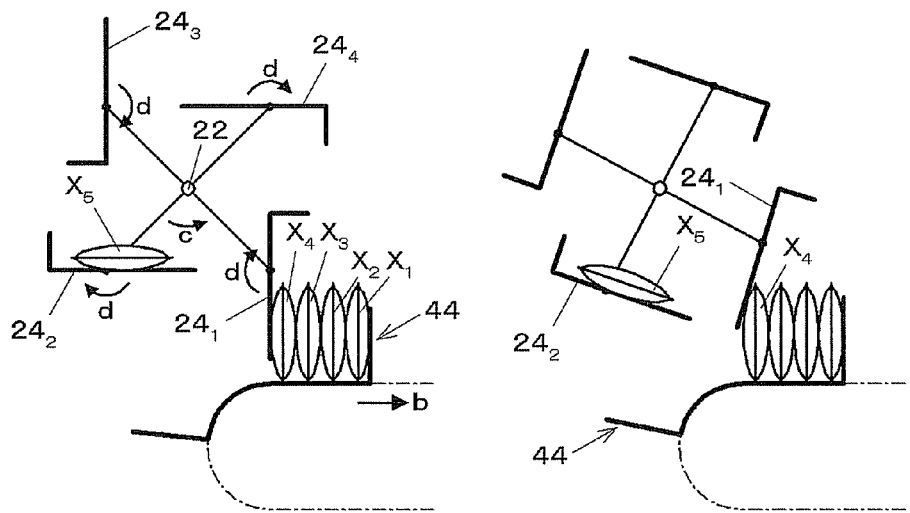
FIGS. 7A to 7F shows schematic lateral views of the operation of the delivery table in a chronological order.

Specifically, as shown in FIG. 7A, for example, four articles $X_1, X_2, X_3, X_4$ are already accumulated in the standing position in the bucket 44 to be transferred in the arrow "b" direction, and the article $X_4$ at the rearmost end is securely held from behind by the preceding delivery table $24_1$ in the standing position. In addition, a new article $X_5$ in the horizontal position is supplied to the next delivery table $24_2$. Remaining delivery tables $24_3$, $24_4$ are in the positional relationship as shown in the figure. Note that, in FIG. 7, each delivery table 24 and each article X are denoted by specific reference numerals, in order to clearly show the movement of each delivery table 24, which rotate in a clockwise direction as shown by the arrow "d" and which also move around the fixed shaft 22 in a counterclockwise direction as shown by the arrow "c".

Then, as shown in FIG. 7B, when the bucket 44 is further transferred, along therewith, the delivery table $24_1$, that was holding the article $X_4$ at the rearmost end in the bucket 44 from behind starts moving upward, and the delivery table $24_2$ that holds the new article $X_5$ starts moving to the standing position and moving closer to the bucket 44.

Figures 7C, 7D:
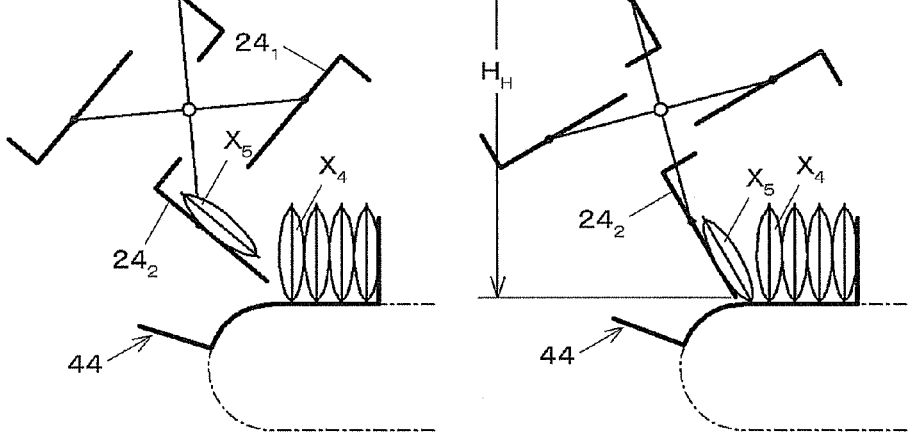

Then, as shown in FIG. 7C, the delivery table $24_1$, that was holding the article $X_4$ at the rearmost end in the bucket 44 continues moving upward, and the delivery table $24_2$ that holds the new article $X_5$ further moves to the standing position and moves closer to the bucket 44.

Then, as shown in FIG. 7D, when the delivery table $24_2$ that holds the new article $X_5$ moves further closer to the bucket 44, the article $X_5$ will be placed in the bucket 44 while moving to the standing position and lie behind the article $X_4$.

Figures 7E, 7F:
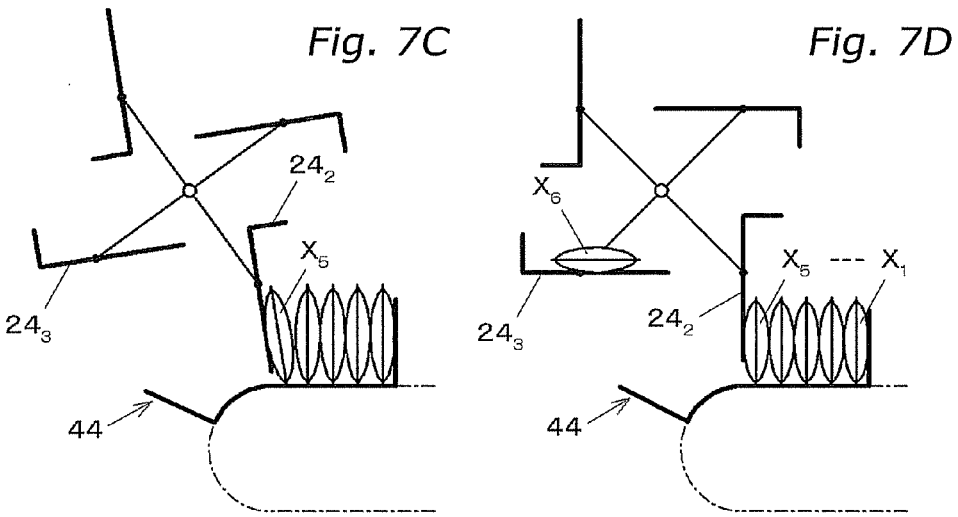

Then, as shown in FIG. 7E, the delivery table $24_2$ further moves to the standing position, holds the back of the article $X_5$ that has been placed in the bucket 44, and moves the article $X_5$ to the standing position. At the same time, the delivery table $24_2$ moves forward and orderly places the article $X_5$ on the front of the bucket 44. Meanwhile, a delivery table $24_3$ that follows this delivery table $24_2$ moves so as to prepare to receive the next new article X and starts moving to the horizontal position.

Then, as shown in FIG. 7F, the five articles $X_1$ to $X_5$ are held in the standing position, being held from behind by the delivery table $24_2$ in the bucket 44. A new article $X_6$ is supplied to the delivery table $24_3$ in the horizontal position. In this way, the delivery device 11 of this conveyance apparatus 1 is provided with the four delivery tables $24_1$, to $24_4$, and these delivery tables $24_1$, to $24_4$ can receive the articles X, each taking turns. As a result, the accumulation of the articles X at the receiving point P1 will be accelerated.

When twelve articles X . . . X are accumulated in the bucket 44 through the repetition of the above-described operation, the bucket 44 will be transferred to the discharging point P2, and the other empty bucket 44 will arrive at the receiving point P1. Consequently, while the articles X . . . X are discharged from one bucket 44 at the discharging point P2, new articles X . . . X are supplied to the other bucket 44 at the receiving point P1. As a result, the accumulation and discharging of the articles X will be accelerated.

Further, as shown in FIGS. 5 and 6, the standing portion 45a of the base plate 45 at the rear most end of the bucket 44 and the loading surface 24c of the delivery table 24 are formed in a comb shape so as to be able to intersect with each other. Therefore, when the twelfth article X is delivered to the bucket 44, the standing portion 45a of the base plate 45 at the rear most end of the bucket 44 will intersect with the loading surface 24a of the delivery table 24 and hold the back of the last article X, taking turns with the loading surface 24a. Therefore, it will be possible to transfer rapidly the bucket 44 that has accumulated a predetermined number of the articles X . . . X from the receiving point P1 to the discharging point P2, and consequently, also in this regard, the accumulation of the articles X will be accelerated.

In such a case, by means of the drive unit comprising the synchronous pulleys 25, 26 . . . 26, the synchronous timing belt 28, and the motor 29, the delivery table 24 is moved to the standing position after receiving a flat article X from the upstream side in the horizontal position, which will consequently change the position of the article X from the horizontal position to the standing position. Then, by means of the drive unit, the delivery table X delivers the received articles X to the bucket 44 while orderly placing the articles X from front to back in the bucket 44, so that the articles X will be securely held by the bucket 44 in a state of being accumulated in a front-to-back direction in the standing position. In addition, the drive unit causes the delivery table 24 to operate in synchronization with the movement of the bucket 44, so that the accumulation process will be stable. Therefore, unlike a conventional apparatus, the conveyance apparatus does not need to be additionally provided with a relatively long and large position changing device that moves the article X to the standing position, therefore preventing the overall size of the apparatus from increasing.

Further, unlike conventional position changing devices, the present position changing device does not sandwich the article at the downstream end between the pair of transport conveyors each having a vertical running surface. Therefore, for example, even when the thickness of packaged articles X having the same contents varies in each packaged article X, or even when a packaging material of the packaged articles X is different in each packaged article X in frictional property and flexibility, the articles can be moved to the standing position in a stable manner regardless of these differences.

Figure 8:
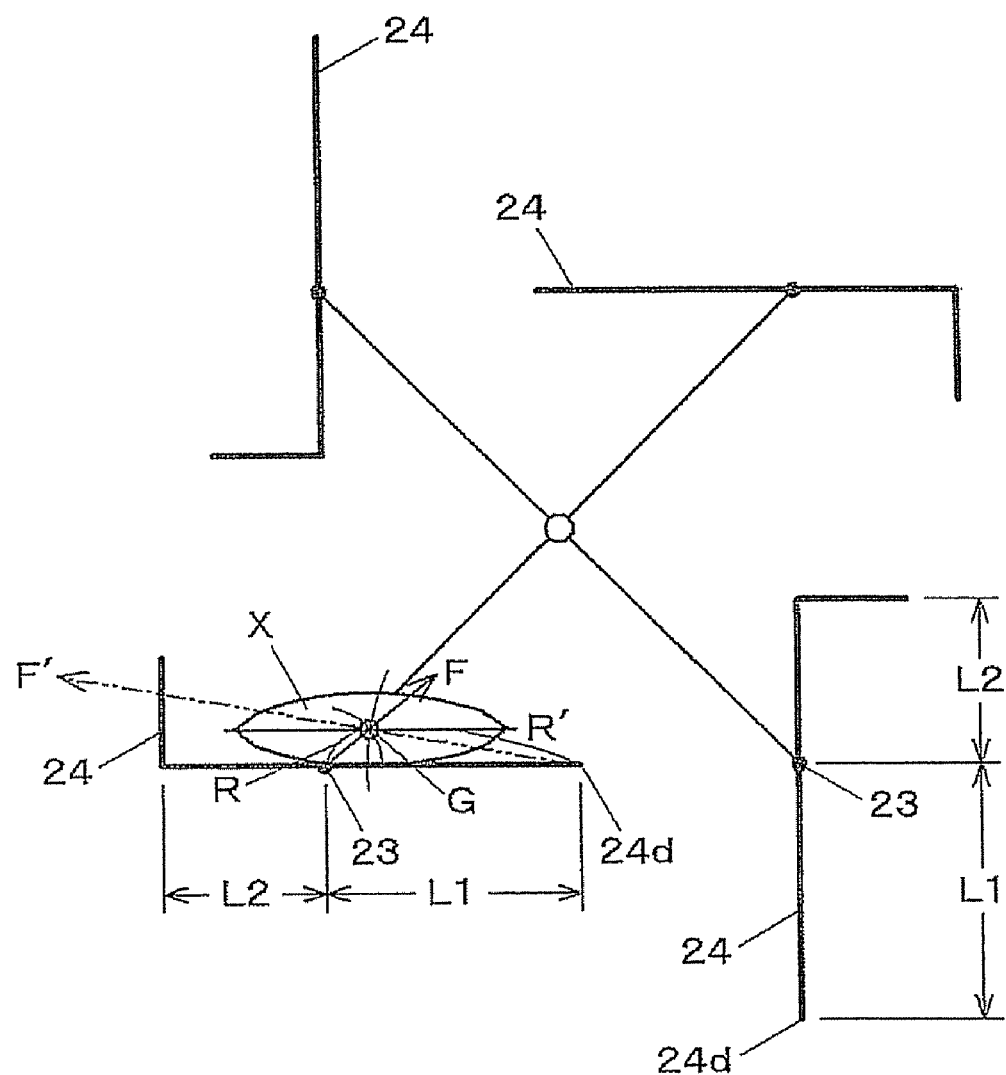
FIG. 8 is a schematic lateral view which describes the effect of a rotation support point being located closer to an upper end portion of the delivery table in the standing position.

Further, as shown in FIG. 8, the rotation shaft 23, which is a rotation support point of the delivery table 24, is located above a lower end portion 24d of the delivery table 24 in the standing position. Therefore, when the delivery table 24 rotates from the horizontal position to the standing position, the rotation radius R is smaller than the rotation radius R' that is defined when the rotation support point is located at the lower end portion 24d of the delivery table 24, as is conventional. If the rotation is performed at constant angular velocity, the centrifugal force F that acts on the article X will be smaller than the centrifugal force F' that is generated when the rotation support point is located at the lower end portion 24d. Consequently, the article X will be prevented from jumping out of the delivery table 24 at the time of position change and therefore the accumulation process can be accelerated. Note that the reference numeral G in the figure shows the position of the center of gravity of the article X.

In addition, it is possible to achieve the function of rotating the delivery table 24 and the function of moving the delivery table 24 forward with the motor 29, which is a single driving source, so that it will be easy to operate both the operations in synchronization with each other, and the structure of the apparatus will be simplified.

In addition, as shown in FIG. 8, the rotation shaft 23, which is a rotation support point of the delivery table 24, is located closer to the upper end portion of the delivery table 24 in the standing position (the length L1 is longer than the length L2). Therefore, when the delivery table 24 rotates from the horizontal position to the standing position, the centrifugal force F will act on the article X in a direction favorable for moving the article X forward and raising the same in the standing position. In other words, this structure is preferable to the prompt delivery of the article X to the bucket 44 when the bucket 44 is located forward of and below the delivery table 24 that received the article X from the upstream side.

In addition, when the conveyance apparatus is configured such that the direction "a" in which the articles are supplied to the delivery device 11 from the carry-in conveyor 2 intersects with the direction "b" in which the articles are delivered from the delivery device 11 to the bucket 44, the jump-out prevention wall 24c is provided at a rear end portion of the delivery table 24 in the horizontal position, i.e., the receiving position, which prevents the articles X from jumping out of the delivery table 24. Consequently, this jump-out prevention wall 24c reliably prevents the articles from jumping out of the delivery table 24, even when there is concern that the article X may jump out of the delivery table 24 due to a position at which the article X is supplied to the delivery table 24.

The articles X that are delivered to the bucket 44 and orderly placed from front to back in the bucket 44 by the delivery table 24 will be reliably received by the standing portion 45a of the base plate 45 disposed at the foremost end of the bucket 44, so that the articles X will be stably held in the standing position in the bucket 44.

Note that although the delivery table 24 receives the articles X in the horizontal position, the delivery table may be configured so as to receive the articles X in a position slightly inclined in a rotation direction "d" from the horizontal position. For example, the position of a delivery table $24_1$ shown in FIG. 7B corresponds to the above described position. In such a case, the delivery table $24_1$ starts rotating in a state where the article $X_5$ is prevented from jumping out of the delivery table $24_1$, which will enable further acceleration of the process.

Second Embodiment

Next, a conveyance apparatus according to a second embodiment will be described. Note that in each embodiment and modified examples which are described below, components common or similar to the above-described components are denoted by the same reference numerals, so long as there is no confusion as to their identity.

Figure 9:
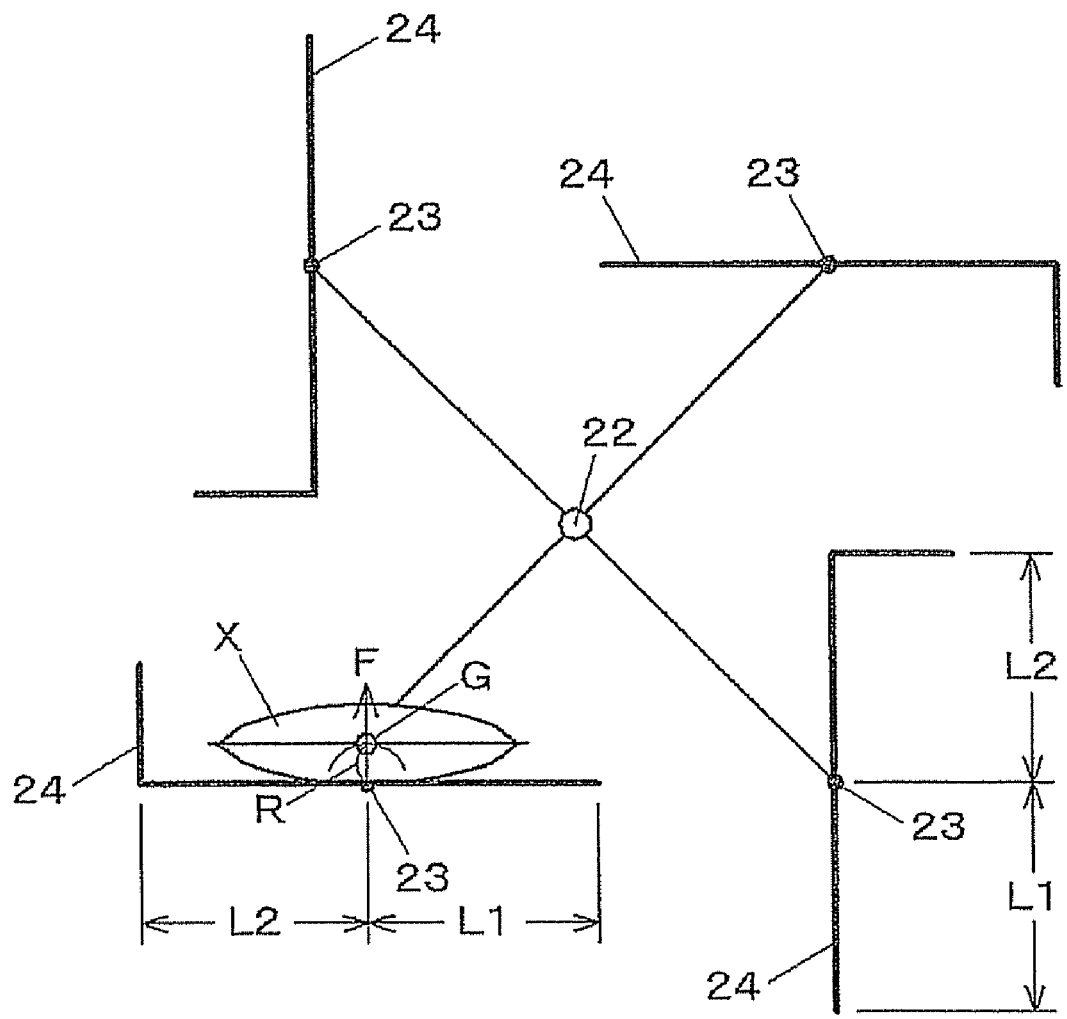
FIG. 9 is a schematic lateral view showing the main portion of a conveyance apparatus according to a second embodiment of the present invention.

As shown in FIG. 9, in this case, the rotation shafts 23 . . . 23, which are rotation support points of the four delivery tables 24 . . . 24 provided around the fixed shaft 22, are located in substantially the center of the delivery tables 24 . . . 24 (the length L1 is substantially equal to the length L2).

Accordingly, since the rotation shaft 23 of the delivery table 24 is located in substantially the center of the delivery table 24, the rotation radius R is the shortest, i.e., the centrifugal force F acting on the article X is the smallest, therefore demonstrating the preferable effect of preventing the article X from jumping out of the delivery table. Note that a reference numeral G in the figure shows the position of the center of gravity of the article X.

Third Embodiment

Next, a conveyance apparatus according to a third embodiment will be described.

Figure 10:
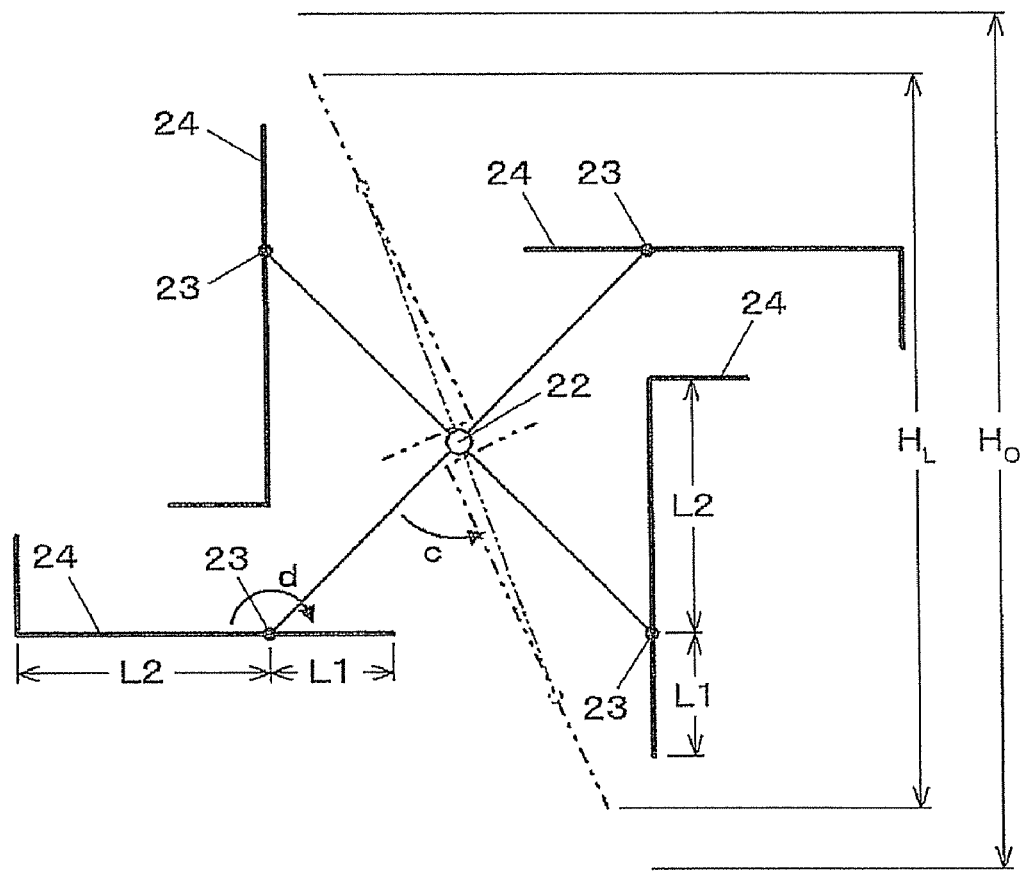
FIG. 10 is a schematic lateral view showing the main portion of a conveyance apparatus according to a third embodiment of the present invention.

As shown in FIG. 10, in this case, the rotation shafts 23 . . . 23, which are rotation support points of the four delivery tables 24 . . . 24 provided around the fixed shaft 22 are located closer to a lower end portion of the delivery tables 24 . . . 24 in the standing position (the length L1 is shorter than the length L2).

The rotation shaft 23, which is the rotation support point of the delivery table 24, is located closer to the lower end portion of the delivery table 24 in the standing position. Consequently, for example, when the delivery table 24 is configured to rotate about the rotation shaft 23 in a clockwise direction as shown by the arrow "d" to change its position and simultaneously the delivery table 24 is configured to move around the fixed shaft 22 in a counterclockwise direction so as to move forward as shown by the arrow "c", the delivery table 24 will move within a narrow longitudinal range $H_L$ around the fixed shaft 22 as shown by the bold two-dot chain line, which is therefore advantageous in terms of installation space. Specifically, the longitudinal movement range $H_o$ of the delivery table 24 when the rotation shaft 23 is located in substantially the center of the delivery table 24 (the length L1 is substantially equal to the length L2) is greater than the above-described longitudinal movement range $H_L$. In addition, the longitudinal movement range $H_H$ (see FIG. 7D) of the delivery table 24 when the rotation shaft 23 is located closer to the upper end portion of the delivery table 24 in the standing position (the length L1 is longer than the length L2) is greater than the above-described longitudinal movement range $H_L$.

Fourth Embodiment

Next, a conveyance apparatus according to a fourth embodiment will be described.

Figure 11:
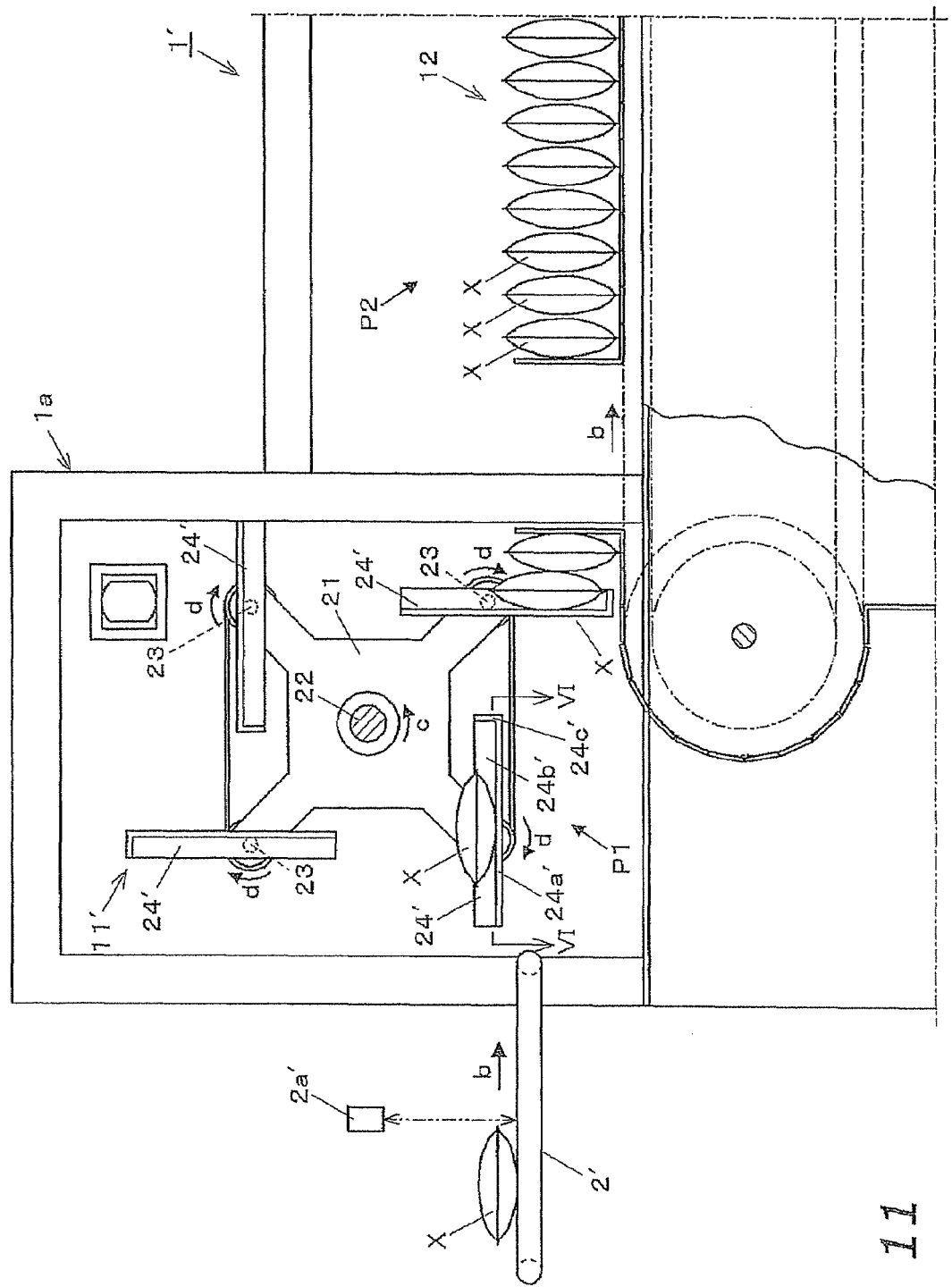
FIG. 11 is a lateral view of a conveyance apparatus (with portions omitted therefrom) according to a fourth embodiment of the present invention.

As shown in FIG. 11, a conveyance apparatus 1' receives the article X in the horizontal position at the receiving point P1 from a carry-in conveyor 2' on the upstream side, moves the article X to the standing position, accumulates a predetermined number of the articles X, and then conveys the same to the discharging point P2. The conveyance apparatus 1' comprises, as main components, a delivery device 11' mounted to the main body case 1a and the accumulation and conveyance apparatus 12. Note that the structure of the accumulation and conveyance apparatus 12 is the same as the specifically described structure in the first embodiment, and therefore the description thereof is omitted here.

The delivery device 11' receives the articles X one by one in the horizontal position from the carry-in conveyor 2' and moves the article X to the standing position. Also, the delivery device 11' has a function of delivering the articles X to the accumulation and conveyance apparatus 12 installed forward thereof, while orderly placing the articles X from front to back on the accumulation and conveyance apparatus 12. Note that a photoelectric thickness sensor 2a' for measuring the thickness of the article X is provided above the carry-in conveyor 2'. The effect in this case is the same as the effect provided by the thickness sensor 2a described in the first embodiment.

The structure of this delivery device 11' is mostly the same as the structure specifically described in the first embodiment. Therefore, a characteristic delivery table 24' fixedly disposed on each rotation shaft 23 of the support plate 21 which rotates in the arrow "c" direction about the fixed shaft 22 will be described. Note that, in such a case, each rotation shaft 23 is located above the lower end portion of each delivery table 24' in the standing position. More specifically, each rotation shaft 23 is located closer to an upper end portion of each delivery table 24' in the standing position (closer to a rear end portion of the rotation shaft 23 in the horizontal position).

Figure 12:
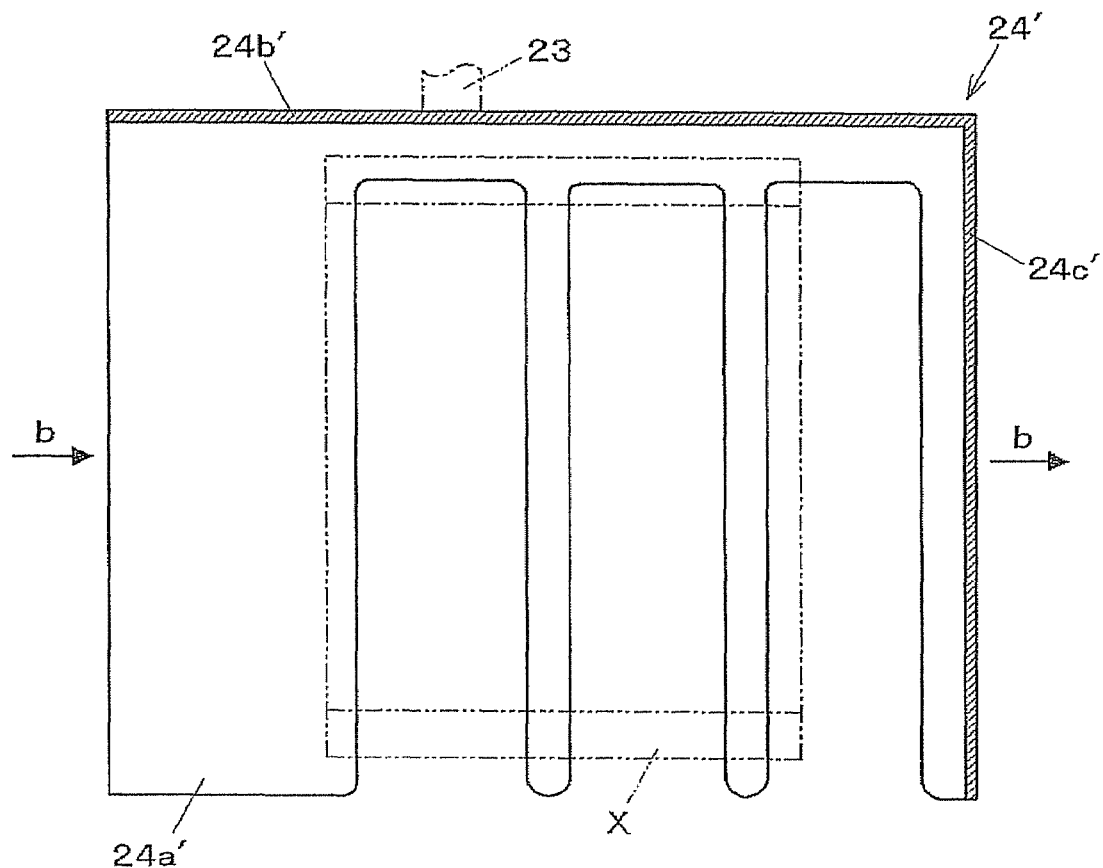
FIG. 12 is a sectional view of FIG. 11 taken along line VI-VI.

As shown in FIGS. 11 and 12, the delivery table 24' is configured to receive the articles X supplied in the arrow "b" direction and delivers the same in the arrow "b" direction that coincides with the direction "b" in which the articles X are supplied. The delivery table 24' includes a loading surface 24a' and a mounting wall 24b' and a movement control wall 24c' which extends vertically from the loading surface 24a'. The loading surface 24a' is a portion on which the article X supplied in the arrow "b" direction in the horizontal position is loaded, and is formed in a comb shape such that the loading surface 24a' and the accumulation and conveyance apparatus 12 described below can intersect with each other. The mounting wall 24b' is a portion to be coupled to the rotation shaft 23. The movement control wall 24c' is located at the front end portion of the delivery table 24' in the horizontal position as shown in the figure. The movement control wall 24c' is a portion that prevents the article X supplied from moving forward. In this case, the upright heights of the mounting wall 24b' and the movement control wall 24c' are shorter than the upright heights of the mounting wall 24b and the jump-out prevention wall 24c, which are described in the first embodiment. Note that the movement control wall 24c' can support the article X at the lower end portion of the article X, when the delivery table 24' rotates in the arrow "d" direction around the rotation shaft 23 as a supporting point and the loading surface 24a' is moved from the horizontal position to the standing position.

Figure 13:
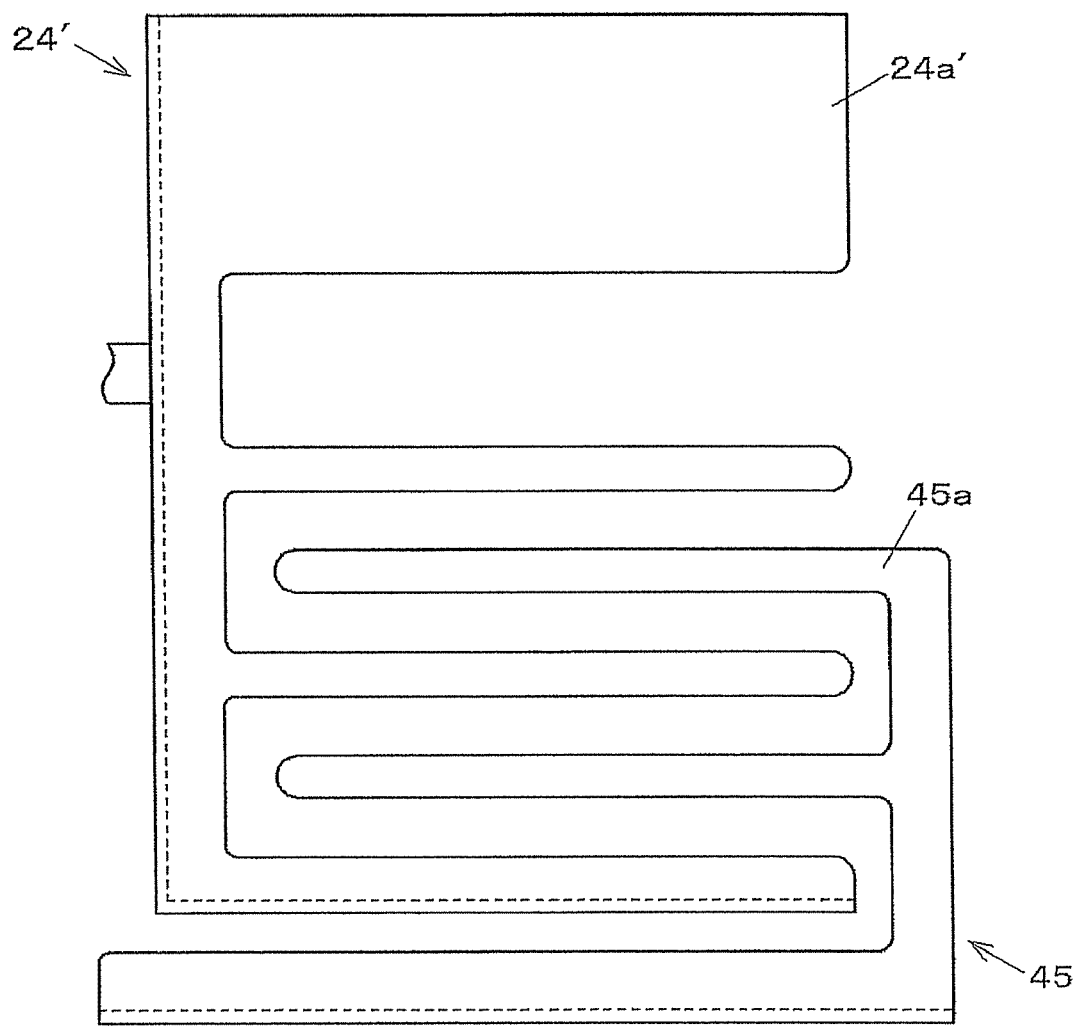
FIG. 13 is a view corresponding to FIG. 6, and shows the main portions of the delivery table and the rearmost end of the bucket at the time of intersection.

Here, the structure of intersection between the delivery table 24' and the accumulation and the conveyance apparatus 12, i.e., the bucket 44 will be described. As shown in FIG. 13, the loading surface 24a' of the delivery table 24' and the standing portion 45a of the base plate 45 are formed in a comb shape as shown in the figure so as to be able to move through without interfering with each other.

Next, the operation of this conveyance apparatus 1' will be described.

As shown in FIG. 11, when the packaged article X in the horizontal position is supplied from the carry-in conveyor 2' on the upstream side in the arrow "b" direction, the delivery table 24' of the delivery device 11' receives the articles X one by one, moves the same to the standing position, and delivers the same to the bucket 44 of the accumulation and conveyance apparatus 12 in the arrow "b" direction.

In other words, as shown in FIG. 14A, for example, three articles $X_1$, $X_2$, $X_3$ are already accumulated in the standing position in the bucket 44 to be transferred in the arrow "b" direction, and an article $X_4$ is about to be delivered from a delivery table $24_1'$ preceding behind the article $X_3$ at the rearmost end. At the same time, a new article $X_5$ in the horizontal position is supplied to a following delivery table $24_2'$. In such a case, the height of a movement control wall $24c_2'$ at a lower end portion of the delivery table $24_1'$ as shown in the figure is set to be relatively low, so that the article $X_4$ will be quickly removed and transferred to the bucket 44. Remaining delivery tables $24_3'$, $24_4'$ are in a positional relationship as shown in the figure. Note that, in FIG. 14, specific reference numerals are given to each delivery table 24' and each article X, in order to clearly show the movement of the delivery table 24' which rotates in a clockwise direction as shown by the arrow "d" and which also moves around the fixed shaft 22 in a counterclockwise direction as shown by the arrow "c".

Then, as shown in FIG. 14B, when the bucket 44 is further transferred, along therewith, the delivery table $24_1'$ starts moving upward, and the article $X_4$ held by the delivery table $24_1'$ will be delivered to the bucket 44. Meanwhile, the delivery table $24_2'$ that holds the new article $X_5$ starts moving to the standing position and moving closer to the bucket 44.

Then, as shown in FIG. 14C, the delivery table $24_1'$ that was holding the article $X_4$ at the rearmost end in the bucket 44 completes moving upward, and the delivery table $24_2'$ holding the new article $X_5$ further moves to the standing position and moves closer to the bucket 44.

Then, as shown in FIG. 14D, when the delivery table $24_2'$ that holds the new article $X_5$ moves further closer to the bucket 44, the article $X_5$ will be located behind the article $X_4$ while further moving to the standing position. Note that a lower end portion of the article $X_5$ is supported by a movement control wall $24c_2'$ of the delivery table $24_2'$.

Then, as shown in FIG. 14E, the delivery table $24_2'$ further moves to the standing position in order to deliver the article $X_5$ to the bucket 44. Meanwhile, a delivery table $24_3'$ that follows this delivery table $24_2'$ moves so as to prepare to receive the next new article X and starts moving to the horizontal position.

Then, as shown in FIG. 14F, the fifth article $X_5$ is just about to be delivered from the delivery table $24_2'$ to the bucket 44, and a new article $X_6$ is being supplied to the delivery table $24_3'$ in the horizontal position.

In this way, the conveyance apparatus is configured such that the direction "b" in which the articles X are supplied to the delivery device 11' coincides with the direction "b" in which the articles X are delivered from the delivery device 11' to the bucket 44, and the movement control wall 24c' is provided at the front end portion of the delivery table 24' in the horizontal position, i.e., in the receiving position, which prevents the articles X from moving forward on the delivery table 24'. Consequently, the articles X supplied from outside are reliably received and held by the delivery table 24'. Also in this case, it is needless to say that the articles X are prevented from jumping out of the delivery table 24'.

Fifth Embodiment

Next, a conveyance apparatus according to a fifth embodiment will be described.

Figure 15:
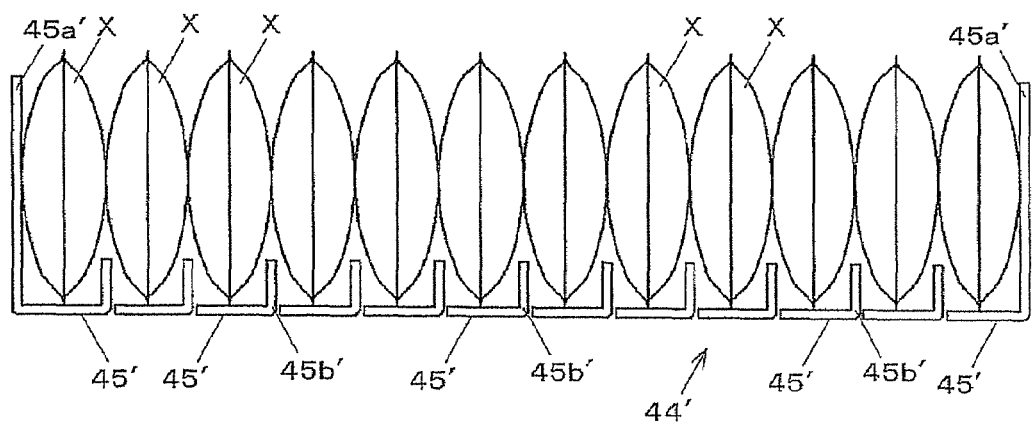
FIG. 15 is a lateral view showing the main portion of a bucket of a conveyance apparatus according to a fifth embodiment of the present invention.
Figure 16:
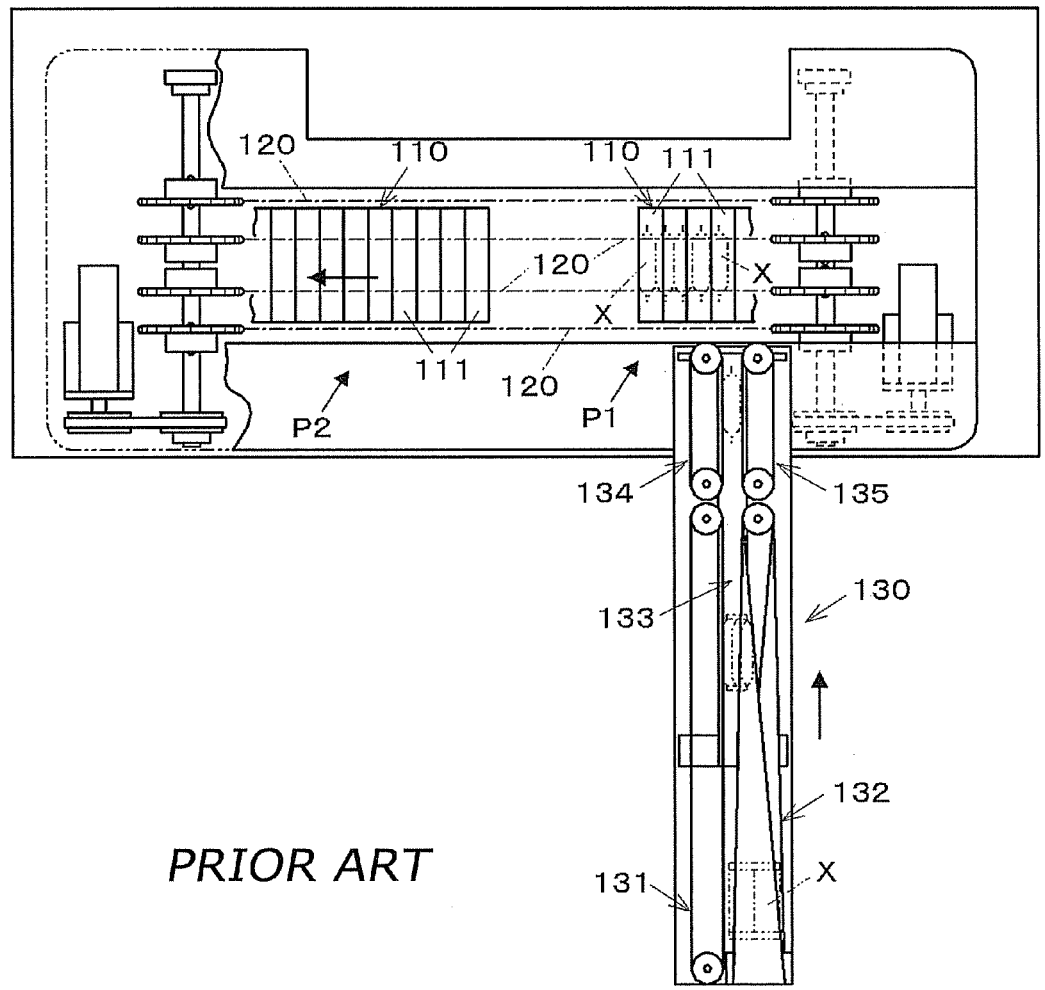
FIG. 16 is a plan view of a conventional conveyance apparatus.
Figure 17:
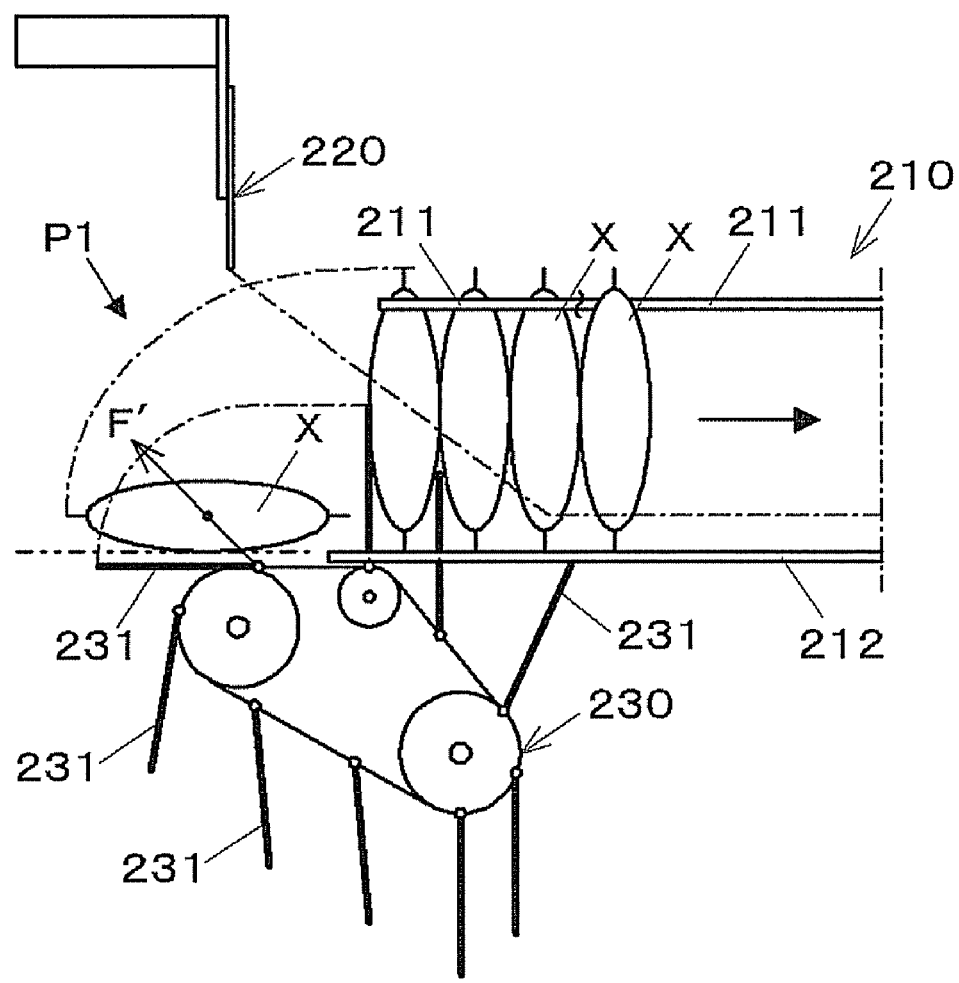
FIG. 17 is a lateral view of another conventional conveyance apparatus.
Figure 18:
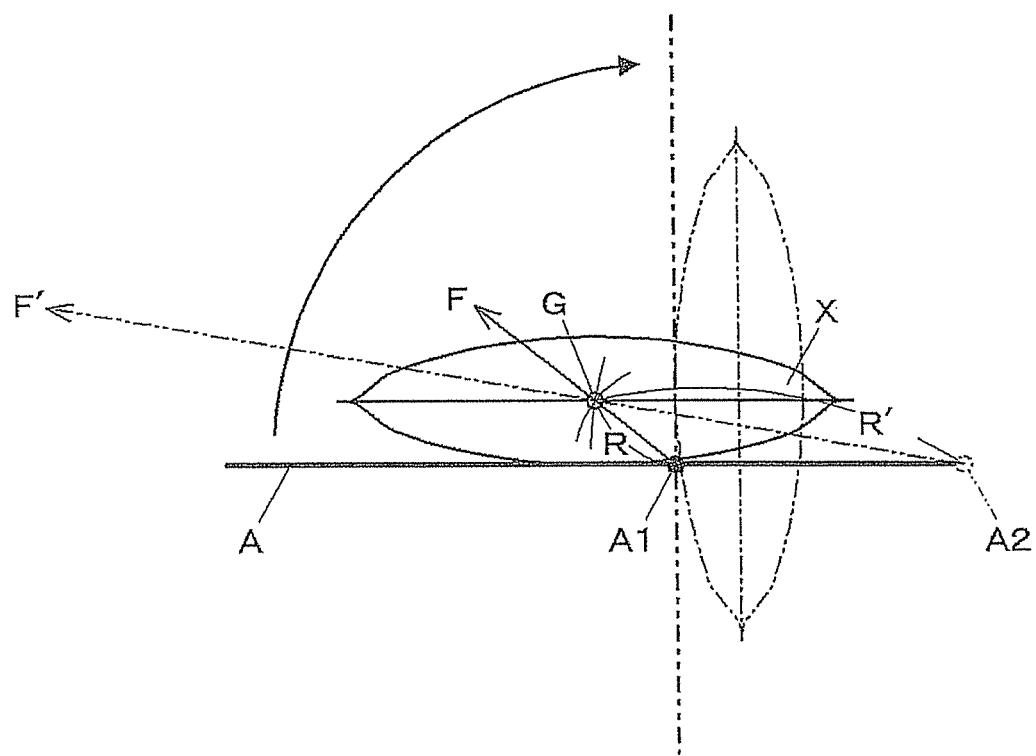
FIG. 18 is a schematic view which describes an effect of the present invention.
Figure 19:
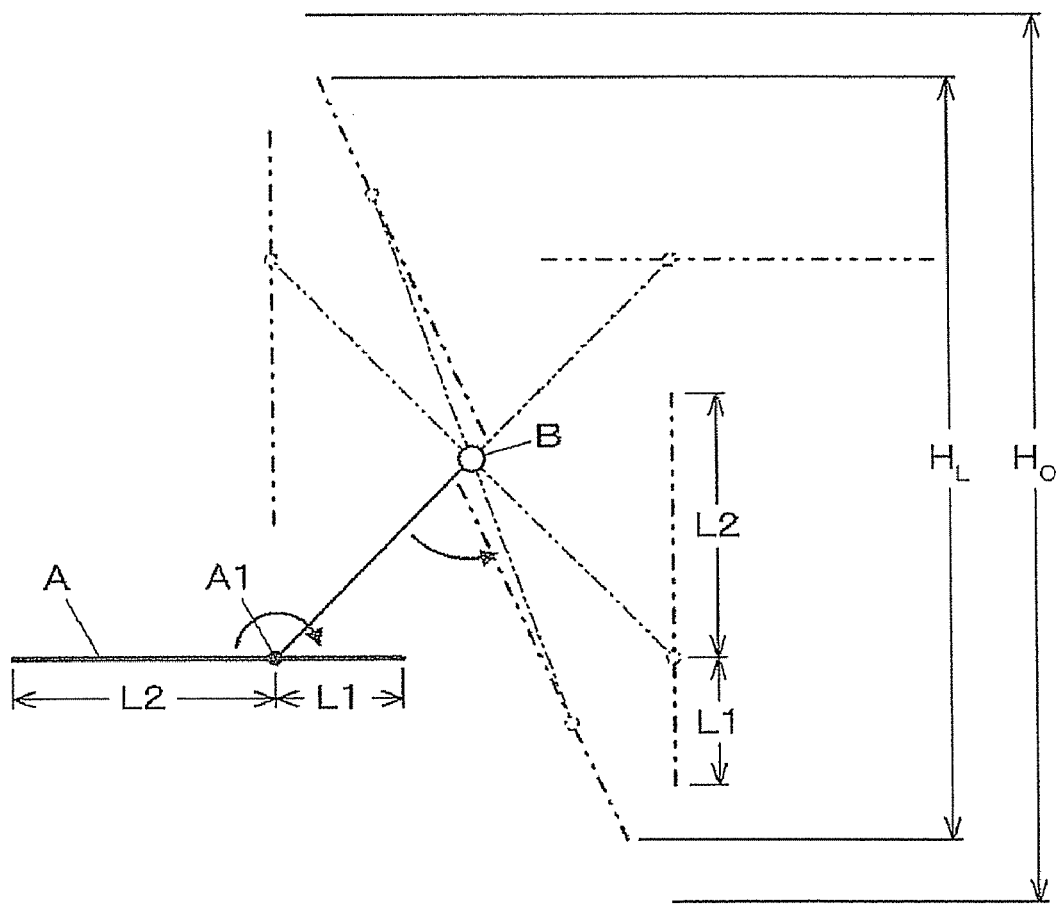
FIG. 19 is a schematic view which describes an effect of the present invention.
Figure 20:
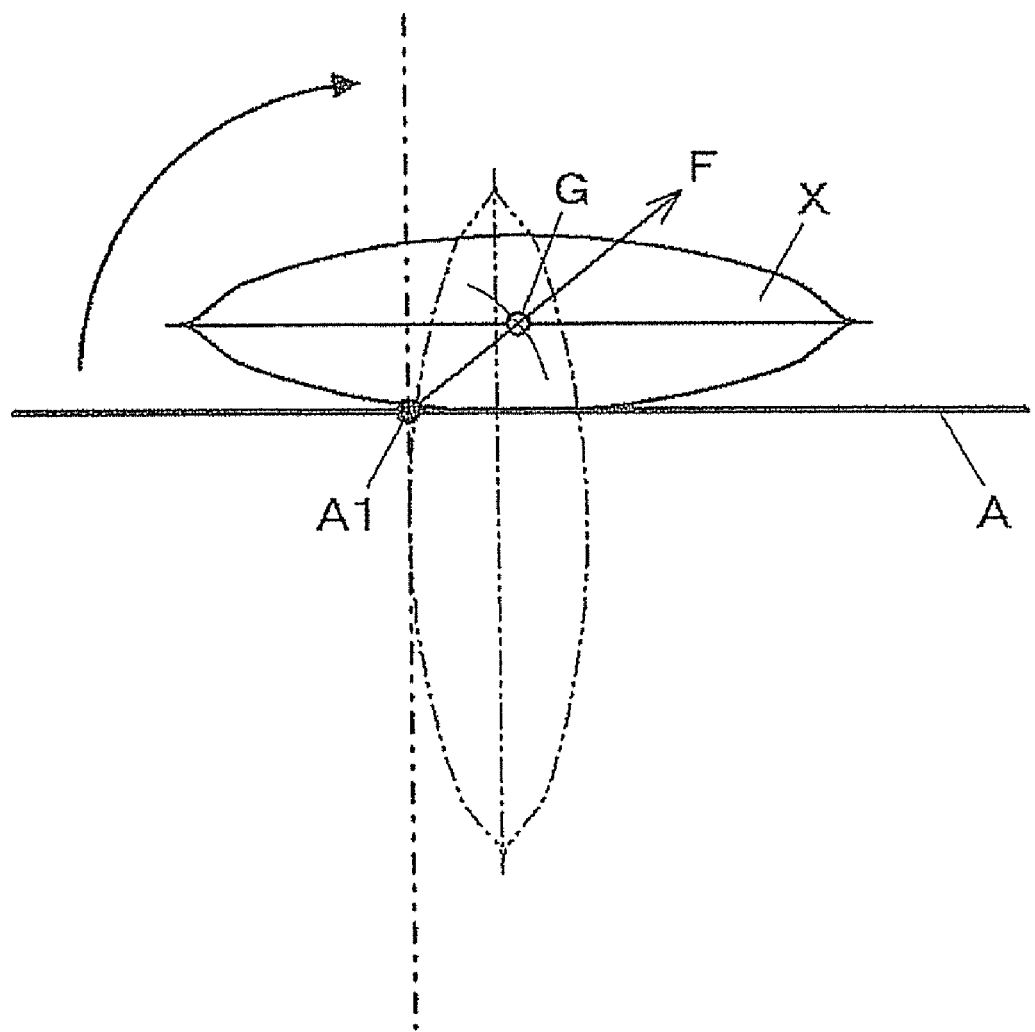
FIG. 20 is a schematic view which describes an effect of the present invention.

As shown in FIG. 15, a bucket 44' of the accumulation and conveyance apparatus in this case comprises twelve base plates 45' . . . 45'. The base plate 45' at the foremost end has a standing portion 45a' at a front end portion thereof, and the base plate 45' at the rearmost end has the standing portion 45a' at a rear end portion thereof. Further, short standing portions 45b' . . . 45b' shorter than the standing portion 45a' are individually provided at the front end portions of the base plates 45' . . . 45' excluding the base plate 45' at the foremost end. In this case, a gap between the adjacent short standing portions 45b', 45b' is substantially equal to the thickness of the article X, and each short standing portion 45b' is configured such that the height thereof will not come into contact with the delivery tables 24, 24' when receiving the article.

Accordingly, each article X is further stably held in the standing position in the bucket 44' by the short standing portions 45b' . . . 45b' that holds each article X. As a result, the articles X . . . X are prevented from tipping over, like a domino topple.

In such a case, as a form that does not interfere with the delivery tables 24, 24', besides a short height form as in the above described short standing portion 45b', it is possible to adopt, for example, a form in a tall comb shape as in the standing portion 45a, in which the delivery tables 24, 24' and the standing portion 45a can intersect with each other.

Note that the present invention is not limited to the embodiments described in detail above, and various modifications and variations can be made which fall within the spirit and scope of the invention. For example, in the above embodiment, the synchronous pulleys 25, 26 . . . 26 and the synchronous timing belt 28 are combined together and the single motor 29 is caused to rotate the support plates 21, 21 and the delivery tables 24 . . . 24 in a predetermined direction. However, a planetary gear mechanism may be used.

In addition, four delivery tables 24 and four delivery tables 24' are respectively provided to the delivery devices 11, 11', however, there may be only one or two delivery tables 24 and one or two delivery tables 24'.

When there is no possibility that the article X will jump out of the delivery table 24, it may not be necessary to provide the jump-out prevention wall 24c to the delivery table 24.

Sixth Embodiment

A boxing and packaging system according to yet another embodiment of the present invention will be described.

Note that the structure of a boxing and packaging system 100 according to the present embodiment is different from the structure of the above described embodiment in that the conveyance apparatus 1 described above is provided with a suction mechanism 33 described below.

Components having the same functions as described before are denoted by the same reference numerals and description thereof is omitted below.

Figure 21:
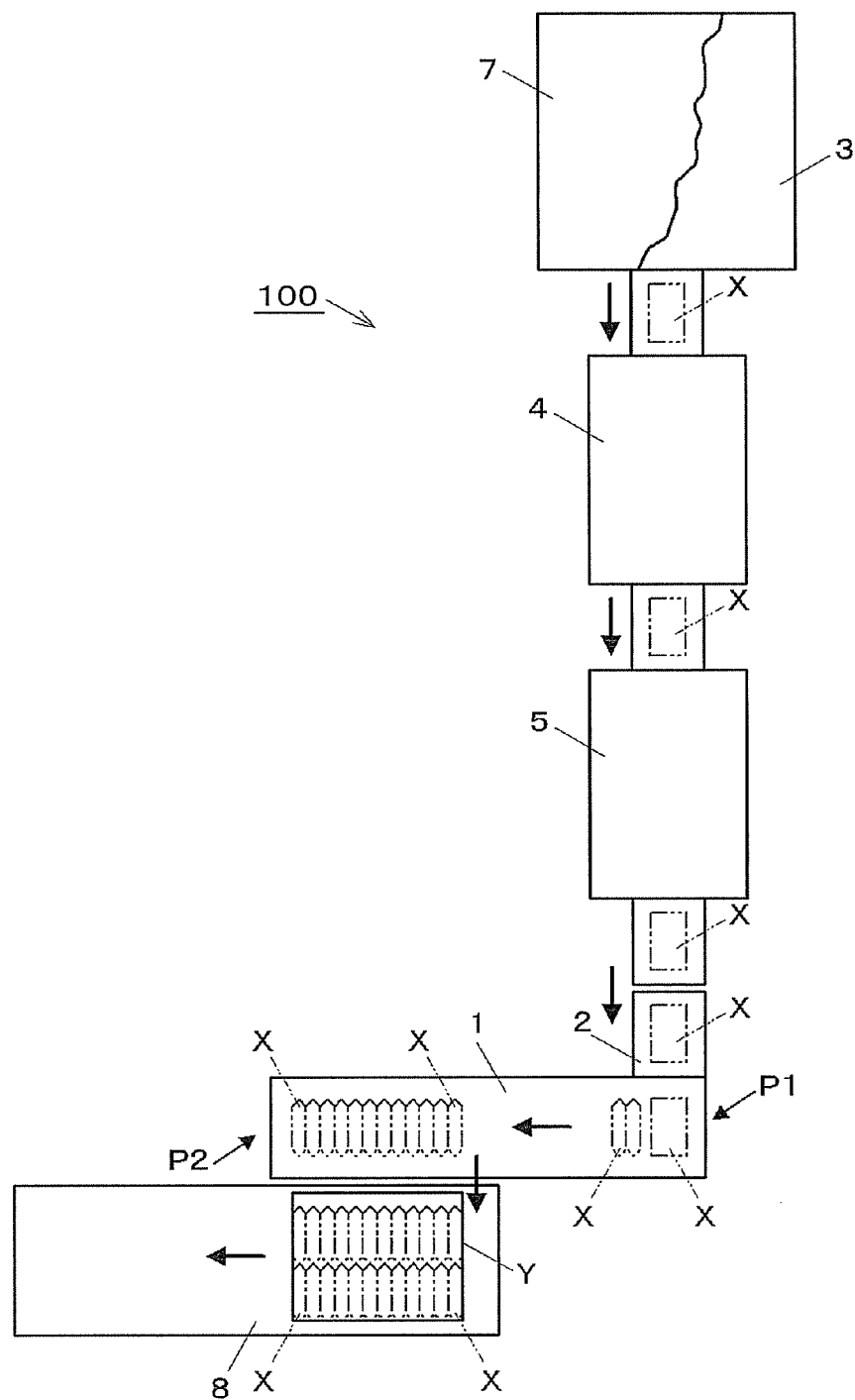
FIG. 21 is a schematic plan view of a boxing and packaging system according to a sixth embodiment of the present invention.

As shown in FIG. 21, the boxing and packaging system 100 is configured to pack a predetermined number of packaged articles X . . . X in a cardboard box Y. The boxing and packaging system 100 comprises, as main components, a combination weighing device 7 and a vertical bag manufacturing and packaging apparatus 3 which are disposed so as to face each other above and below, a seal checker 4, a weight checker 5, the carry-in conveyor 2, the conveyance apparatus 1, and a boxing device 8 in that order from the upstream side. Note that the article X is conveyed in the arrow direction as shown in the figure.

The combination weighing device 7 combines contents of supplied articles such as snack food and the like and weighs the contents until a predetermined weight of contents is collected. The bag manufacturing and packaging apparatus 3 vertically and transversely seals soft packaging material such as plastic film in order to package a predetermined weight of contents discharged from the combination weighing device 7 and to make a packaged article X.

The seal checker 4 checks quality of sealing condition of the article X received from the bag manufacturing and packaging apparatus 3 while conveying the same. The weight checker 5 weights the article X received from the seal checker 4 while conveying the same and checks the article X to see whether the article X is underweight or overweight.

The conveyance apparatus 1 receives the articles X, which are discharged from the weight checker 5 and conveyed through the carry-in conveyor 2, at the receiving point P1, places the articles X in the accumulation state, and conveys the articles X to the discharging point P2 for boxing. The structure of the conveyance apparatus 1 will be described below in detail.

The boxing device 8 packs the articles X . . . X in the accumulation state, which were discharged from the conveyance apparatus 1 at the discharging point P2, in the cardboard box Y. In the figure, the twelve articles X . . . X are boxed in two rows.

Figure 22:
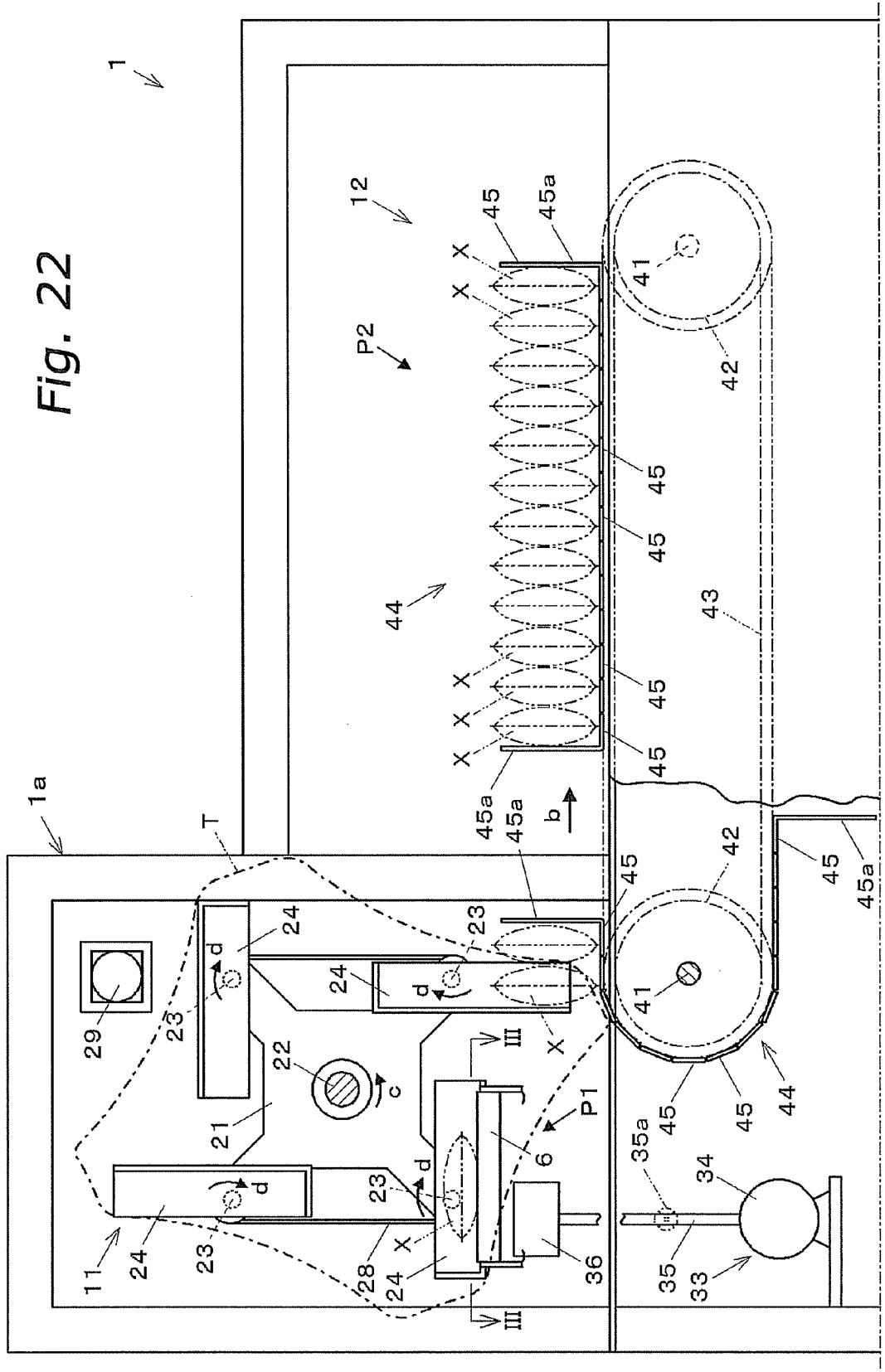
FIG. 22 is a lateral view of a conveyance apparatus according to the sixth embodiment.
Figure 23:
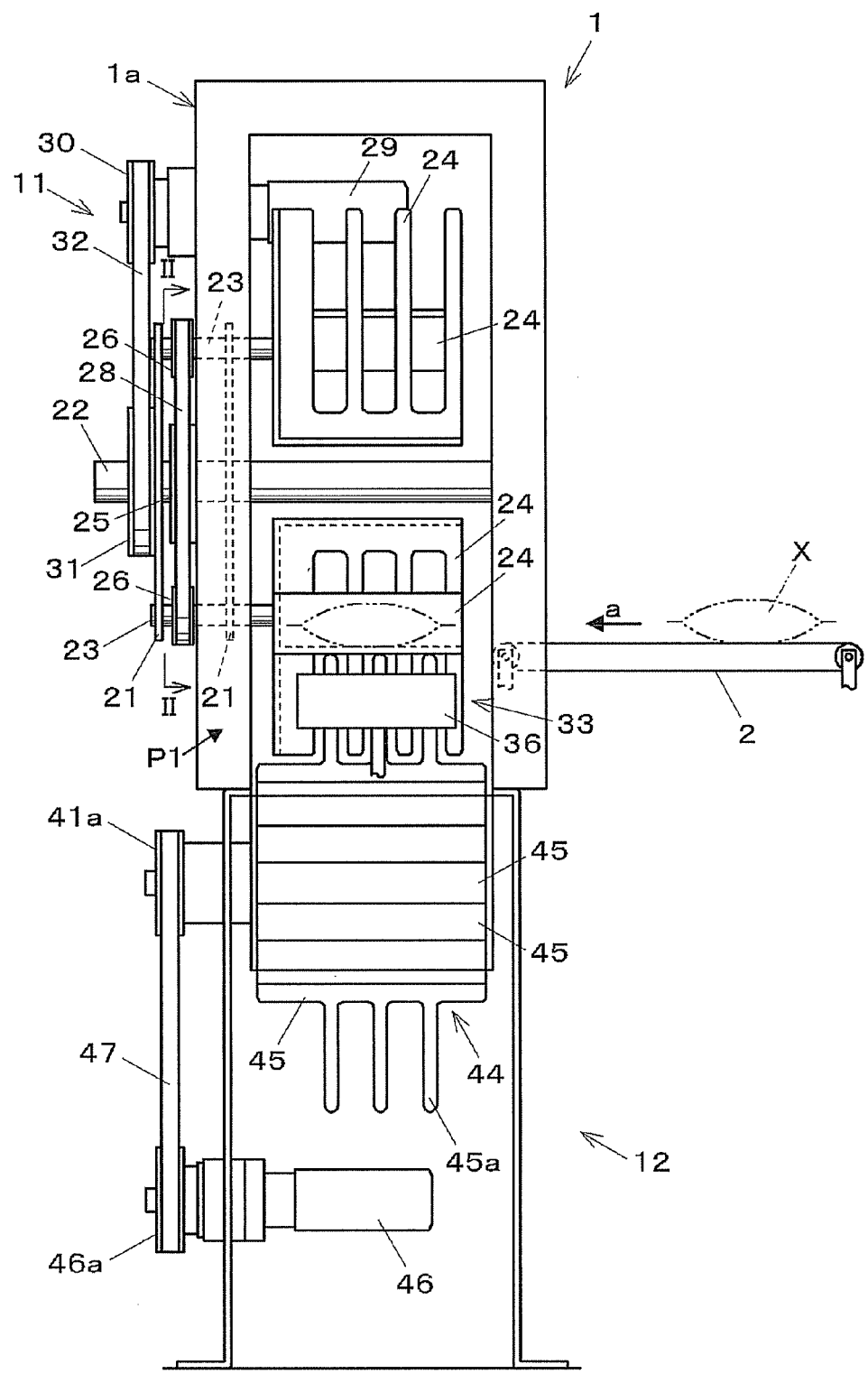
FIG. 23 is a plan view of the conveyance apparatus according to the sixth embodiment.
Figure 24:
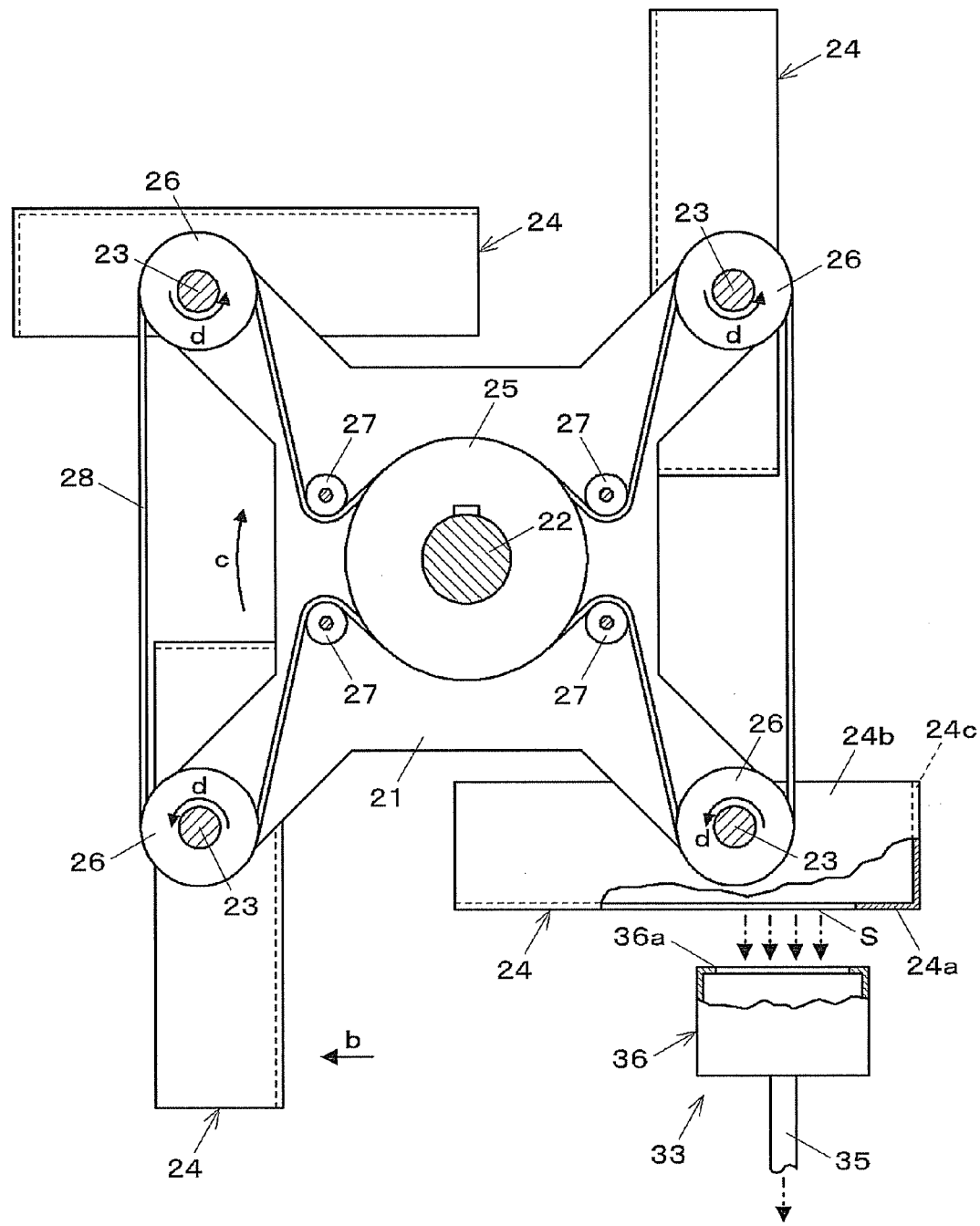
FIG. 24 is an enlarged sectional view of the main portion of the conveyance apparatus taken along line II-II of FIG. 23.
Figure 25:
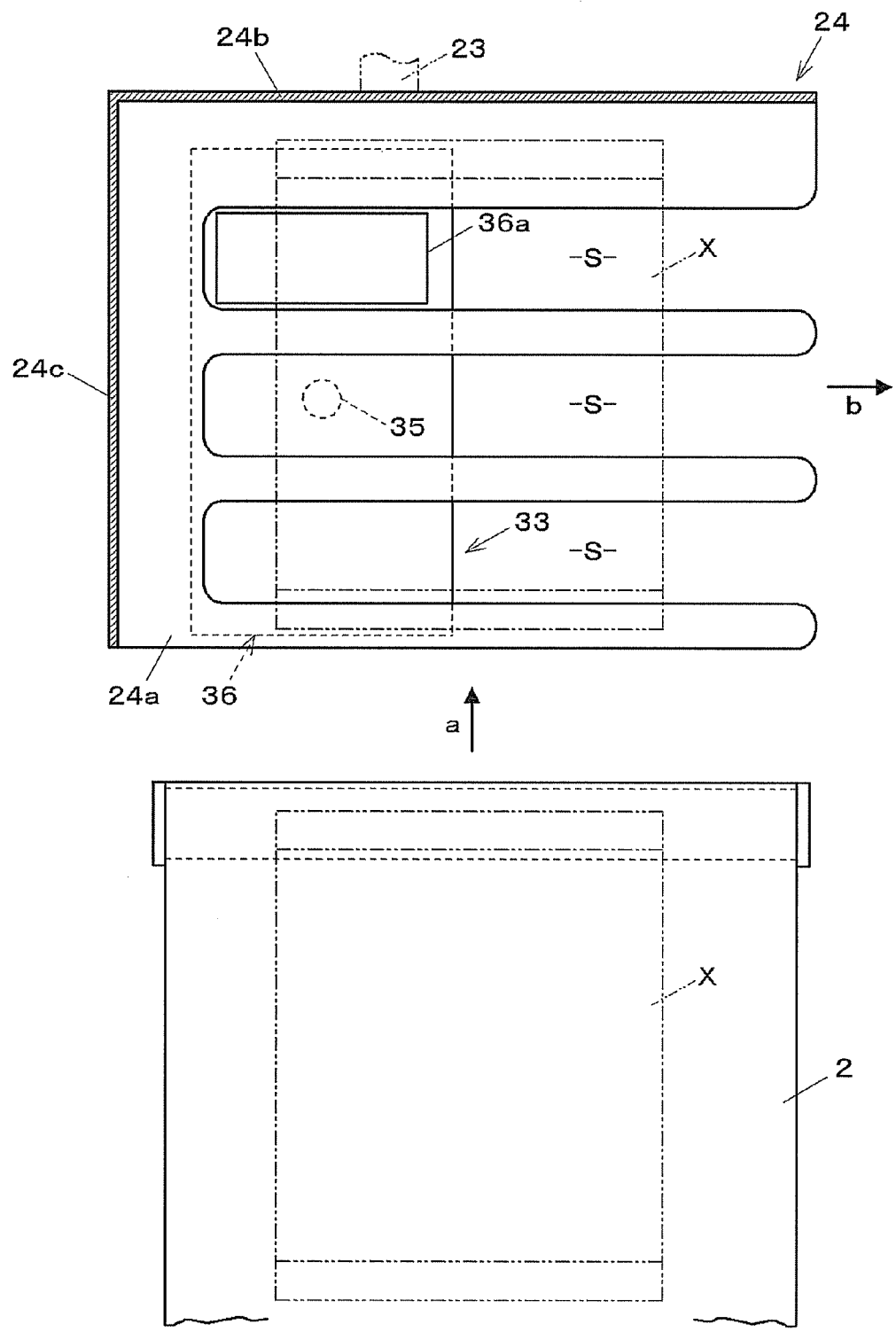
FIG. 25 is an enlarged sectional view of the main portion taken along line III-III of FIG. 22.

First, the conveyance apparatus 1 according to a sixth embodiment shown in FIGS. 22 and 23 is disposed on the downstream side of the flat belt type carry-in conveyor 2 that carries in the article X in the horizontal position to the receiving point P1 as shown by the arrow "a". The conveyance apparatus 1 includes the delivery device 11 that receives the article X from the carry-in conveyor 2 and delivers the same to the downstream side, and the accumulation and conveyance apparatus 12 that conveys the articles X . . . X delivered from the delivery device 11 in the accumulation state to the discharging point P2 as shown by the arrow "b".

Further, as shown in FIGS. 22 to 25, the conveyance apparatus 1 is provided with the suction mechanism 33 that holds the article X received by the delivery table 24 by suction on the loading surface 24a via a clearance space S.

The suction mechanism 33 includes a suction pump 34 supported by the main body case 1a, and a suction box 36 connected to the suction pump 34 via a pipe 35 and provided with a suction port 36a on the upper surface thereof. The suction box 36 is a stationary type, and is disposed at a position that is below the delivery table 24 at the receiving point P1 such that the suction box 36 does not interfere with the movement trajectory T of the delivery table 24 shown by the bold dashed line in FIG. 22. In addition, the suction port 36a is formed in a rectangular shape and is provided so as to face the clearance space S of the loading surface 24a of the delivery table 24, the clearance space S being located at the back side in the direction "a" in which the articles X are supplied from outside.

Next, the operation of this boxing and packaging system 100 will be described.

First, as shown in FIG. 21, the contents such as snack food and the like supplied from the upstream side are weighed until a predetermined weight of contents is collected by the combination weighing device 7, and discharged to the bag manufacturing and packaging apparatus 3 disposed below. The discharged contents become a packaged article X by the bag manufacturing and packaging apparatus 3, the packaged article X is supplied to two inspection devices on the downstream side. In other words, the seal checker 4 checks the quality of the seal of each article X, and an abnormal article will be discharged outside the conveying path. In addition, the weight checker 5 checks the article X to see whether the article X is underweight or overweight, and a defective article will also be discharged to the outside of the conveying path.

Then, the article X determined as a conforming article as a result of checks described above is supplied to the conveyance apparatus 1 via the carry-in conveyor 2. The articles X received by the conveyance apparatus 1 at the receiving point P1 are first accumulated to a predetermined number and then conveyed by the conveyance apparatus 1 to the discharging point P2.

The articles X . . . X in the accumulation state discharged from the conveyance apparatus 1 at the discharging point P2 are packed in the cardboard box Y by the boxing device 8. In other words, first, the twelve articles X . . . X are pushed to the back of the empty cardboard box Y, and then twelve new articles X . . . X conveyed by the conveyance apparatus 1 will be pushed to the front of the cardboard box Y.

In such a case, with conveyance apparatus 1, as shown in FIGS. 22 and 23, when the packaged articles X in the horizontal position are supplied from the carry-in conveyor 2 on the upstream side in the arrow "a" direction, the delivery table 24 of the delivery device 11 receives the articles X one by one at the receiving point P1, moves each article X to the standing position, and delivers the articles X to the bucket 44 of the accumulation and conveyance apparatus 12 in the arrow "b" direction.

In other words, as shown in FIG. 26A, for example, four articles $X_1$, $X_2$, $X_3$, $X_4$ are already held in a state of being accumulated in the standing position in the bucket 44 to be transferred in the arrow "b" direction, and the article $X_4$ at the rearmost end is securely held from behind by the preceding delivery table $24_1$ in the standing position. In addition, a new article $X_5$ is supplied to the following delivery table $24_2$ in the horizontal position. The remaining delivery tables $24_3$, $24_4$ are in a positional relationship as shown in the figure. Note that, in FIGS. 26A to 26F, each delivery table 24 and each article X are denoted by specific reference numerals, in order to clearly show the movement of the delivery table 24 which rotates in a clockwise direction as shown by the arrow "d" and which also moves around the fixed shaft 22 in a counterclockwise direction as shown by the arrow "c".

In such a case, the suction box 36 is provided below the delivery table $24_2$ at the receiving point P1, and the suction box 36 is constantly sucked by the suction pump 34. Therefore, the supplied article $X_5$ is held by suction on the delivery table $24_2$.

Then, as shown in FIG. 26B, the delivery table $24_1$ that was holding the article $X_4$ at the rearmost end in the bucket 44 from behind starts moving upward, and the delivery table $24_2$ that holds the new article $X_5$ starts moving to the standing position and moving closer to the bucket 44. Then the delivery table $24_2$ starts moving away from the suction box 36, and therefore the suction power will gradually stop being applied to the article $X_5$.

Then, as shown in FIG. 26C, the delivery table $24_1$ that was holding the article $X_4$ at the rearmost end in the bucket 44 completes moving upward, and the delivery table $24_2$ that holds the new article $X_5$ further moves to the standing position and moves closer to the bucket 44. In such a case, the delivery table $24_2$ moves away from the suction box 36 by a great distance, so that the suction power will not be applied to the article $X_5$ held on the delivery table $24_2$, which will release the article X from being held by suction. Consequently, the article $X_5$ will start sliding in the direction of the bucket 44.

Then, as shown in FIG. 26D, when the delivery table $24_2$ that holds the new article $X_5$ moves further closer to the bucket 44, the article $X_5$ lands in the bucket 44 while moving to the standing position and lies behind the article $X_4$.

Then, as shown in FIG. 26E, the delivery table $24_2$ further moves to the standing position, holds the back of the article $X_5$ that has landed in the bucket 44, and moves the article $X_5$ to the standing position. At the same time, the delivery table $24_2$ moves forward and orderly places the article $X_5$ on the front in the bucket 44. On the other hand, a delivery table $24_3$ that follows this delivery table $24_2$ starts moving to the horizontal position in order to prepare to receive the next new article X.

Then, as shown in FIG. 26F, the five articles $X_1$ to $X_5$ are held in the standing position by being held from behind by the delivery table $24_2$ in the bucket 44. The delivery table $24_3$ in the horizontal position has a new article $X_6$ that is supplied thereto. In such a case, the suction power via the suction box 36 will be applied to the supplied article $X_6$, and consequently the article $X_6$ will be held by suction on the delivery table $24_3$.

In this way, the delivery device 11 of this conveyance apparatus 1 is provided with the four delivery tables $24_1$ to $24_4$, and these delivery tables $24_1$ to $24_4$ can receive the article X each taking turns. As a result, the accumulation of the articles X at the receiving point P1 will be accelerated. Note that, during the series of the operation, as shown in FIGS. 26A to 26F, the delivery tables $24_1$ to $24_4$ will not interfere with the stationary suction box 36.

When the twelve articles X . . . X are accumulated in the bucket 44 through the repetition of the above-described operation, the bucket 44 will be transferred to the discharging point P2, and the other empty bucket 44 will arrive the receiving point P1. Consequently, while the articles X . . . X are discharged from one bucket 44 at the discharging point P2, new articles X . . . X are supplied to the other bucket 44 at the receiving point P1. As a result, the accumulation and discharging of the articles X will be accelerated.

Being constructed as described above, the delivery table 24 first rotates in a direction of the standing position when the delivery table 24 receives the article X supplied from outside at the receiving point P1, which will consequently move the article X to the standing position, and the article X will be delivered to the bucket 44.

In such a case, the article X that was received by the delivery table 24 from outside is held by suction by the suction mechanism 33 on the loading surface 24a, consequently preventing the article X from rotating, slipping, or jumping on the loading surface 24a. Therefore, the article X will be received in a stable position at the receiving point P1, which as a result will achieve the conveyance apparatus 1 in which the accumulation position of the articles X will not be disturbed.

In addition, the suction box 36 of the suction mechanism 33 can be fixed at a position that is below the delivery table 24 at the receiving point P1 such that the suction box 36 does not interfere with the movement trajectory of the delivery table 24. Consequently, the sucking and holding operation can be achieved with a relatively simple structure.

In addition, the suction pump 34 constantly sucks the suction box 36, so that the troublesome control of suction is unnecessary. Further, when the delivery table 24 is positioned at the receiving point P1 and receives the article X from outside, the suction power by the suction box 36 will be applied to the loading surface 24a and the article X will be held by suction. Meanwhile, the further away the delivery table 24 moves from the receiving point P1, the less the suction power by the suction box 36 is applied to the loading surface 24a, which will release the article from being held by suction. Consequently, the delivery of the article X from the delivery table 24 to the bucket 44 will be smoothly conducted.

Incidentally, according to this embodiment, the suction port 36a of the suction box 36 is provided so as to be positioned on the loading surface 24a of the delivery table 24, specifically at the back side in the direction "a" in which the articles X are supplied. When the suction port 36a of the suction box 36 is provided so as to be positioned on the loading surface 24a of the delivery table 24 specifically at the front side in the direction "a" in which the articles X are supplied, especially a light article X supplied from outside may not be held at an appropriate position on the loading surface 24a because such an article may be stopped at the front of the loading surface 24a. However, with the structure of the present conveyance apparatus, the supplied article X will be stopped and held by suction only when the article X reaches the back of the loading surface 24a, therefore the above-described problem will be effectively eliminated.

The boxing and packaging system 100 can achieve the same effect as obtained with the conveyance apparatus 1 described above.

Here, a modified example of the sixth embodiment will be described.

The structure of the conveyance apparatus 1 in this case is fundamentally the same as the structure shown in FIG. 22. Here, the conveyance apparatus 1 comprises the delivery device 11 coupled to the carry-in conveyor 2, and the accumulation and conveyance apparatus 12 having the bucket 44 on the downstream side. In addition, the suction mechanism 33 is provided thereto. The suction mechanism 33 is disposed at a position that is below the delivery table 24 at the receiving point P1 such that the suction mechanism 33 does not interfere with the movement trajectory T of the delivery table 24. As shown in FIG. 22, a solenoid valve 35a shown by the two-dot chain line is provided in the midway of the pipe 35 that connects the suction pump 34 to the suction box 36.

Figure 27:
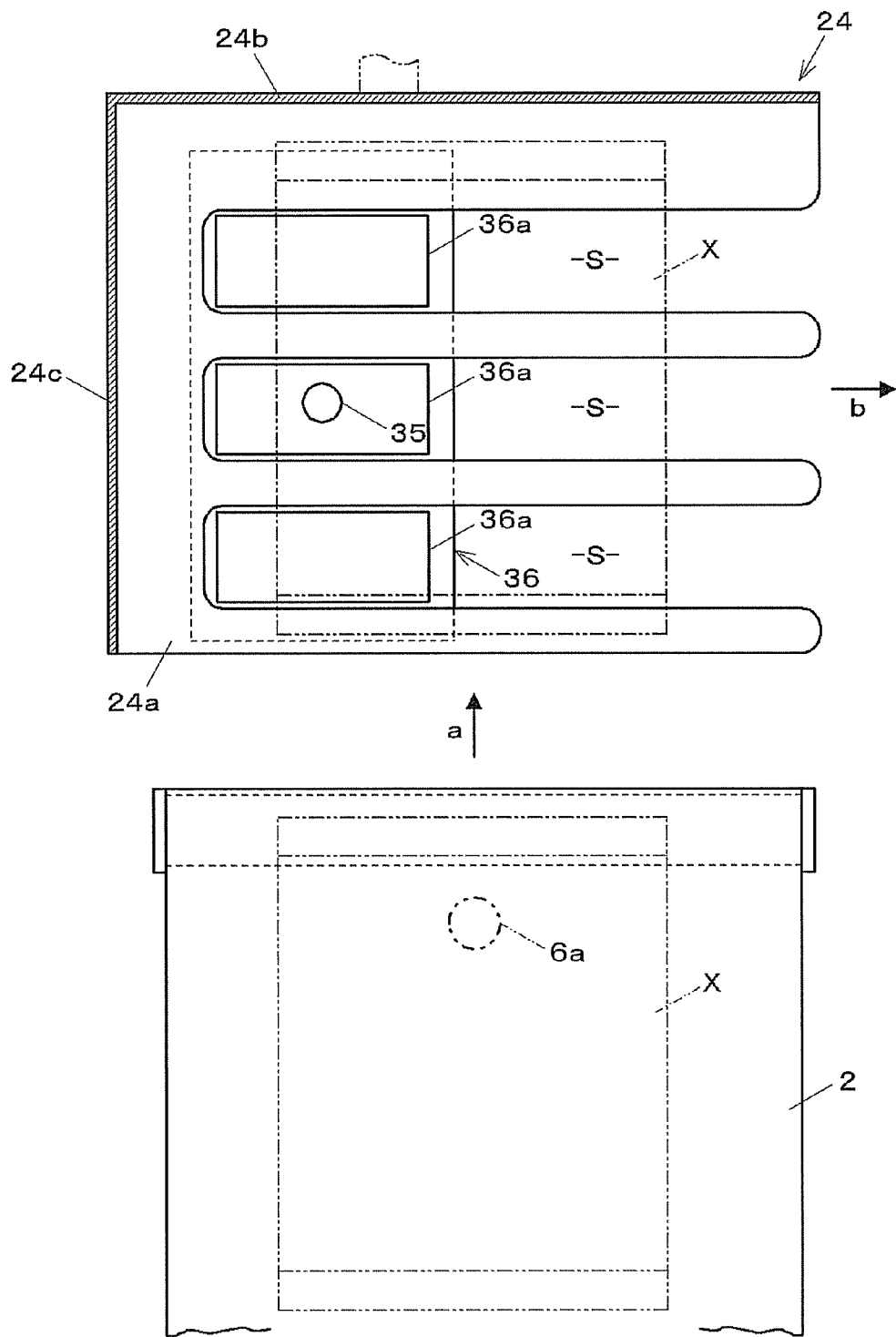
FIG. 27 is a view corresponding to FIG. 25, and shows the structure of a suction box of a conveyance apparatus according to a modified example of the sixth embodiment.

In addition, as shown in FIG. 27, the suction box 36 connected to the pipe 35 is provided with the three rectangular shaped suction ports 36a . . . 36a over substantially the whole surface of the side thereof, which faces the underside of the delivery table 24 having a loading surface 24a, a mounting wall 24b, and a jump-out prevention wall 24c. In other words, in the figure, the suction ports 36a . . . 36a are provided so as to face three clearance spaces S . . . S of the loading surface 24a in a comb shape of the delivery table 24. Further, an article detection sensor 6a that detects the article X is provided above the vicinity of the end portion of the carry-in conveyor 2 on the downstream side.

Figure 28:
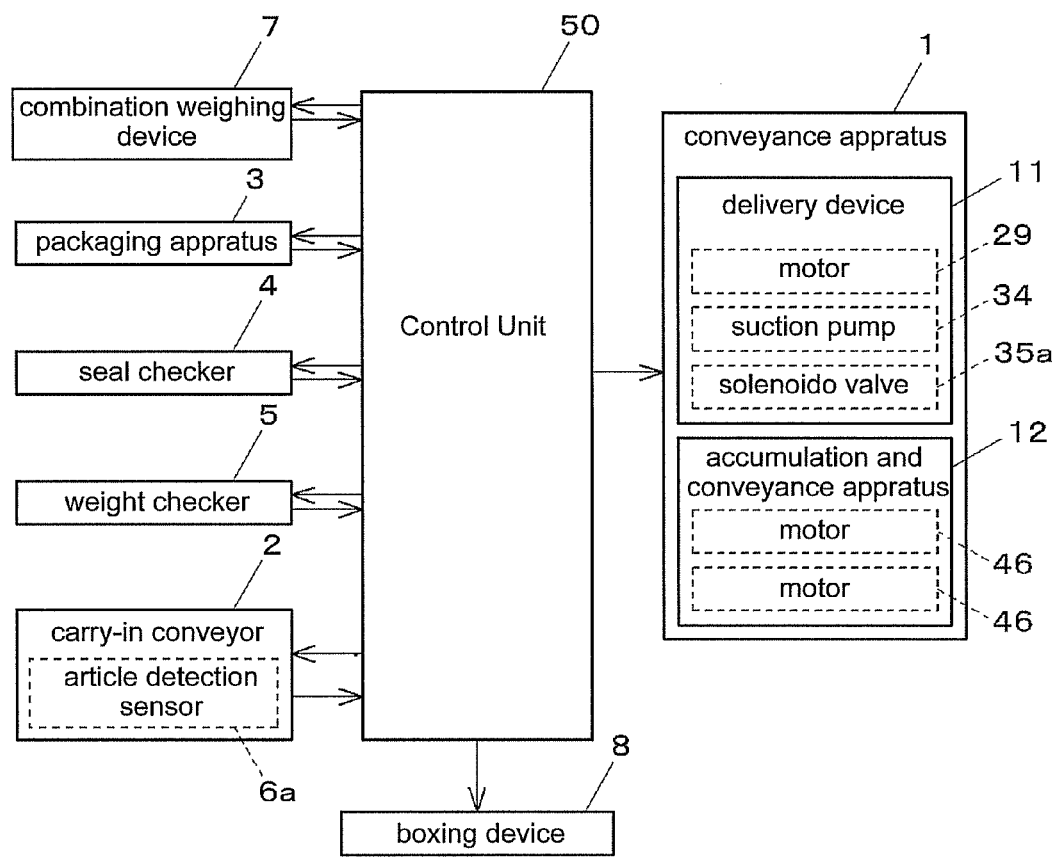
FIG. 28 shows a control block diagram.

Also, as shown in FIG. 28, there is provided a control unit 50 that comprehensively controls this boxing and packaging system 100. The control unit 50 transmits and receives a signal to and from the combination weighing device 7, the bag manufacturing and packaging apparatus 3, the seal checker 4, and the weight checker 5. In addition, the control unit 50 outputs a control signal to the carry-in conveyor 2, and a detection signal from the article detection sensor 6a is input to the control unit 50. In addition, the control unit 50 outputs a control signal to the motor 29 for rotating the delivery device 11, and the suction pump 34 and the solenoid valve 35a of the suction mechanism 33, which are included in the conveyance apparatus 1. In addition, the control unit 50 outputs a control signal to the conveying motors 46, 46 of the accumulation and conveyance apparatus 12. The control unit 50 outputs a control signal to the boxing device 8.

The operation of this conveyance apparatus 1 will be described focusing on only the relevant portions thereof. As shown in FIG. 27, when the article X is supplied from the carry-in conveyor 2 in the arrow "a" direction, the delivery table 24 receives the articles X one by one, rotates in a direction of the standing position to move the articles X to the standing position, and delivers the articles X in the accumulation state to the accumulation and conveyance apparatus 12 in the arrow "b" direction.

In such a case, the control unit 50 that received an input of a detection signal from the article detection sensor 6a will output a control signal so as to open the solenoid valve 35a provided in the midway of the pipe 35 that connects the suction pump 34 in constant operation to the suction box 36, at a timing, for example, when the article X is located on the loading surface 24a of the delivery table 24 as shown by the two-dot chain line in FIG. 27. The article X on the loading surface 24a will be held by suction via the suction ports 36a . . . 36a and the clearance spaces S . . . S.

When the delivery table 24 rotates in a direction of the standing position to a predetermined angle, the suction power via the suction box 36 will not be applied to the article X, which consequently will release the article X from being held by suction. As a result, the article X held on the delivery table 24 will start sliding in the direction of the bucket 44. Note that when the delivery table 24 rotates to the predetermined angle, the control unit 50 outputs a control signal to close the solenoid valve 35a. This predetermined angel is, for example, the rotation angle of the delivery table $24_2$ shown in the FIG. 26C.

Being constructed as described above, also in this case, the article X that was received by the delivery table 24 from outside is held by suction by the suction mechanism 33 on the loading surface 24a, consequently preventing the article X from rotating, slipping, or jumping on the loading surface 24a. Further, since the control unit 50 to the conveyance apparatus is provided, the timing of sucking and holding and the timing of releasing the suction will be precisely and accurately controlled.

The suction box 36 is provided with the suction ports 36a . . . 36a over substantially the whole surface of the side thereof, which faces the underside of the delivery table 24, so that the suction power will be applied to the article X over a wide range. As a result, the article X will be more reliably held by suction.

Note that the three suction ports 36a . . . 36a can be collected together as one suction port. In addition, instead of the opening and closing of the solenoid valve 35a, the driving of the suction pump 34 may be controlled.

Seventh Embodiment

Next, a conveyance apparatus according to a seventh embodiment will be described.

Figure 29:
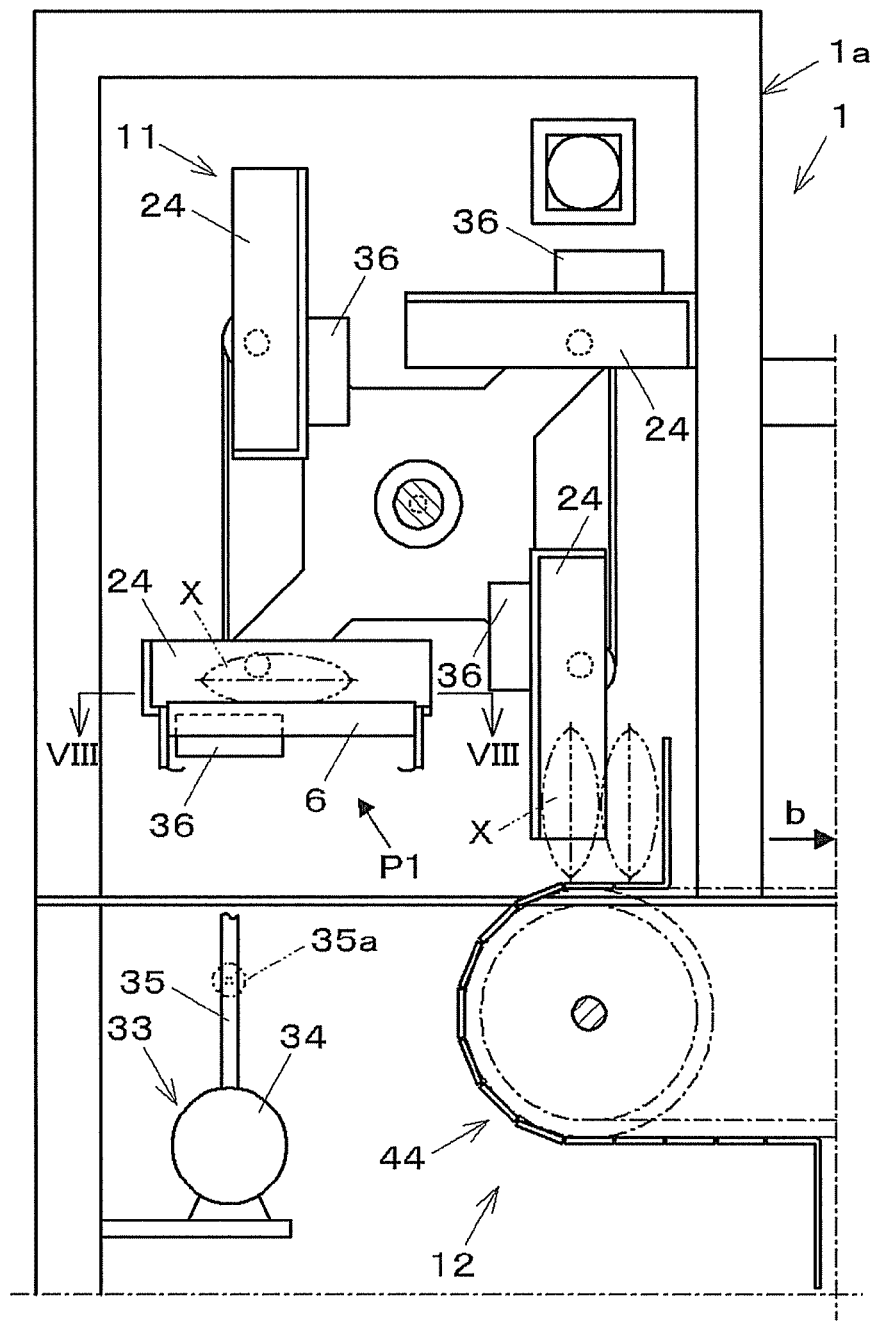
FIG. 29 shows a lateral view of the main portion of a conveyance apparatus according to a seventh embodiment.

As shown in FIG. 29 which selectively illustrates the relevant portions thereof, the structure of the conveyance apparatus 1 in this case is fundamentally the same as the structure shown in FIG. 22. Here, the conveyance apparatus 1 comprises the delivery device 11 on upstream side provided to the carry-in conveyor 2 in a connected row arrangement, and an accumulation and conveyance apparatus 12 having a bucket 44 on the downstream side. In addition, the suction mechanism 33 is provided thereto. The suction mechanism 33 includes the suction pump 34 supported by the main body case 1a, and the four suction boxes 36 . . . 36 connected to the suction pump 34 via the pipe 35. In such a case, the suction box 36 is integrally provided with the delivery table 24, and attached to the underside of the delivery table 24.

Figure 30:
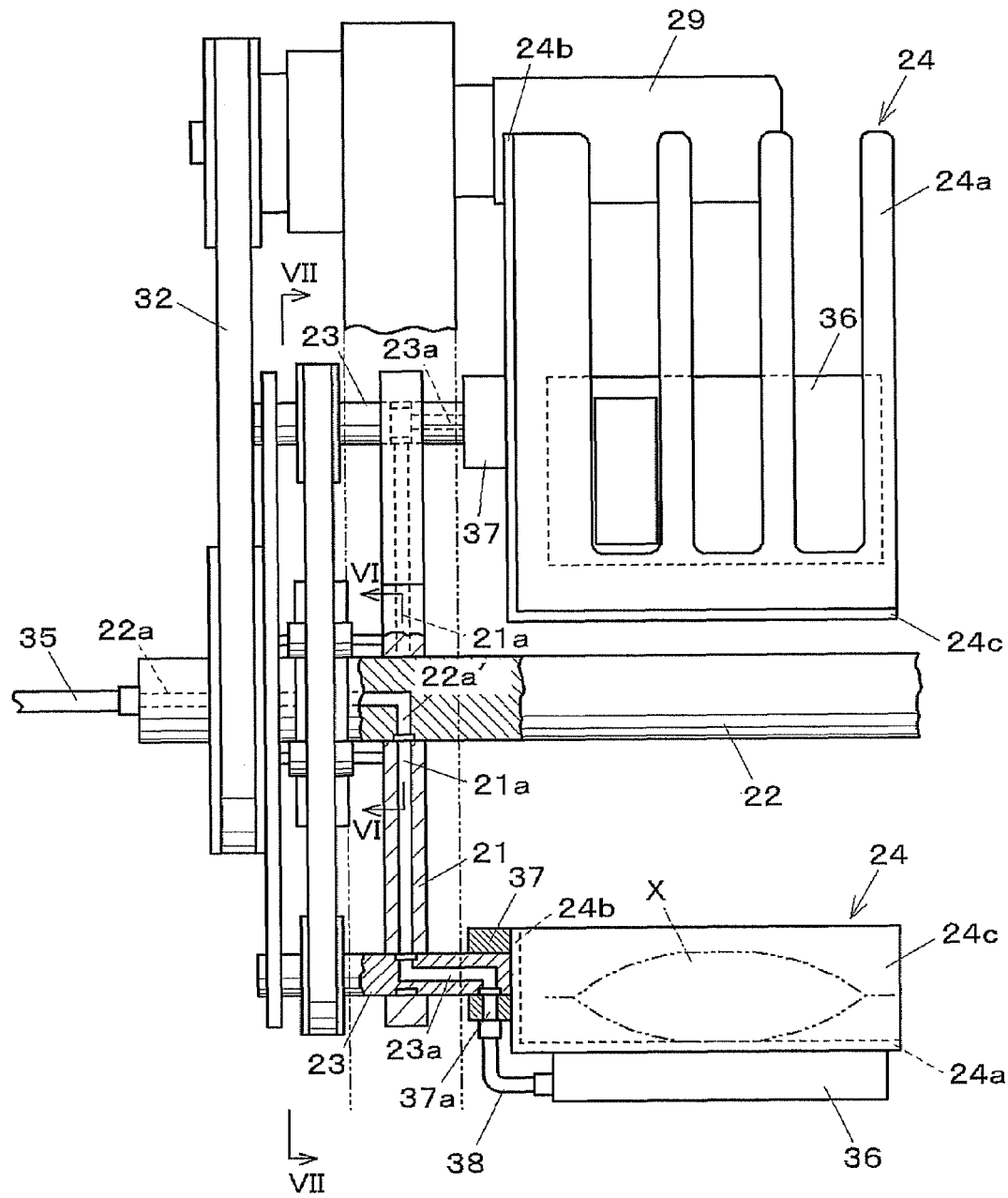
FIG. 30 is an enlarged plan view of the main portion of the conveyance apparatus according to the seventh embodiment, with portions thereof shown in cross-section.
Figure 31:
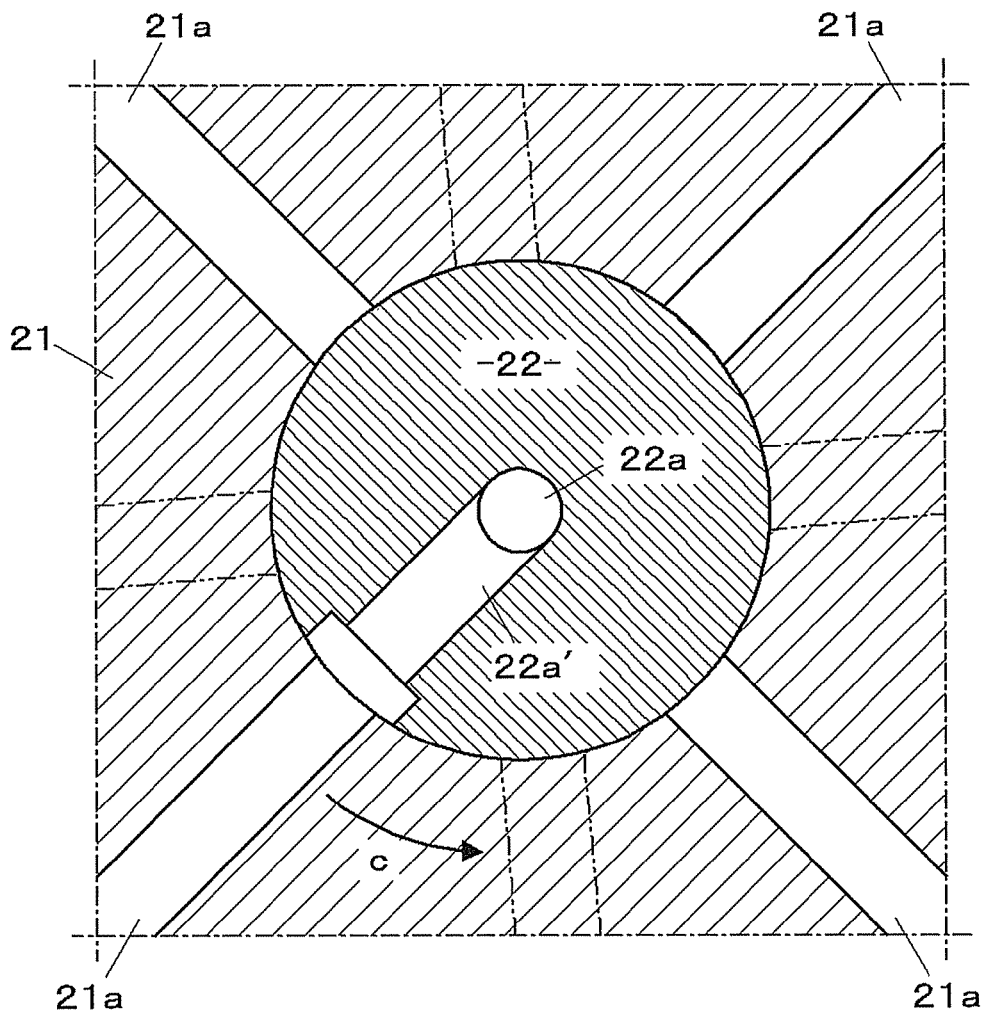
FIG. 31 is a sectional view of FIG. 30 taken along line VI-VI.
Figure 32:
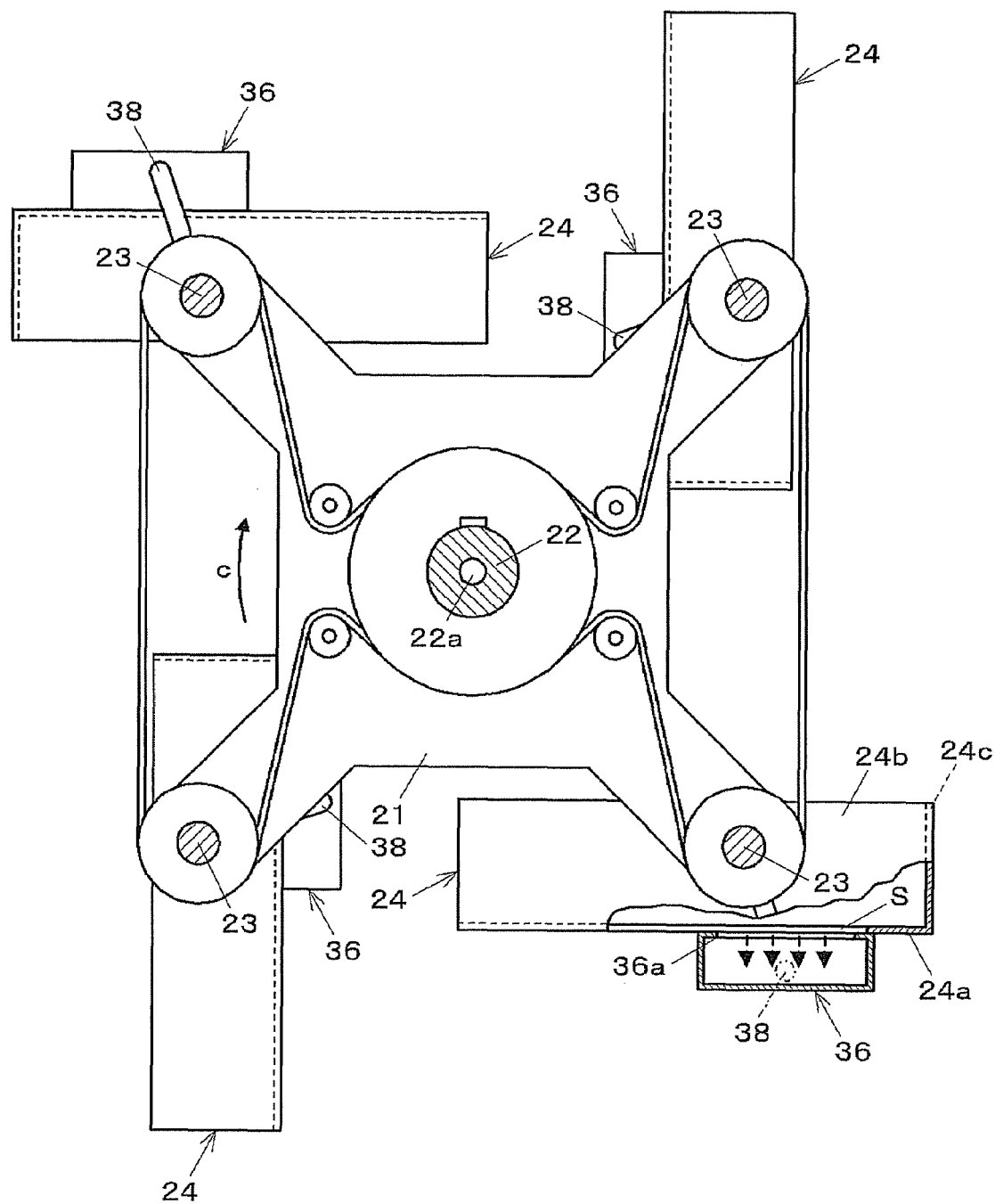
FIG. 32 is a sectional view of FIG. 30 taken along line VII-VII.

As shown in FIGS. 30 to 32, at the shaft center of the fixed shaft 22, there is provided a single passage 22a that extends to a portion where an inside support plate 21 freely rotatably supported by the fixed shaft 22 in the arrow "c" direction is provided. The passage 22a is provided with a single passage 22a' that extends in a radial direction from an end portion of the passage 22a on the inside support plate 21 side. In addition, the pipe 35 is connected to the passage 22a at an end portion thereof on the side of the timing belt 32 that transmits the driving force of the motor 29 to the fixed shaft 22. Also, the inside support plate 21 is provided with the four passages 21a . . . 21a that extend to the rotation shafts 23 . . . 23 of the delivery tables 24 . . . 24 such that the four passages 21a . . . 21a can communicate with the passage 22a only when a predetermined rotational position is achieved.

Figure 33:
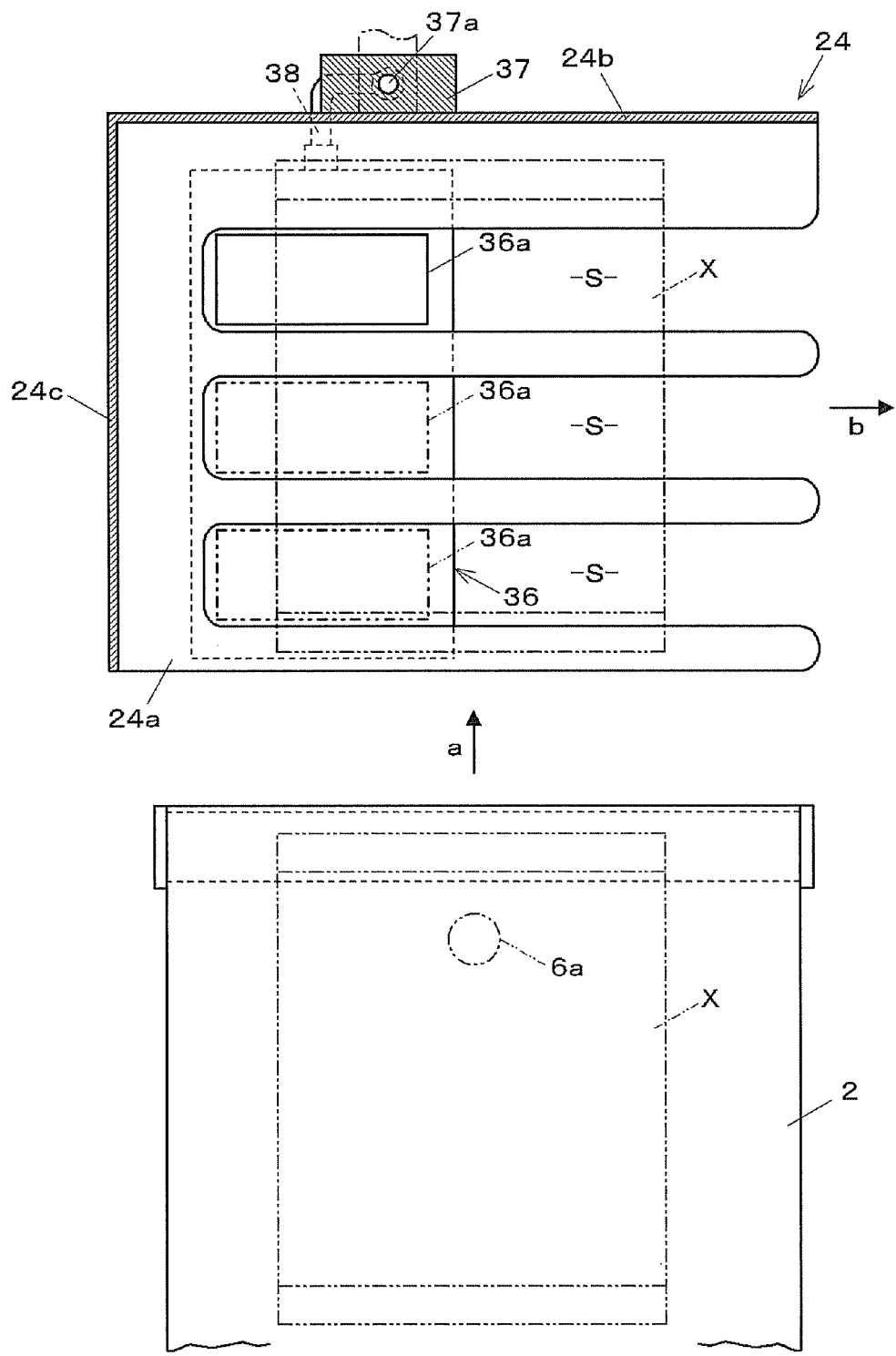
FIG. 33 is a sectional view of FIG. 29 taken along line VIII-VIII.

On the other hand, as shown in FIGS. 30, 32, and 33, a block member 37 through which each rotation shaft 23 penetrates is fixedly disposed on the outer side of the mounting wall 24b of each delivery table 24 having the loading surface 24a, the mounting wall 24b, and the jump-out prevention wall 24c. In addition, each rotation shaft 23 is provided with the passage 23a that extends to a block member 37 in the shaft direction from a portion where the inside support plate 21 is provided. The passage 23a is provided to the passage 21a via one end portion, and to the block member 37 via the other end portion, and is in communication with a passage 37a that extends along the mounting wall 24b. The passage 37a is coupled to the suction box 36 via a tube 38, and therefore the suction power by the suction pump 34 will be applied to the suction box 36 when the pipe 35, the passages 22a, 22a', 21a, 23a, 37a, and the tube 38 communicate one another, therefore holding the article X by suction.

As shown in FIGS. 32 and 33, the suction box 36 is provided with a single suction port 36a formed in a rectangular shape and provided so as to face the clearance space S of the loading surface 24a of the delivery table 24, the clearance space S being located at the back side in the direction "a" in which the articles X are supplied from outside.

The operation of this conveyance apparatus 1 will be described focusing on only the relevant portions thereof. As shown in FIGS. 29 and 33, when the article X in the horizontal position is supplied from the carry-in conveyor 2 in the arrow "a" direction, the delivery table 24 of the delivery device 11 receives the articles X one by one at the receiving point P1, moves the same to the standing position, and delivers the same to the bucket 44 of the accumulation and conveyance apparatus 12 in the arrow "b" direction.

Figure 34A:
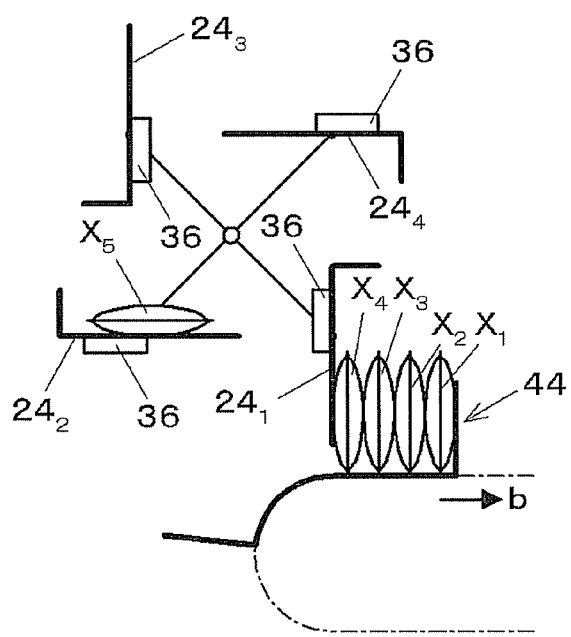
FIGS. 34A and 34B show schematic lateral views of the operation of the delivery table in a chronological order.

In other words, as shown in FIG. 34A, for example, four articles $X_1$, $X_2$, $X_3$, $X_4$ are already accumulated in the standing position in the bucket 44 to be transferred in the arrow "b" direction, and the article $X_4$ at the rearmost end is securely held from behind by the preceding delivery table $24_1$, in the standing position. In addition, a new article $X_5$ is supplied to the following delivery table $24_2$ in the horizontal position. The remaining delivery tables $24_3$, $24_4$ are in a positional relationship as shown in the figure.

In such a case, the suction box 36 is attached to the back side of each of the delivery tables $24_1$, $24_2$, $24_3$, $24_4$. Further, as shown in FIGS. 30 and 31, the following components: the single passage 22a provided to the fixed shaft 22 and connected to the pipe 35; the passage 22a' extendedly provided to the passage 22a; and the four passages 21a . . . 21a provided to the inside support plate 21 that rotates with respect to the fixed shaft 22 and in communication with the suction boxes 36 . . . 36 mounted to the four delivery tables 24 . . . 24; are constructed so as to be able to communicate with one another only when a predetermined rotational position is achieved.

Thereby, a mechanical passage opening and closing mechanism that communicates the suction pump 34 and the specific single suction box 36 or blocks the communication therebetween is formed. In the figure, the suction pump 34 and the suction box 36 of the lower delivery table 24 (the delivery table $24_2$ in FIG. 34A) in the horizontal position at the receiving point P1 are in a communication state.

Therefore, the suction power by the suction pump 34 is applied to the specific single suction box 36 via the pipe 35, the passages 22a, 22a', 21a, 23a, 37a, and the tube 38, and the article $X_5$ supplied will be held by suction on the delivery table $24_2$.

Figure 34B:
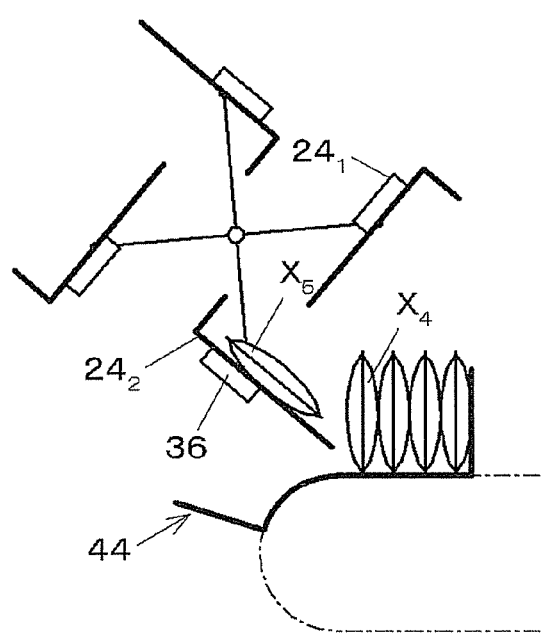

Then, as shown in FIG. 34B, the delivery table $24_1$ that was holding the article $X_4$ at the rearmost end in the bucket 44 completes moving upward, and the delivery table $24_2$ that holds the new article $X_5$ further moves to the standing position and moves closer to the bucket 44. In such a case, as shown by the two-dot chain line in FIG. 31, when the support plate 21 rotates about the fixed shaft 22 in the arrow "c" direction, the communication state between the passages 22a, 22a' and a specific single passage 21a will be cut off, so that the suction power by the suction pump 34 will not be applied to the suction box 36 of the delivery table $24_2$, which will release the article X from being held by suction. As a result, the article $X_5$ held by the delivery table $24_2$ will start sliding in the direction of the bucket 44.

Being constructed as described above, also in this case, the article X that was received by the delivery table 24 from outside is held by suction by the suction mechanism 33 on the loading surface 24a, consequently preventing the article X from rotating, slipping, or jumping on the loading surface 24a. Further, since the suction box 36 of the suction mechanism 33 is attached to the delivery table 24, the article X will be more reliably held by suction on the loading surface 24a of the delivery table 24.

In addition, the passage opening and closing mechanism comprising the passage 22a' and the passage 21a . . . 21a which communicate the suction pump 34 and the suction box 36 or blocks the communication therebetween is provided in the midway of the passages 22a, 22a', 21a, 23a, 37a which connect the suction pump 34 to the suction box 36. Consequently, sucking and holding, and releasing the suction will be achieved with a relatively simple mechanical structure.

The suction port 36a of the suction box 36 is provided so as to be positioned on the loading surface 24a of the delivery table 24, specifically at the back side in the direction in which the articles X are supplied, so that the supplied article X will be stopped only when the article X reaches the back of the loading surface 24a and held at an appropriate position.

Here, a modified example of a seventh embodiment will be described.

As shown by the two-dot chain line in FIG. 29, the conveyance apparatus 1 in this case has the solenoid valve 35a provided in the midway of the pipe 35 in the suction mechanism 33 having the suction pump 34, the pipe 35, and the suction box 36. Further, as shown by the solid line and the two-dot chain line in FIG. 33, the suction box 36 is provided with the three rectangular shaped suction port 36a . . . 36a over substantially the whole surface of the side thereof, which faces the underside of the delivery table 24.

Figure 35:
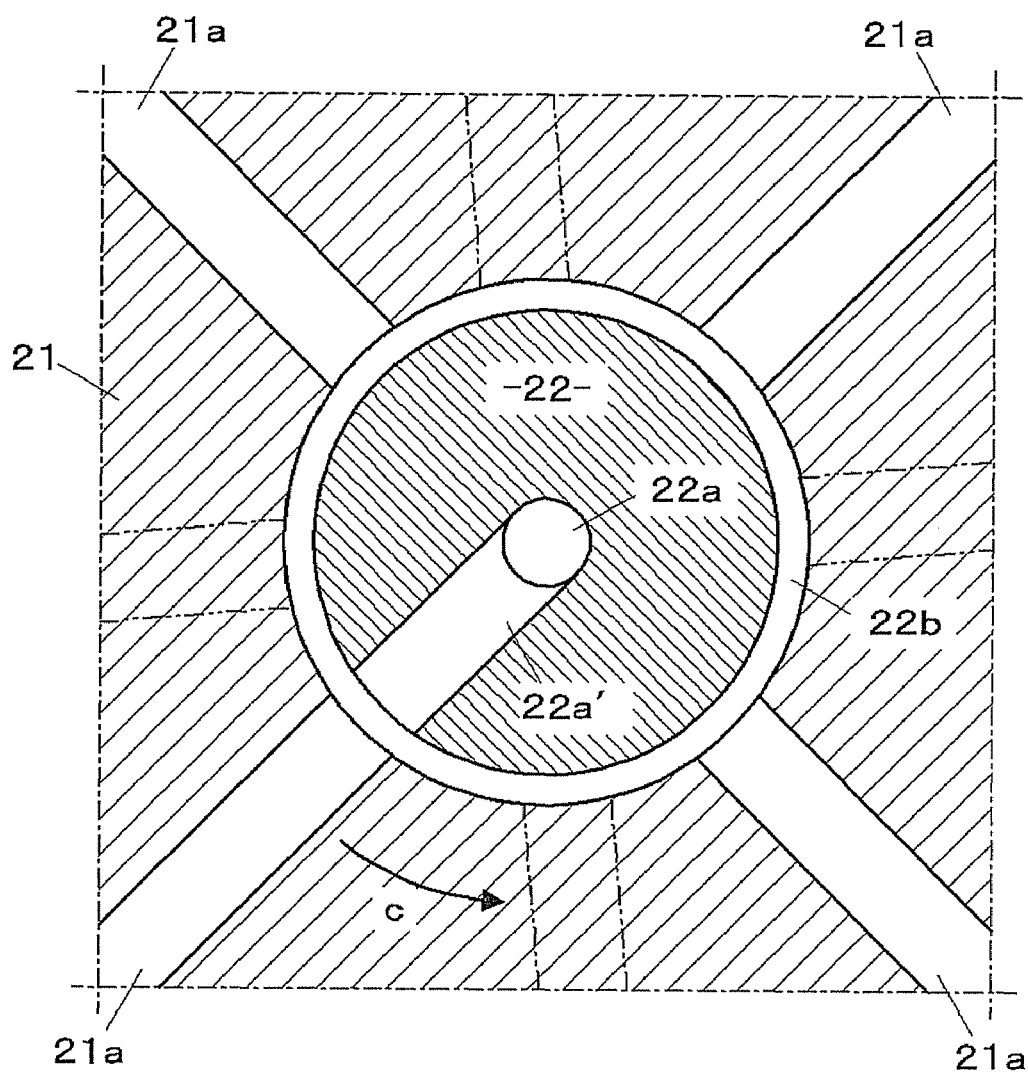
FIG. 35 is a sectional view corresponding to FIG. 31, and shows a conveyance apparatus according to a modified example of the seventh embodiment.

In addition, as shown in FIG. 35, at the shaft center of the fixed shaft 22, there is provided the single passage 22a that extends to a portion where the inside support plate 21 freely rotatably supported by the fixed shaft 22 in the arrow "c" direction is provided. Also, a peripheral groove 22b is provided at the periphery of a portion where the inside support plate 21 is provided. Further, the passage 22a' extending in a radial direction of the fixed shaft 22 and connecting the passage 22a to the peripheral groove 22b is extendedly provided. The inside support plate 21 is provided with the four passages 21a . . . 21a which communicate with the peripheral groove 22b and extend to the rotation shafts 23 . . . 23 of the delivery tables 24 . . . 24. Accordingly, the passages 22a, 22a' and the passage 21a are constantly in a communication state regardless of the rotational position of the support plate 21 that rotates in the arrow "c" direction.

Further, as shown by the two-dot chain line in FIG. 33, the article detection sensor 6a is provided above the vicinity of the end portion of the carry-in conveyor 2 on the downstream side. Also, a control unit 50 same as the one shown in FIG. 28 is provided.

The operation of this conveyance apparatus 1 will be described focusing on only the relevant portions thereof. The article X is received and delivered in the same way as shown in FIGS. 34A and 34B. However, in this case, the control unit 50 that received an input of a detection signal from the article detection sensor 6a will output a control signal so as to open the solenoid valve 35a provided in the midway of the pipe 35 that connects the suction pump 34 in constant operation to the suction box 36, at a timing, for example, when the article $X(X_5)$ is located on the loading surface 24a of the delivery table 24($24_2$), as shown in FIG. 33. As a result, via the passages 22a, 22a', 21a that are constantly in a communication state, the suction power of the suction pump 34 will be applied to the suction box 36, and the article $X(X_5)$ on the loading surface 24a will be held by suction.

Then, when the delivery table 24($24_2$) rotates to the predetermined angle in a direction of the standing position, the control unit 50 outputs a control signal to close the solenoid valve 35a. As a result, the communication between the suction pump 34 and the suction box 36 will be blocked, so that the suction power by the suction pump 34 will not be applied to the article $X(X_5)$ which will release the article $X(X_5)$ from being held by suction. Consequently, the article $X(X_5)$ will start sliding in the direction of the bucket 44. Note that this predetermined angel is, for example, the rotation angle of the delivery table $24_2$ shown in the FIG. 36C.

As described above, the timing of sucking and holding and the timing of releasing the suction will be precisely and accurately controlled as a result of providing the control unit 50 to the conveyance apparatus.

The suction box 36 is provided with suction ports 36a . . . 36a over substantially the whole surface of the side thereof, which faces the underside of the delivery table 24, so that the suction power will be applied to the article X over a wide range. As a result, the article X will be more reliably held by suction.

Eighth Embodiment

Next, an eighth embodiment will be described.

Figure 36A:
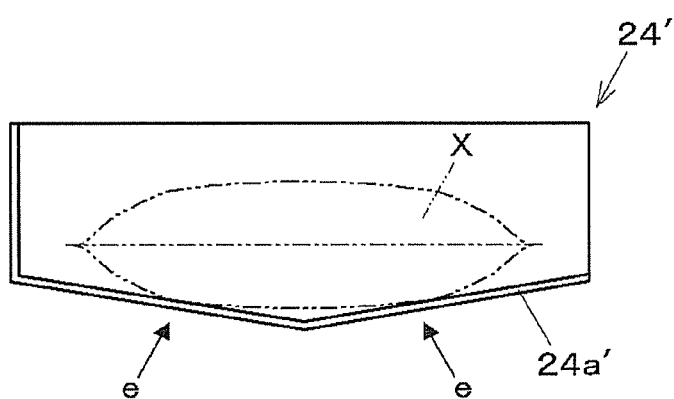
FIGS. 36A and 36B show lateral views of a delivery table having a concave loading surface formed in a conveyance apparatus according to an eighth embodiment.
Figure 36B:
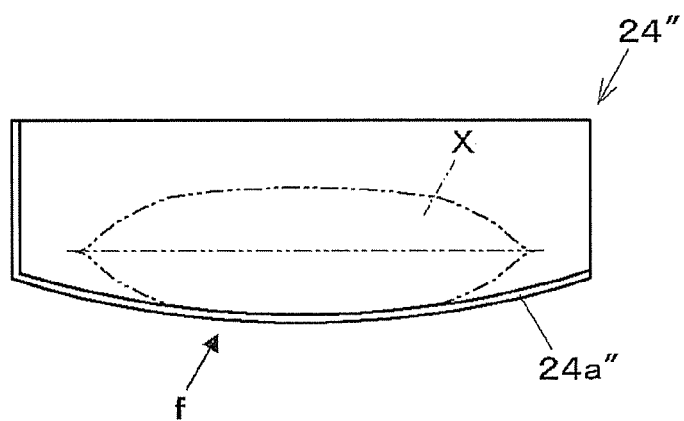

As shown in FIG. 36, the delivery tables 24', 24" in this case have the concavely formed loading surfaces 24a', 24a" respectively. In other words, the loading surface 24a' of the delivery table 24' shown in FIG. 36A is formed in a shallow V-shape. On the other hand, the loading surface 24a" of the delivery table 24" shown in FIG. 36B is formed in a curved shape.

When the article X is a packaged article that is inflated in the center, the loading surface 24a of the delivery table 24 is in a flat shape, the contact area between the delivery table 24 and the article X received by the delivery table 24 is small, and therefore the position of the article X on the delivery table 24 may be unstable. However, as described above, the loading surface 24a', 24a" of the delivery table 24', 24" are concavely formed when viewed from the direction "a" in which the articles are supplied. Therefore, as shown by the arrows e, f, the contact portion and the contact area between the article X and the delivery table 24', 24" will definitely become larger. As a result, the article X will be favorably gripped on the delivery table 24', 24", so that the above-described problem will be reliably eliminated.

Note that the present invention is not limited to the embodiments described in detail above, and various modifications and variations can be made which fall within the spirit and scope of the invention.

For example, the suction port 36a according to the sixth and the seventh embodiments is singly provided in a rectangular shape. However, this suction port 36a may be divided into plural pieces, and the shape is not limited to the rectangular shape.

In addition, according to the modified example of the sixth embodiment and the modified example of the seventh embodiment, the suction box 36 is provided with the three suction ports 36a . . . 36a over substantially the whole surface of the side thereof, which faces the underside of the delivery table 24. However, there may on only one suction port 36a at the back side of the suction box 36.

In addition, the accumulation and conveyance apparatus 12 is provided with the four-looped endless chains 43 . . . 43 and the pair of buckets 44, 44. However, additional endless chains and the buckets may be provided.

Also, with the above described embodiment, the accumulated articles X . . . X are packed in the cardboard box Y by the boxing device 8. However, the accumulated articles X . . . X may be packed in a large bag by a packaging apparatus.

Ninth Embodiment

Another embodiment to carry out the present invention will be described.

Figure 37:
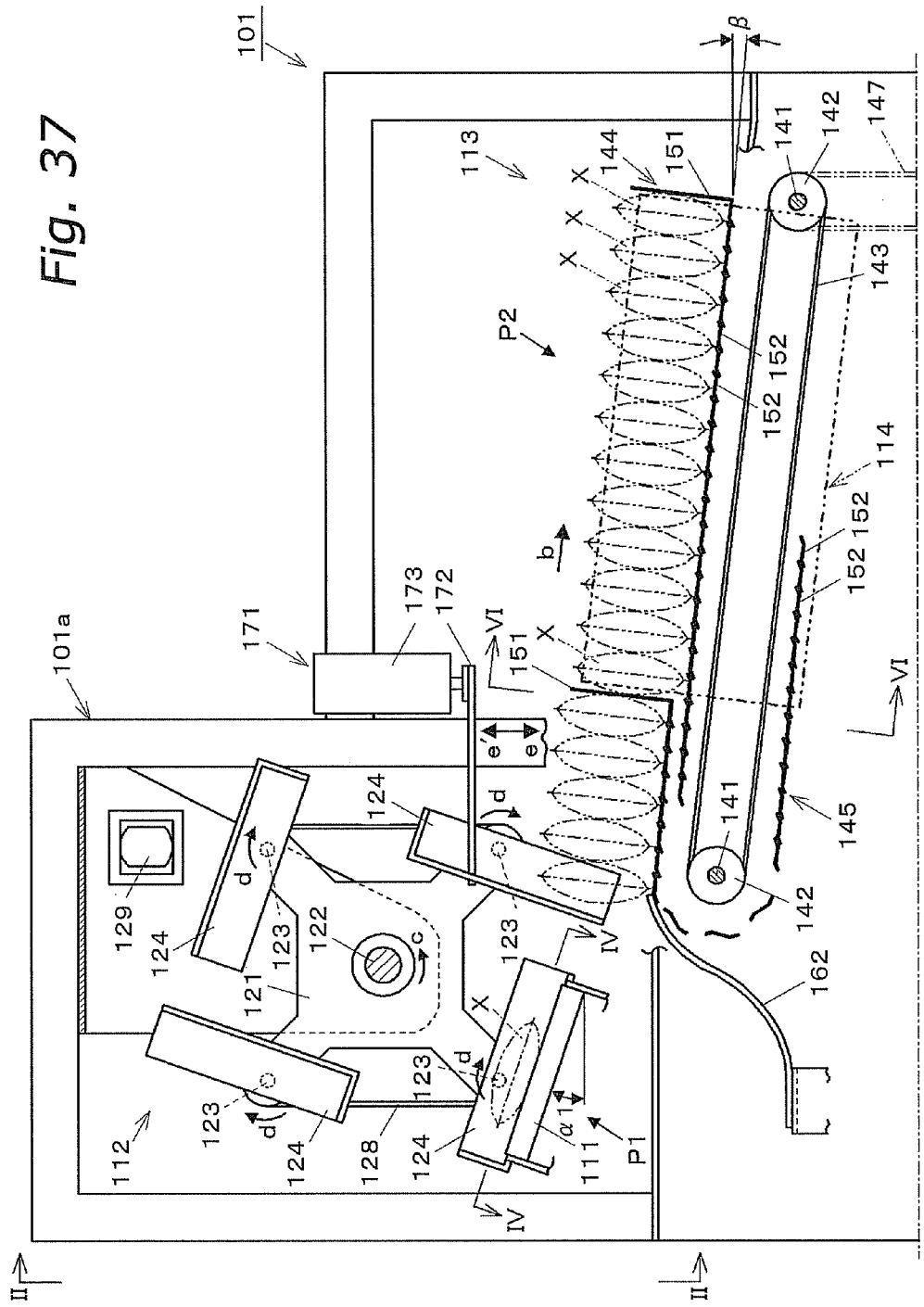
FIG. 37 is a lateral view of a conveyance apparatus according to a ninth embodiment of the present invention.

As shown in FIG. 37, a conveyance apparatus 101 of this embodiment is different from the above described conveyance apparatus 1 in that the position of the delivery table 124 at the receiving point P1 where articles are received from a carry-in conveyor 111 is inclined in the rotation direction.

Below, a description is given mainly on the portions having structures different from those described in the above described embodiments.

Figure 38:
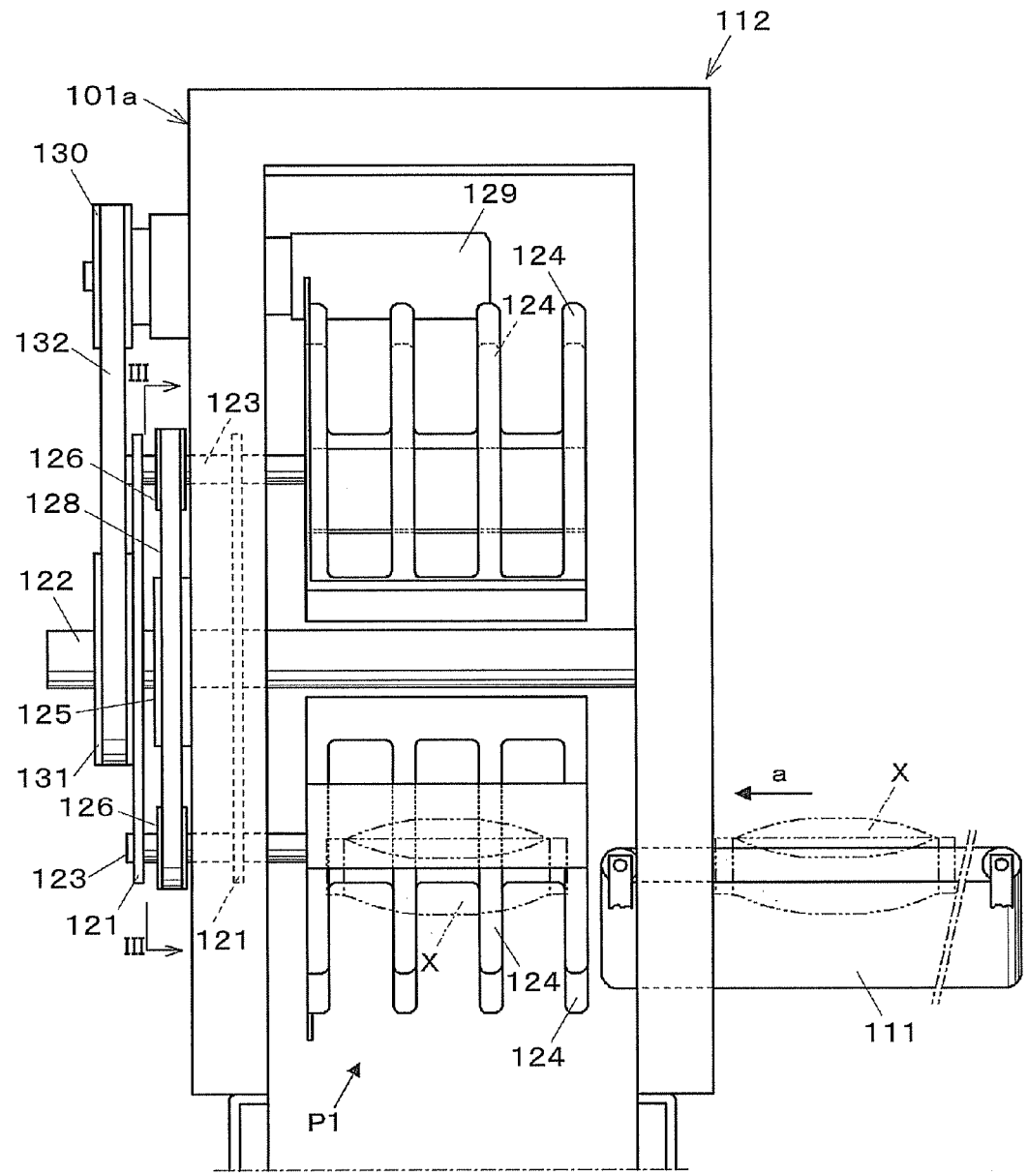
FIG. 38 is a view of a carry-in conveyor and the delivery device taken in the direction of the arrow along line II-II of FIG. 37.

The conveyance apparatus 101 according to the present embodiment shown in FIGS. 37 and 38 is configured to convey a relatively flat packaged article X, such as snack foods and the like. The conveyance apparatus 101 comprises the following components from the upstream side in the following order: the carry-in conveyor 111 that carries in the article X to the receiving point P1 as shown by the arrow "a"; a delivery device 112 that receives the article X from the carry-in conveyor 111 and delivers the same to the downstream side; an accumulation and conveyance apparatus 113 that conveys the articles X . . . X in the accumulation state, which are delivered from the delivery device 112, to the discharging point P2 as shown by the arrow "b"; and a discharge device 114 that discharges a batch of articles X . . . X conveyed to the discharging point P2.

The carry-in conveyor 111 is a flat belt type conveyor, and the conveying surface of the carry-in conveyor 111 is inclined such that the conveying surface substantially coincides with the receiving position of the delivery table of the delivery device 112, which will be described below. In other words, the conveying surface is inclined by angle α1 so as to be lower toward the side of the accumulation and conveyance apparatus 113.

The delivery device 112 receives the articles X one by one at the receiving point P1 from the carry-in conveyor 111 and moves the article to the standing position. Also, the delivery device 112 delivers the articles X to the accumulation and conveyance apparatus 113 at the downstream side while orderly placing the articles X from front to back on the accumulation and conveyance apparatus 113.

Figure 39:
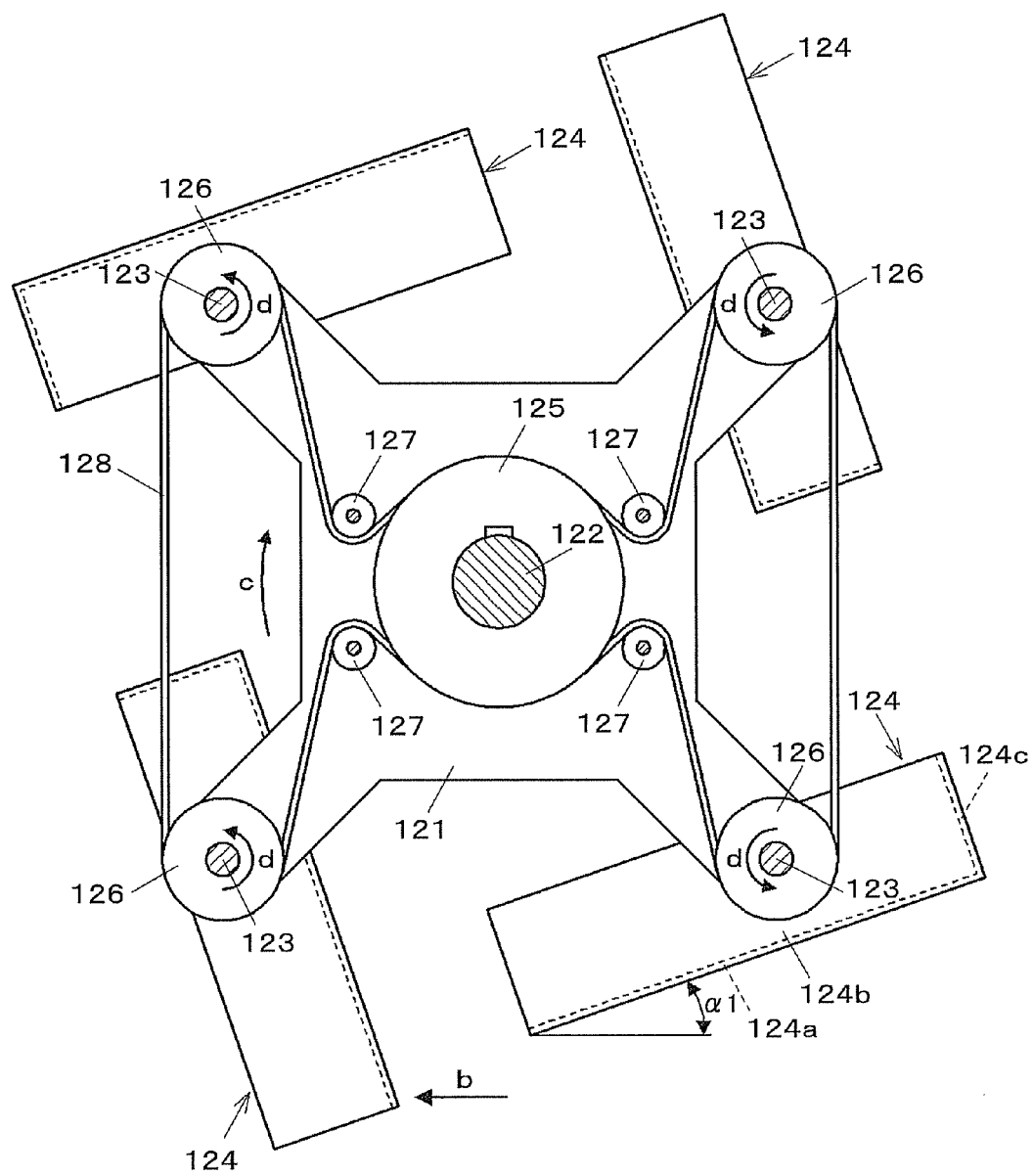
FIG. 39 is an enlarged view of the rotation structure of a delivery table taken in the direction of the arrow along line III-III of FIG. 38.

As shown in FIGS. 37 to 39, the delivery device 112 is provided with a pair of mutually coupled support plates 121, 121, which are located inside and outside a main body case 101a and include protruding portions that protrude in four perpendicular directions when viewed from the side; a fixed shaft 122 that penetrates through the center of the support plates 121, 121; rotation shafts 123 . . . 123 freely rotatably attached to each of the protruding portions; and delivery tables 124 . . . 124 respectively fixedly disposed to the rotation shafts 123 . . . 123. The support plate 121 rotates about the fixed shaft 122 in the arrow "c" direction.

The delivery table 124 moves the article X to the standing position by rotating as shown by the arrow "d" in a direction of the standing position, and also delivers the article X to the accumulation and conveyance apparatus 113 by moving forward. In such a case, the delivery table 124 is configured such that the receiving position is slightly inclined in a rotation direction "d" from the horizontal position, and in the figure, the delivery table 124 is inclined by the angle α1 in a rotation direction "d" from the horizontal position. The rotation shaft 123, which is a rotation support point of the delivery table 124, is located inwardly from the front side end portion of the delivery table in the receiving position.

Figure 40:
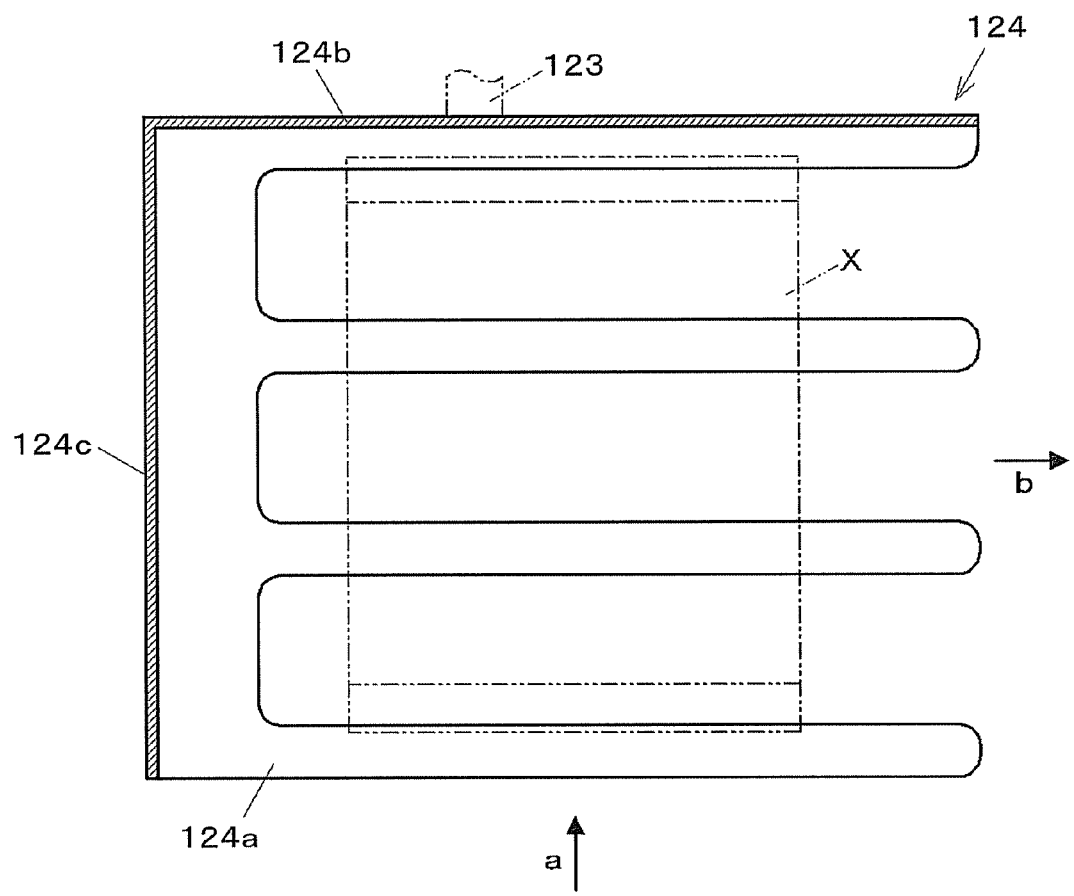
FIG. 40 is an enlarged sectional view of the structure of the delivery table taken along line IV-IV of FIG. 37.

As shown in FIGS. 39 and 40, the delivery table 124, which is configured to receive the article X supplied in the arrow "a" direction and delivers the same in the arrow "b" direction intersecting the direction "a" in which the article X is supplied, includes a loading surface 124a, and a mounting wall 124b and a jump-out prevention wall 124c which extend vertically from the loading surface 124a. The loading surface 124a is a flat surface on which the article X to be supplied is loaded, and is formed in a comb shape such that the loading surface 124a and the accumulation and conveyance apparatus 113 described below can intersect with each other. The mounting wall 124b is a portion to be coupled to the rotation shaft 123. The jump-out prevention wall 124c is located at the rear end portion of the delivery table 124 in the receiving position as shown in the figure. The jump-out prevention wall 124c is a portion that prevents the article X from jumping out of the delivery table 124, when the delivery table 124 rotates about the rotation shaft 123 as a supporting point in the arrow "d" direction and the loading surface 124a faces forward, i.e., in the arrow "b" direction so as to move from the receiving position to the standing position.

Figure 41:
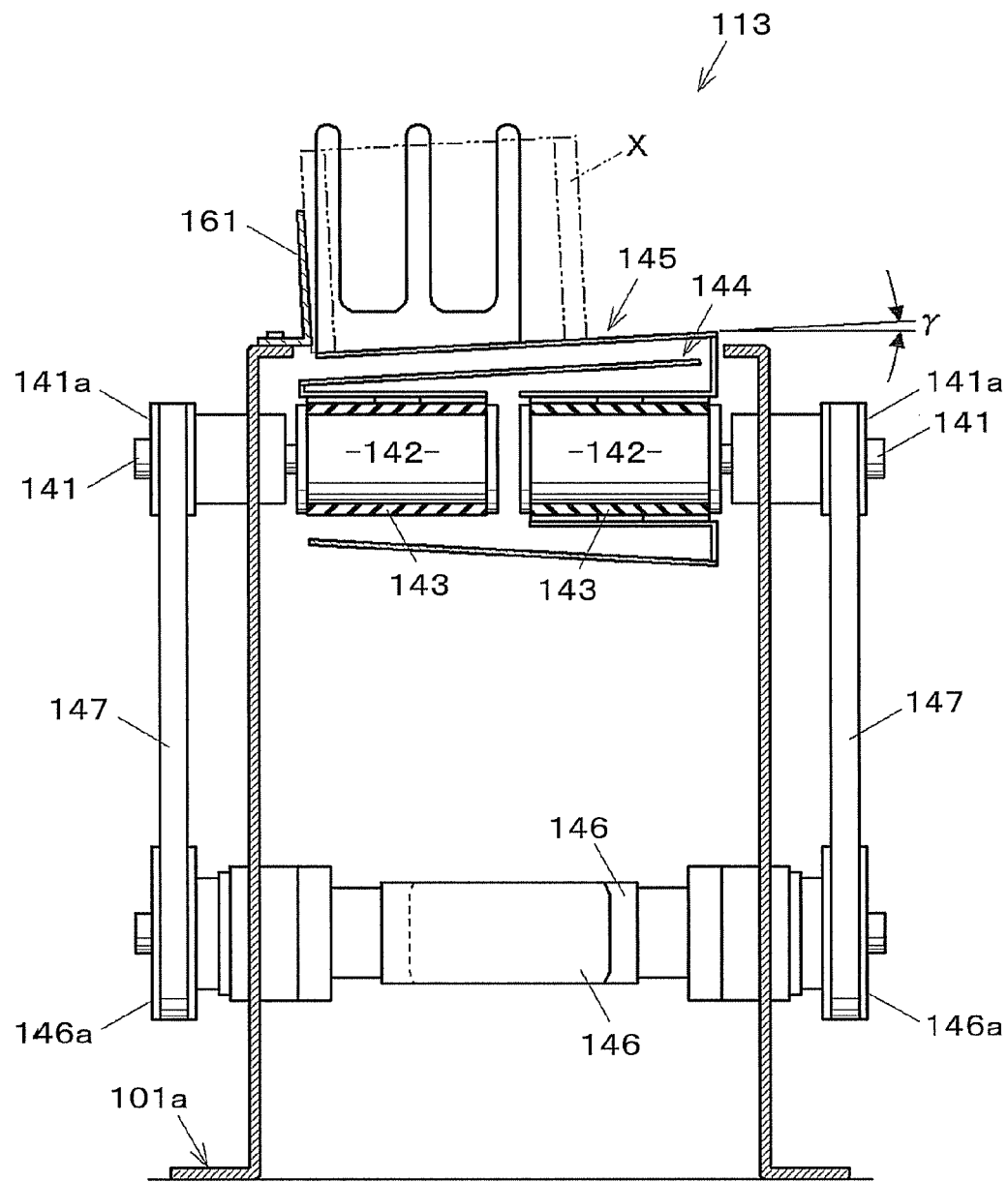
FIG. 41 is an enlarged sectional view of the driving mechanism of the accumulation and conveyance apparatus taken along line VI-VI of FIG. 37.

As shown in FIGS. 37 and 41, the accumulation and conveyance apparatus 113 accumulates a predetermined number of the articles X in the standing position, which are delivered from the delivery device 112. Also, the accumulation and conveyance apparatus 113 transfers the articles X . . . X in the accumulation state to the discharging point P2. The accumulation and conveyance apparatus 113 includes an upstream and downstream pair of support shafts 141, 141 freely rotatably supported in the main body case 101a, and a pulley 142 is mounted on each support shaft 141. In addition, a flat belt 143 is wound between each of the upstream and downstream pair of pulleys 142, 142.

Buckets 144, 145 that transfer the articles X . . . X in the standing position while holding the articles X . . . X in the accumulation state are coupled to each flat belt 143. In such a case, each flat belt 143 and each of the buckets 144, 145 are inclined downwardly in the downstream direction, and especially the buckets 144, 145 are inclined by the angle β as described below in detail.

Figure 42:
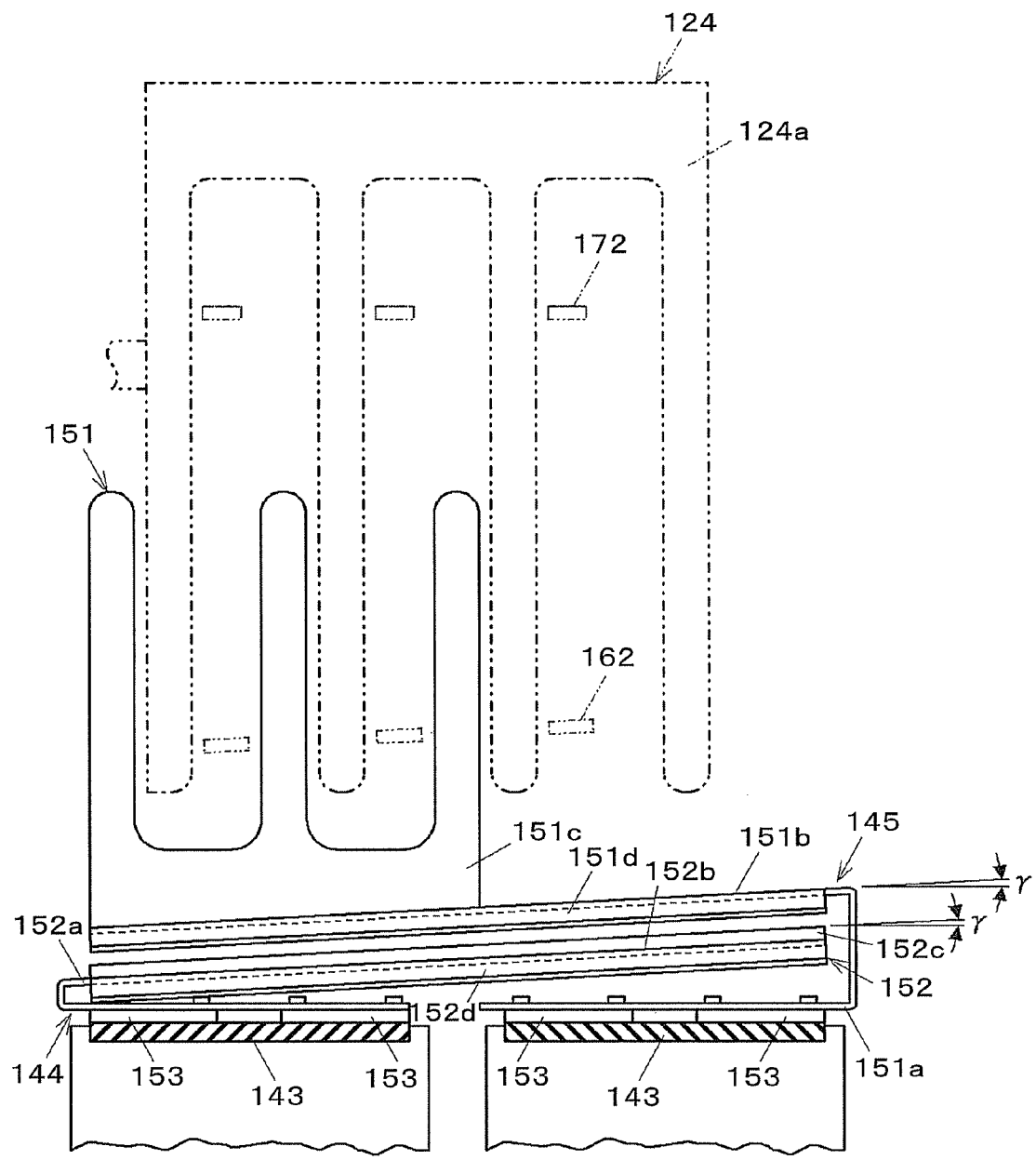
FIG. 42 is an plan view which describes an overlapping structure between a pair of buckets.

Here, the structure of each of the buckets 144, 145 will be described in detail. As shown in FIGS. 37 and 42, each of the buckets 144, 145 comprises a partition member 151 at the front, which extends perpendicularly to the conveying direction "b", and twenty-three base members 152 . . . 152 consecutively provided to the partition member 151. These members 151, 152 . . . 152 are integrally movable, and each of the buckets 144, 145 hold the twelve articles X . . . X in the standing position and in the accumulation state as shown in the figures.

Figure 43:
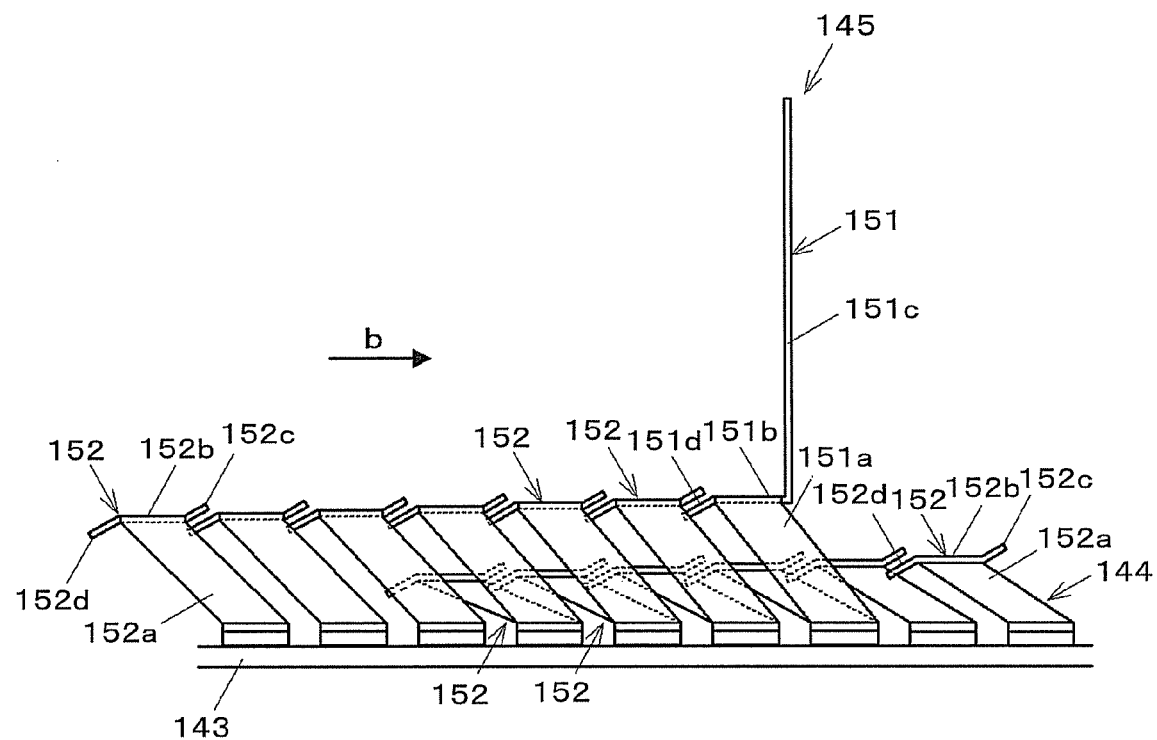
FIG. 43 is a lateral view which describes the overlapping structure between the pair of buckets.
Figure 44:
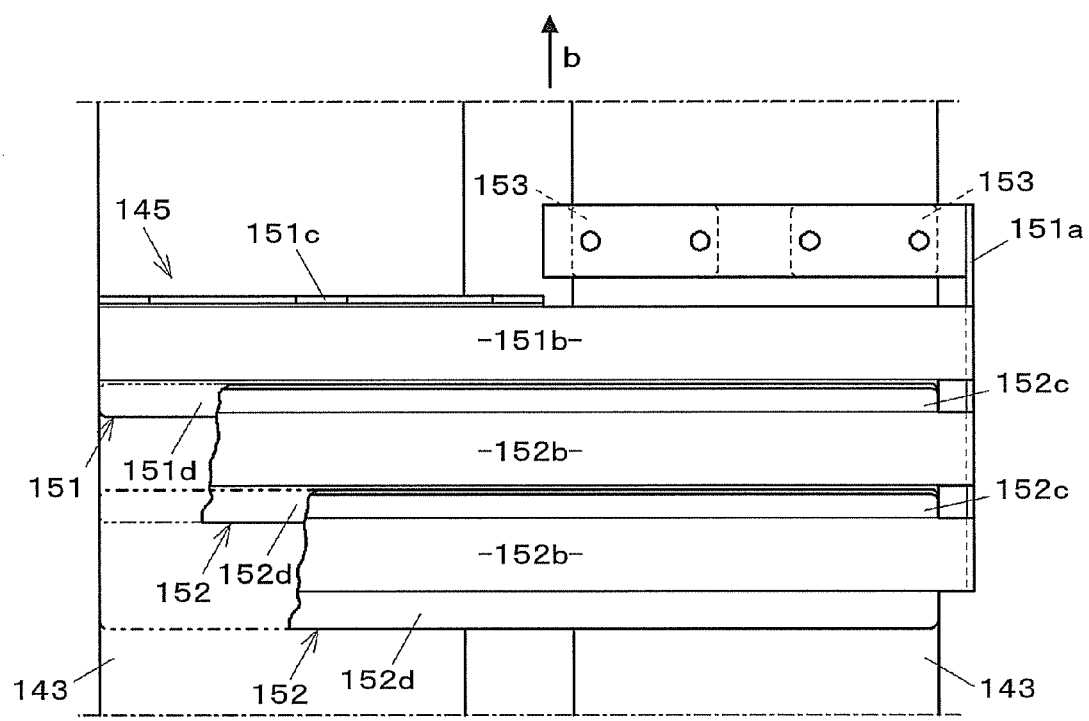
FIG. 44 is a plan view of partition members and base members provided on one of the buckets.

As shown in FIGS. 42 to 44, as an example, included in the partition member 151 provided to the bucket 145 are: a supporting member 151a attached to the right side flat belt 143 in the figure via spacers 153, 153 so as to extend upward and rearward; a flat surface portion 151b extending perpendicular to the conveying direction "b" from the supporting member 151a to above the left side flat belt 143; a standing portion 151c standing upward from a front end portion of the flat surface portion 151b and formed in a comb shape when viewed from the front; and a rear inclined surface portion 151d extending diagonally downward from a rear end portion of the flat surface portion 151b.

On the other hand, the base member 152 provided to the bucket 145 includes: a supporting member 152a attached to the right side flat belt 143 via the spacers 153, 153 so as to extend upward and rearward; a flat surface portion 152b extending perpendicular to the conveying direction "b" from the supporting member 152a to above the left side flat belt 143; a front inclined surface portion 152c extending diagonally upward from the front end portion of the flat surface portion 152b; and a rear inclined surface portion 152d extending diagonally downward from a rear end portion of the flat surface portion 151b.

The flat surface portions 151b, 152b, the front inclined surface portion 152c, and the rear inclined surface portions 151d, 152d are inclined by the angle γ so as to be lower toward the left side in the widthwise direction. In addition, the heights of the base members 152 . . . 152 with respect to the flat belt 143 are lower toward the upstream side. The partition member 151 and the base member 152, and the base members 152, 152 form a conveying surface that is inclined by the angle β downward in the downward direction and also inclined by the angle γ so as to be lower toward the left side in the widthwise direction, as the rear inclined surface portions 151d, 152d of the front members 151, 152 overlap with the front inclined surface portion 152c of the rear base member 152, with the front members being on the lower side.

Figure 45:
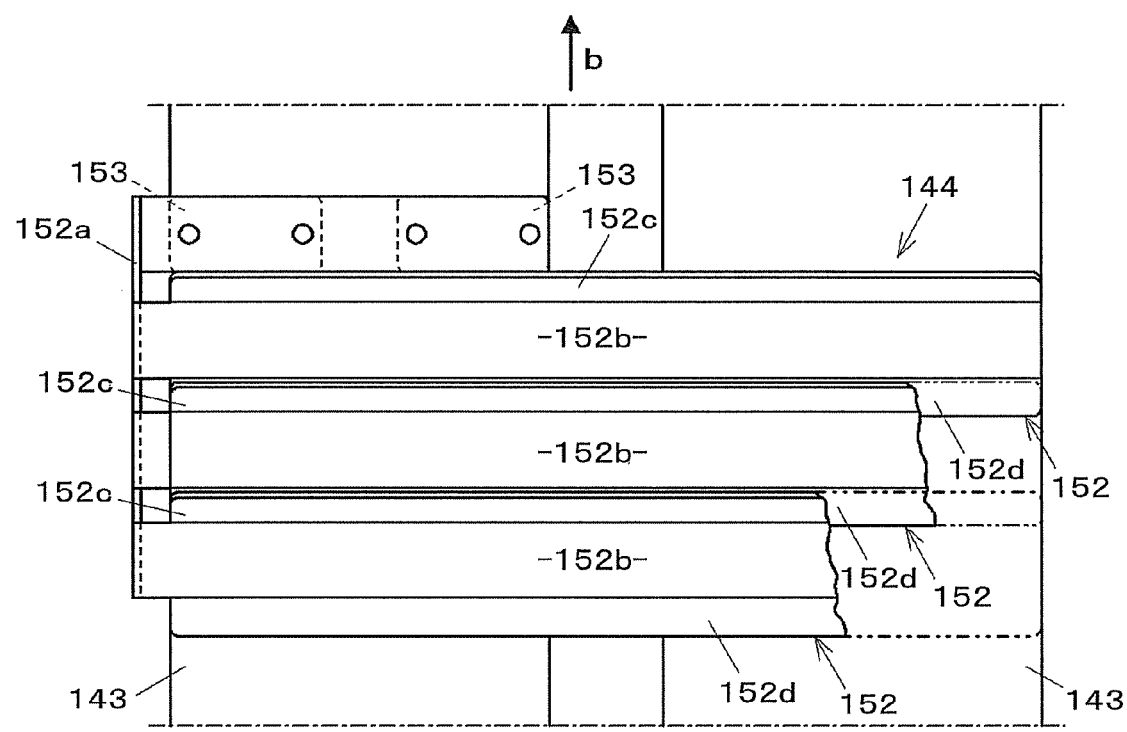
FIG. 45 is a plan view of the base members provided on the other one of the buckets.

As shown in FIGS. 42, 43, and 45, included in the base member 152 provided to the bucket 144 are: the supporting member 152a attached to the left side flat belt 143 in the figure via the spacers 153, 153 so as to extend upward and rearward; the flat surface portion 152b extending perpendicular to the conveying direction "b" from the supporting member 152a to above the right side flat belt 143; and the front inclined surface portion 152c and the rear inclined surface portion 152d respectively extending diagonally upward and diagonally downward from the front and rear end portions of the flat surface portion 152b.

As is the case with the above described bucket 145, the flat surface portion 152b, the front inclined surface portion 152c, and the rear inclined surface portion 152d are inclined by the angle γ so as to be lower toward the left side in the widthwise direction. In addition, the heights of the base members 152 . . . 152 with respect to the flat belt 143 are lower toward the upstream side. The rear inclined surface portion 152d of the front base members 152 overlaps with the front inclined surface portion 152c of the rear base member 152, with the front member being on the lower side, thereby forming a conveying surface that is inclined by the angle β downward in the downward direction and also inclined by the angle γ so as to be lower toward the left side in the widthwise direction.

In each of the buckets 144, 145, since the heights of the base members 152 . . . 152 with respect to the flat belt 143 are lower toward the upstream side, it will be possible for the upstream side of the preceding bucket 144 attached to the left side flat belt 143 to overlap with the downstream side of the bucket 145, which is attached to the right side flat belt 143 and which follows the just described bucket 144.

In addition, each motor 146 that drives each flat belt 143 enables the upstream side of the preceding bucket 144 attached to the left side flat belt 143 to overlap with the downstream side of the bucket 145, which is attached to the right side flat belt 143 and which follows the just described bucket 144, and causes the both partition members 151, 151 provided to the both buckets 144, 145 respectively to serve as the front end holding member and the rear end holding member in order to define a space for holding each batch of the articles X . . . X loaded in the standing position. At the same time, when the batch of the articles X . . . X held in the holding space at the discharging point P2 is discharged, each motor 146 that drives each flat belt 143 causes the downstream side of the preceding bucket 144 to overlap with the upstream side of the following bucket 145 and again causes the both partition members 151, 151 respectively provided to the both buckets 144, 145 to respectively serve as the front end holding member and the rear end holding member in order to define the next holing space.

Here, the structure of intersection between the delivery table 124 and the partition member 151 of the buckets 144, 145 will be described. As shown in FIG. 42, the loading surface 124a of the delivery table 124 and the standing portion 151c of the partition member 151 are formed in a comb shape so as to be able to move through each other without interfering with each other when the article X is delivered to the buckets 144, 145.

As shown in FIG. 41, on the side of the conveying surface, which is lower since the buckets 144, 145 forming the conveying surface of the accumulation and conveyance apparatus 113 are inclined by the angle γ, i.e., on the left side of the conveying surface in the figure, there is provided a side guide member 161 in a plate shape, which contacts lateral portions of the articles X held by the buckets 144, 145 and guides the articles X. This side guide member 161 extends in a direction of the discharging point P2.

Figure 46:
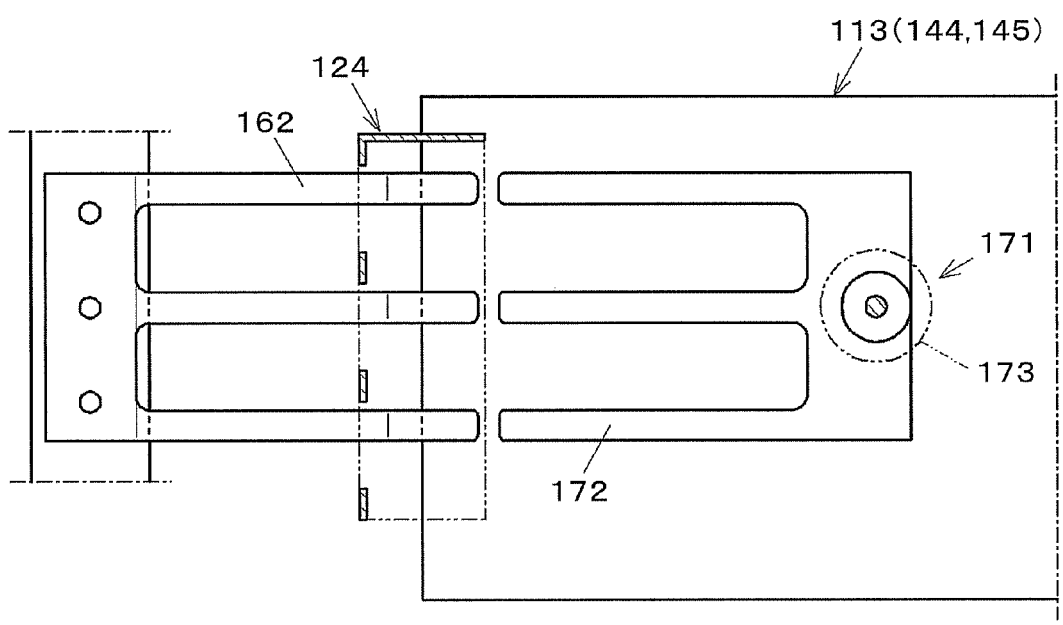
FIG. 46 is a plan view of a lower guide member and an upper guide mechanism.

As shown in FIGS. 37 and 46, there is provided a lower guide member 162 extending upward from below the delivery device 112 to the upstream end of the accumulation and conveyance apparatus 113. This lower guide member 162 guides the article X delivered from the delivery device 112 to the buckets 144, 145 of the accumulation and conveyance apparatus 113 while supporting the lower end portion of the article X. The lower guide member 162 is configured to extend from a predetermined portion of the main body case 101a and to extend along the above-described inclined conveying surface near the accumulation and conveyance apparatus 113. As shown in FIGS. 42 and 46, the lower guide member 162 is formed in a comb shape such that the lower guide member 162 intersect with the loading surface 124a of the delivery table 124 and the standing portion 151c of the partition member 151.

As shown in FIGS. 37 and 46, at the above of the accumulation and conveyance apparatus 113 on the upstream side, there is provided an upper guide mechanism 171 configured to align the upper portions of the articles X in the standing position that are delivered from the delivery device 112 to the bucket 144, 145 of the accumulation and conveyance apparatus 113. This upper guide mechanism 171 includes a pushing member 172 that pushes the article X from above, and an air cylinder 173 that moves the pushing member 172 up and down as shown by the arrows e, e'. Before the article X is delivered to the buckets 144, 145, the air cylinder 173 operates so as to move the pushing member 172 up in synchronization with the delivery of the article X so that the pushing member 172 will be moved to a position that does not disturb the delivery of the articles X. After the article X is delivered, the air cylinder 173 operates so as to move the pushing member 172 down so that the pushing member 172 will be caused to push the articles X from above. As shown in FIGS. 42 and 46, the pushing member 172 of the upper guide mechanism 171 is formed in a comb shape such that the pushing member 172 and the loading surface 124a of the delivery table 124 can intersect with each other.

Figure 47:
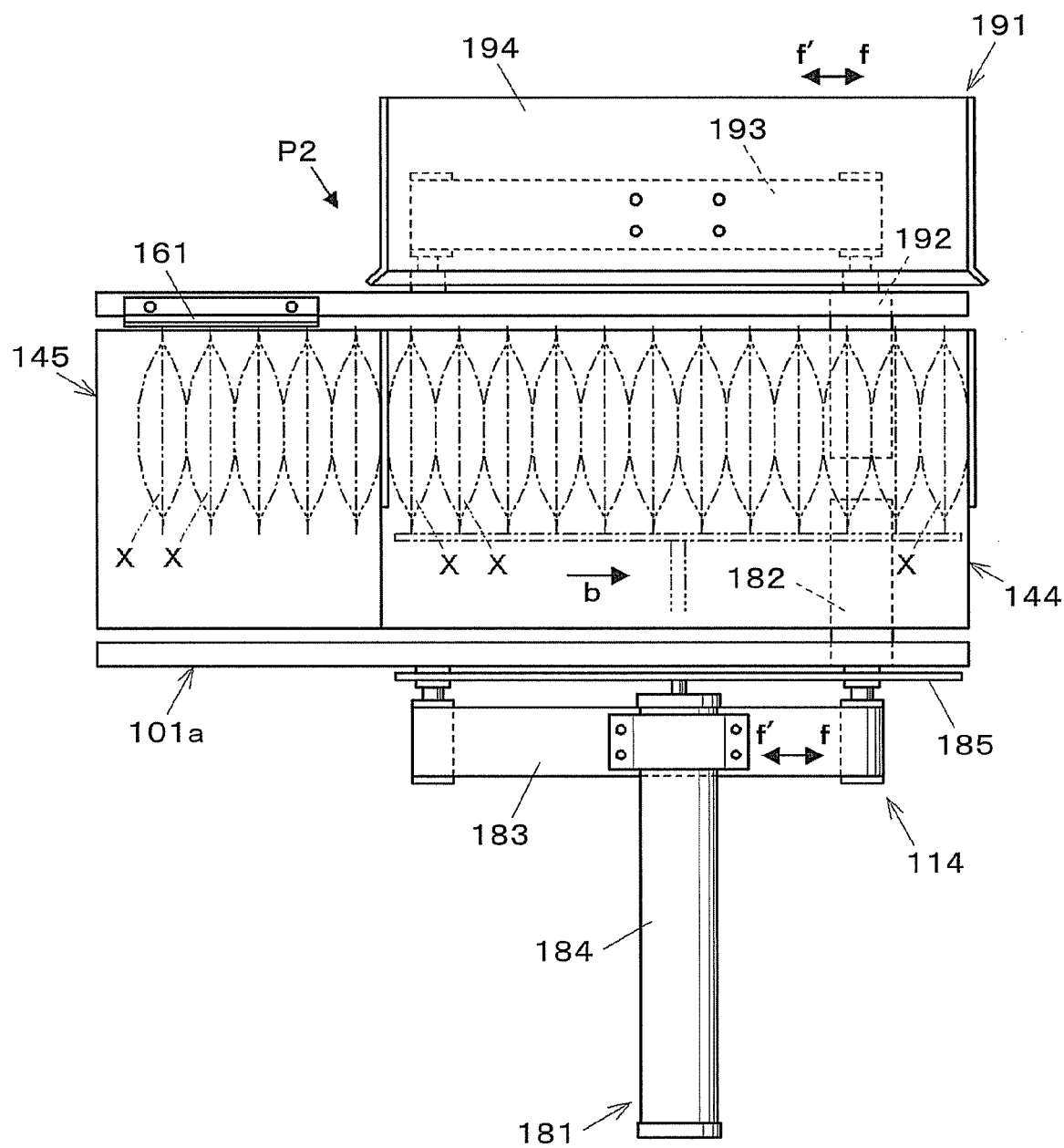
FIG. 47 is a plan view of a discharge device.

As shown in FIG. 47, the discharge device 114 discharges a batch of the articles X . . . X all together to the outside of the system, when the articles X . . . X are delivered to the discharging point P2 by the buckets 144, 145 provided to the accumulation and conveyance apparatus 113. The discharge device 114 is provided with a pusher device 181 on the higher side of the conveying surface where the buckets 144, 145 are disposed thereacross. This pusher device 181 includes a motor 182 attached to the main body case 101a; a flat belt conveyor 183 whose running surface runs back and forth as shown by the arrows "f", "f" due to the driving of the motor 182; an air cylinder 184 attached to the running surface of the conveyor 183; and a plate-shaped pusher member 185 attached to the leading edge of the rod that moves back and forth so as to be perpendicular to the conveying direction "b" of the air cylinder 184. In such a case, the pusher device 181 is configured to be movable in synchronization with the buckets 144, 145. In addition, the pusher member 185 is exchangeable with a different pusher member according to the thickness and the number of the articles X . . . X to be discharged.

The discharge device 114 is provided with a discharge guide device 191 on the lower side of the conveying surface where the buckets 144, 145 are disposed thereacross. The discharge guide device 191 is provided so as to be oppositely disposed to the pusher device 181. This discharge guide device 191 includes a motor 192 attached to the main body case 101a; a flat belt conveyor 193 whose running surface runs back and forth as shown by the arrows "f", "f" due to the driving of the motor 192; and a receiving table 194 attached to the running surface of the flat belt conveyor 193. In such a case, the discharge guide device 191 is configured to be movable in synchronization with the buckets 144, 145. In addition, the receiving table 194 is exchangeable with a different receiving table according to the thickness and the number of the articles X . . . X to be discharged. Note that the above described side guide member 161 is disposed at the lateral side of the conveying surface on the upstream side where the discharge guide device 191 is provided.

Next, the operation of this conveyance apparatus 101 will be described. Note that the series of the operation described below is provided for purposes of example, and it is not necessarily limited to the described order.

As shown in FIGS. 37 and 38, when a relatively flat packaged article X is supplied from the carry-in conveyor 111 on the upstream side, whose conveying surface is inclined by the angle α1 in the widthwise direction, the delivery table 124 of the delivery device 112, whose loading surface 124a is inclined by the above described angle α1 in the rotation direction "d" from the horizontal position at the receiving point P1, receives the articles X one by one, moves the same to the standing position, and delivers the same to the bucket 144 of the accumulation and conveyance apparatus 113 on the downstream side.

Below, the accumulation operation will be described based on FIGS. 48 to 52. In order to avoid complication of the drawing and to clarify the operation of the delivery device 112 and the accumulation and conveyance apparatus 113, the inclination of the conveying surface of the accumulation and conveyance apparatus 113 in the width direction is ignored, and the description of the buckets 144, 145 is simplified. In addition, specific reference numerals are given as needed to each delivery table 124 and each article X in order to clearly show the movement of the delivery table 124.

Figure 48:
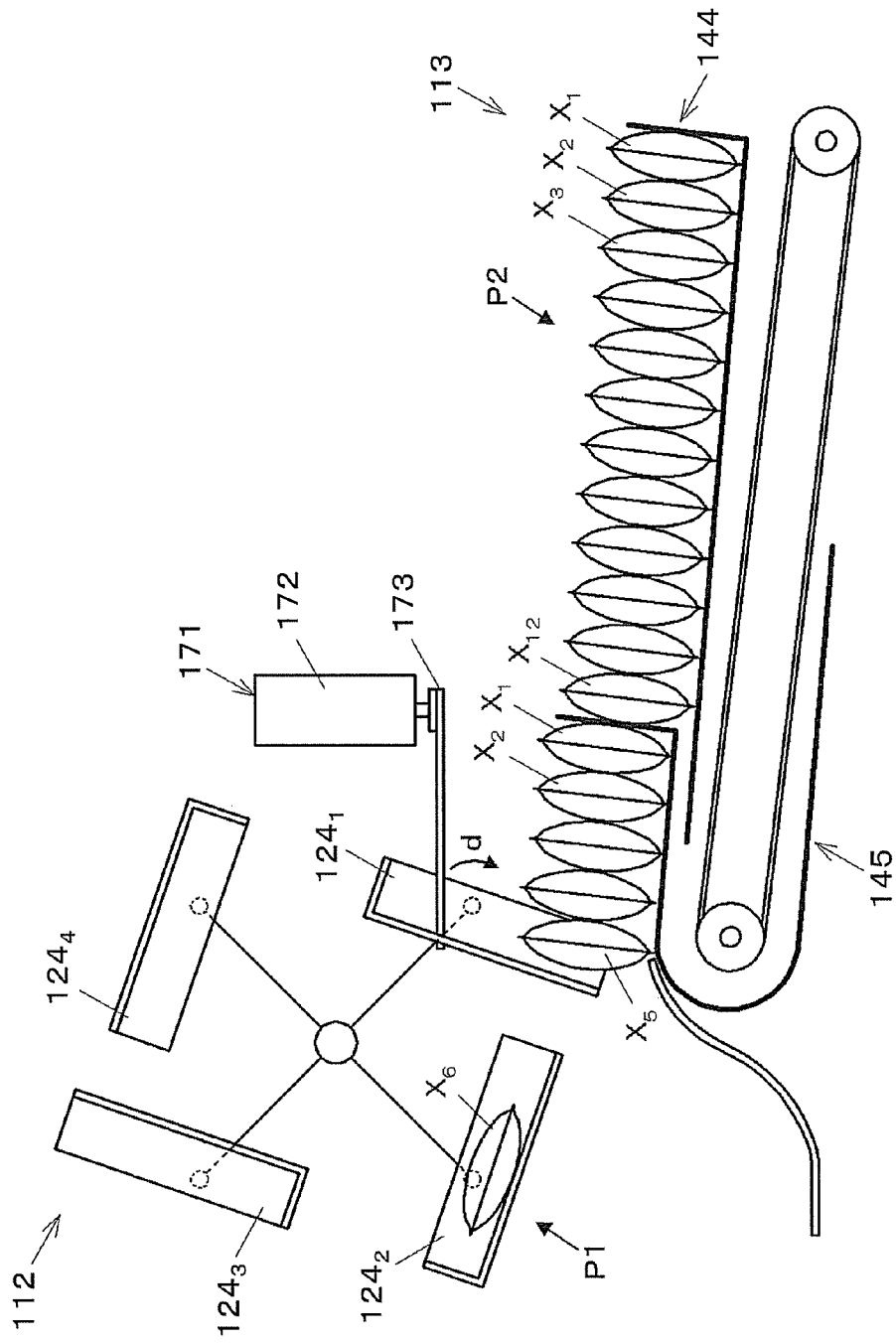
FIG. 48 is a schematic lateral view which describes an accumulation operation, showing a state in which a new article is received by the delivery table.

First, as shown in FIG. 48, for example, the preceding bucket 144 in the accumulation and conveyance apparatus 113 already hold predetermined twelve articles $X_1$ to $X_{12}$ in the standing position; the bucket 144 has almost reached the discharging point P2; and the following bucket 145 holds five articles $X_1$ to $X_5$ in the standing position. The preceding delivery table $124_1$ of the delivery device 112 rotates in the arrow "d" direction from behind the article $X_5$ at the rearmost end, and moves rearward and upward. At the receiving point P1, a new article $X_6$ is supplied to the following delivery table $124_2$. Remaining delivery tables $124_3$, $124_4$ are in a positional relationship as shown in the figure. The air cylinder 173 of the upper guide mechanism 171 moves the pushing member 172 up so that the pushing member 172 will be moved to a position that does not disturb the delivery of the articles X.

Figure 49:
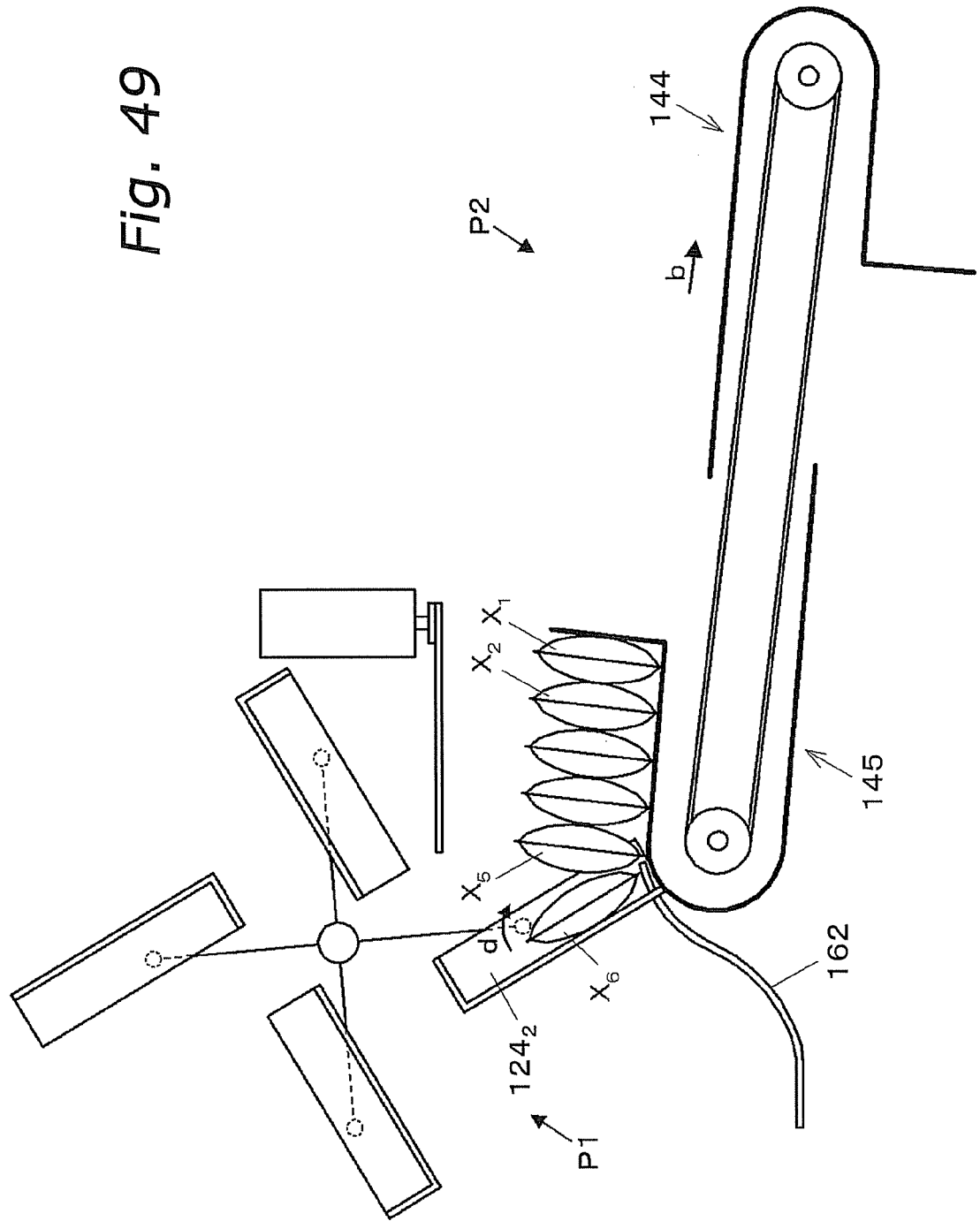
FIG. 49 is a schematic lateral view which describes the accumulation operation, showing a state in which the article is delivered to the bucket from the delivery table.

Next, as shown in FIG. 49, due to the driving of the pusher device 181 of the discharge device 114 that moves in synchronization with the buckets 144, 145, the article $X_1$ to $X_{12}$ held in the bucket 144 are discharged all together to the discharge guide device 191 while moving. The empty bucket 144 leaves the discharging point P2 as shown by the arrow "b", and moves to reach the upstream side of the following bucket 145.

Meanwhile, near the receiving point P1, the delivery table $124_2$ holding the article $X_6$ is moving closer to the bucket 145 while rotating in the arrow "d" direction, causing a lower end portion of the article $X_6$ to land on the lower guide member 162, and moving the article $X_6$ closer in the direction of the articles $X_1$ to $X_5$ held in the bucket 145. At this time, as described above, the delivery table $124_2$ formed so as not to interfere with the lower guide member 162 intersects with the lower guide member 162.

Figure 50:
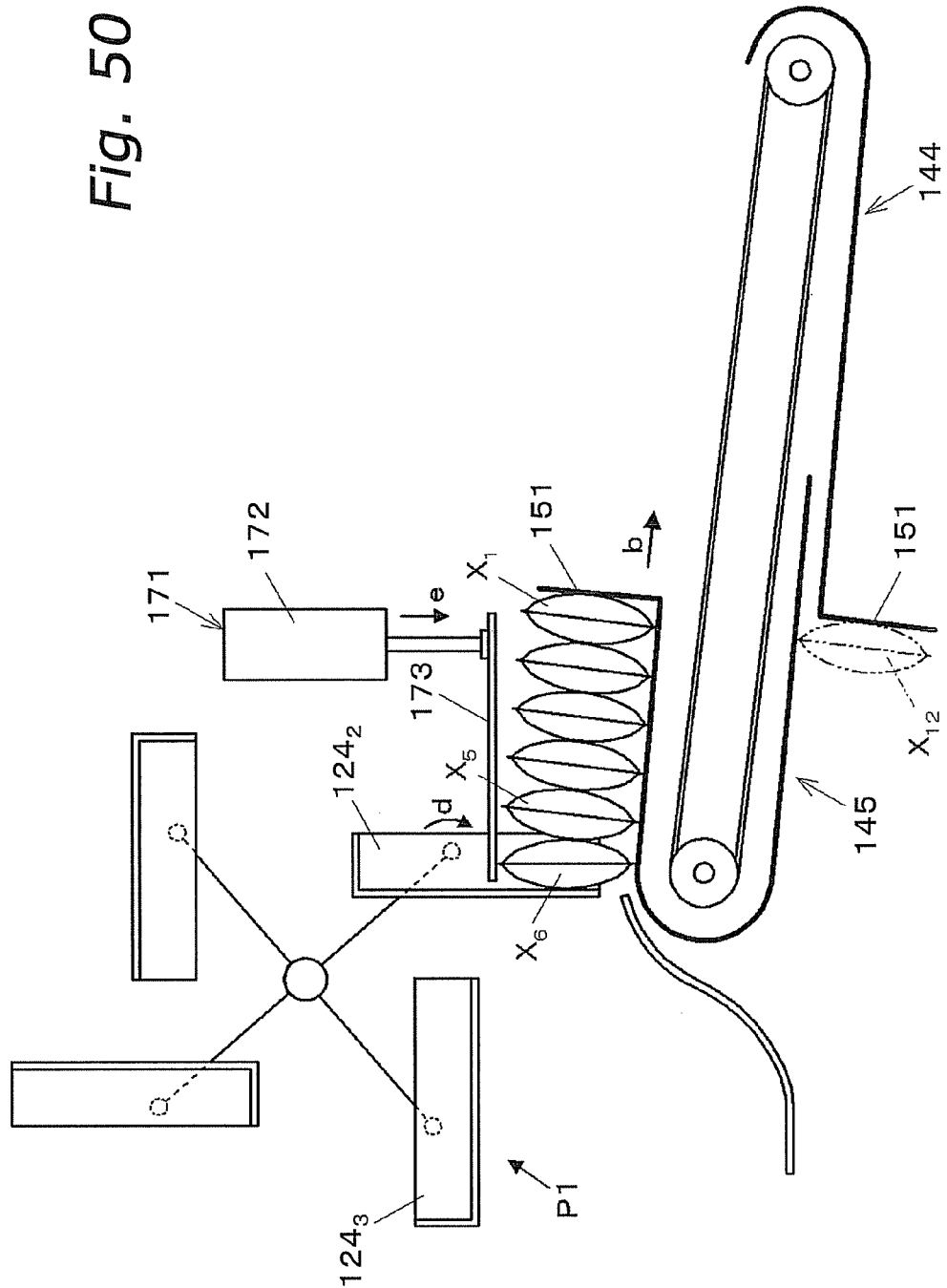
FIG. 50 is a schematic lateral view which describes the accumulation operation, showing a state in which articles are held in the standing position in the bucket.

Next, as shown in FIG. 50, the bucket 145 moves in the arrow "b" direction by a distance of one article. Also, the delivery table $124_2$ which is just about to deliver the article $X_6$ to the bucket 145, rotates further in the arrow "d" direction and moves to the standing position, and moves the article $X_6$ in the standing position close to behind the articles $X_1$ to $X_5$ in the bucket 145. Meanwhile, the following delivery table $124_3$ moves closer to the receiving point P1, and also is moving to the predetermined receiving position.

Figure 51:
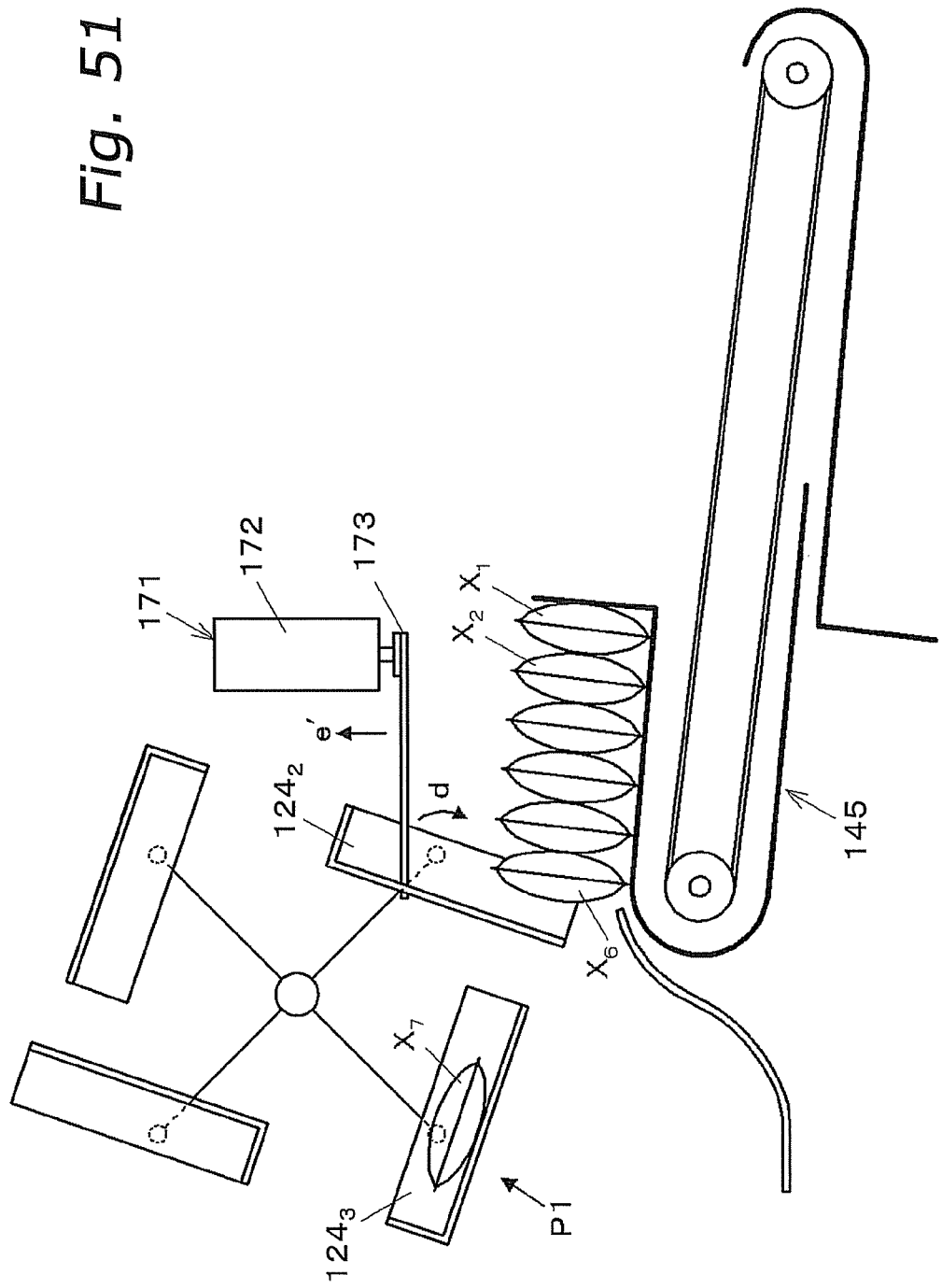
FIG. 51 is a schematic lateral view which describes the accumulation operation, showing a state in which a new article is received by the next delivery table.
Figure 52:
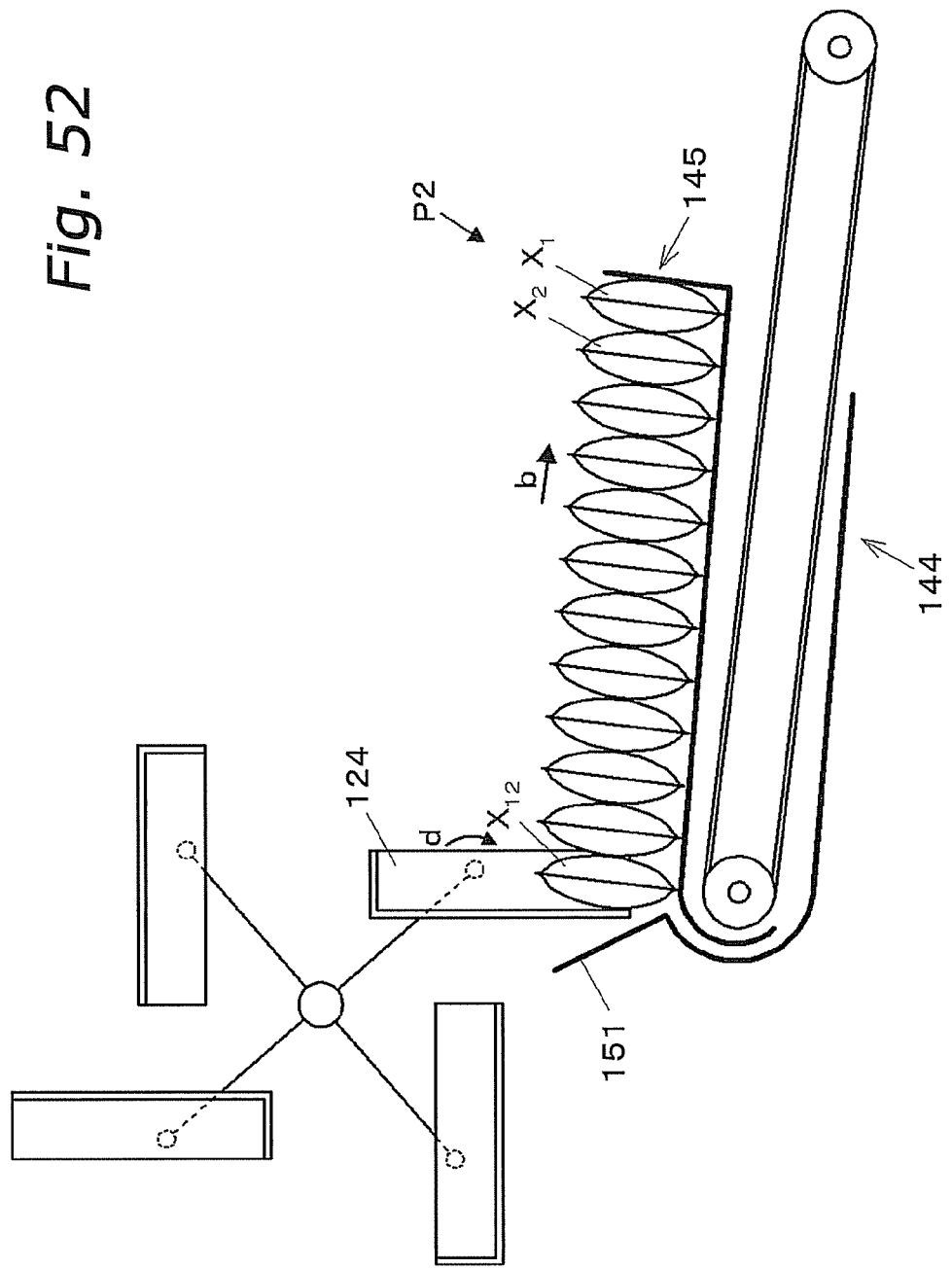
FIG. 52 is a schematic lateral view which describes the accumulation operation, showing a state in which the delivery table intersects with the partition member of the bucket.
Figure 53:
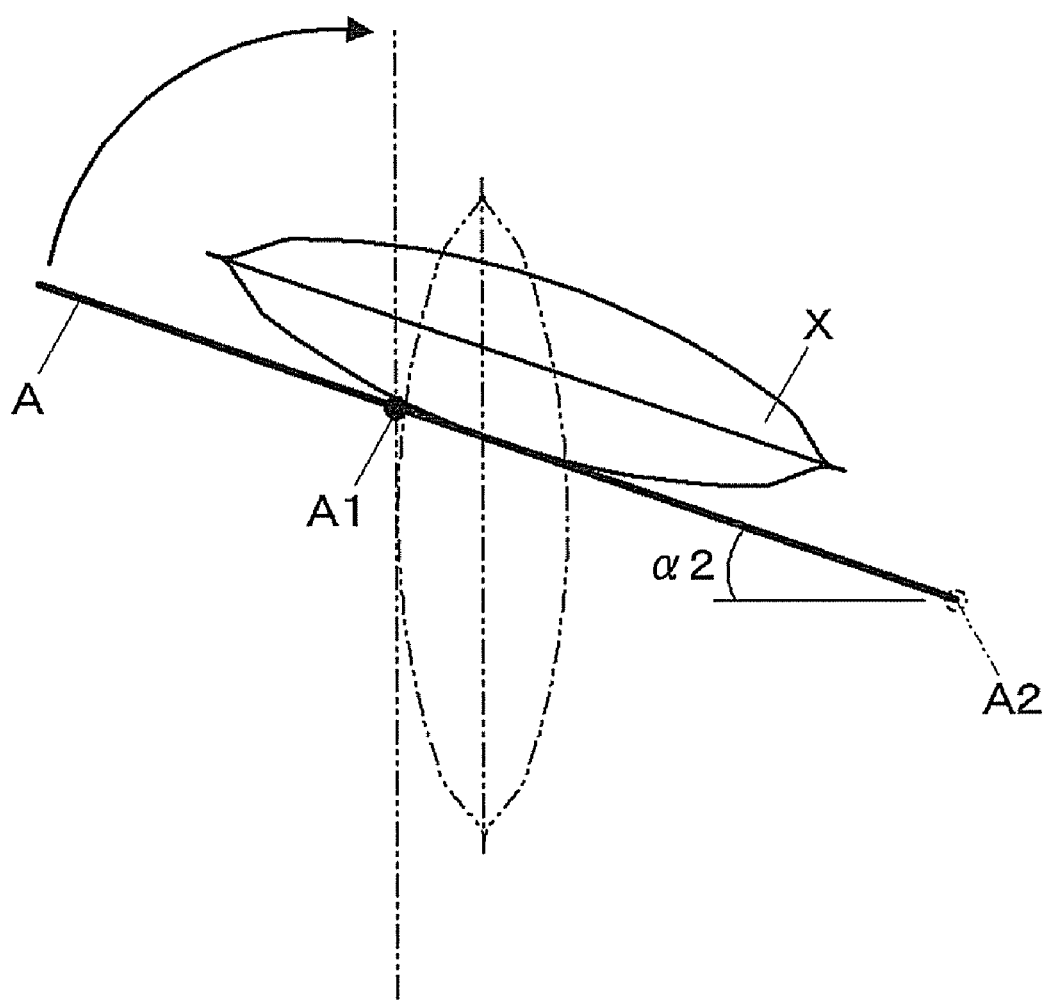
FIG. 53 is a schematic lateral view of the delivery table, which describes an effect of the present invention.

In such a case, as shown in FIGS. 51, 52, the conveying surface of the bucket 145 is inclined by the angle γ in the widthwise direction, so that the article $X_6$ delivered to the bucket 145 will move to the side that is lower due to the inclination, and the movement thereof be controlled by the side guide member 161 located on the lower side.

In addition, as shown in FIG. 37, the conveying surface of the bucket 145 is inclined by the angle β downward in the downstream direction, so that the article $X_6$ delivered to the bucket 145 will lean forward and therefore will be held in a packed manner in a direction of inclination.

In addition, the pushing member 172 moves down as shown by the arrow "e" due to the operation of the air cylinder 173 of the upper guide mechanism 171, and pushes the upper end portion of the article $X_6$ or the adjacent article $X_5$ and the like.

Then, the empty bucket 144 overlaps, in a predetermined range, with the upstream side of the bucket 145 in the process of receiving the article X, and a space for holding the predetermined twelve articles $X_1$ to $X_{12}$ is defined by the partition members 151, 151 of the both buckets 144, 145. Note that the both buckets 144, 145 synchronize with each other and move after overlapping with each other.

Next, as shown in FIG. 51, the six articles $X_1$ to $X_6$ are held in the standing position in the bucket 145 in the process of receiving articles X, and the delivery table $124_2$ that has finished delivering the articles X rotates in the arrow "d" direction and is about to move rearward and upward from behind the article $X_6$ at the rearmost end. In such a case, the pushing member 172 that was pushing the upper end portion of the article $X_6$ and the like will move up as shown by the arrow "e" due to the operation of the air cylinder 173 of the upper guide mechanism 171. Further, a new article $X_7$ is supplied to the following delivery table $124_3$ in the predetermined receiving position at the receiving point P1.

In this way, the delivery device 112 is provided with the four delivery tables $124_1$ to $124_4$, and these delivery tables $124_1$ to $124_4$ can receive the article X from the upstream side, each taking turns. As a result, the accumulation of the articles X at the receiving point P1 will be accelerated.

As shown in FIG. 52, after the twelfth article $X_{12}$ is delivered to the bucket 145 by the delivery table 124, when the bucket 145 moves to the discharging point P2 as shown by the arrow "b", the partition member 151 of the following bucket 144, which serves as the rear end holding member will intersect with the delivery table 124 which is about to move away from behind an article $X_{12}$ by rotating in the arrow "d" direction. In other words, as shown in FIG. 42, the standing portion 151c of the partition member 151 and the loading surface 124a of the delivery table 124 are formed in a comb shape so as to be able to intersect with each other, so that the partition member 151 of the bucket 144 will intersect with the delivery table 124 and hold the $X_{12}$ at the rearmost end, taking turns with the delivery table 124.

Being constructed as described above, as shown in FIG. 56, when receiving the article, the delivery table 124 is in a position slightly inclined in a rotation direction from the horizontal position, i.e., in a position inclined by the angle α1 in the figure, when receiving the article X supplied, and then rotates. Accordingly, as compared to the case where the delivery table 124 receives the article X in horizontal position and rotates, the rotation angle from the horizontal position to the standing position shown by the two-dot chain line is small in the present apparatus. As a result, the article X can be instantaneously moved to the standing position, which results in acceleration of the accumulation process.

Figure 56:
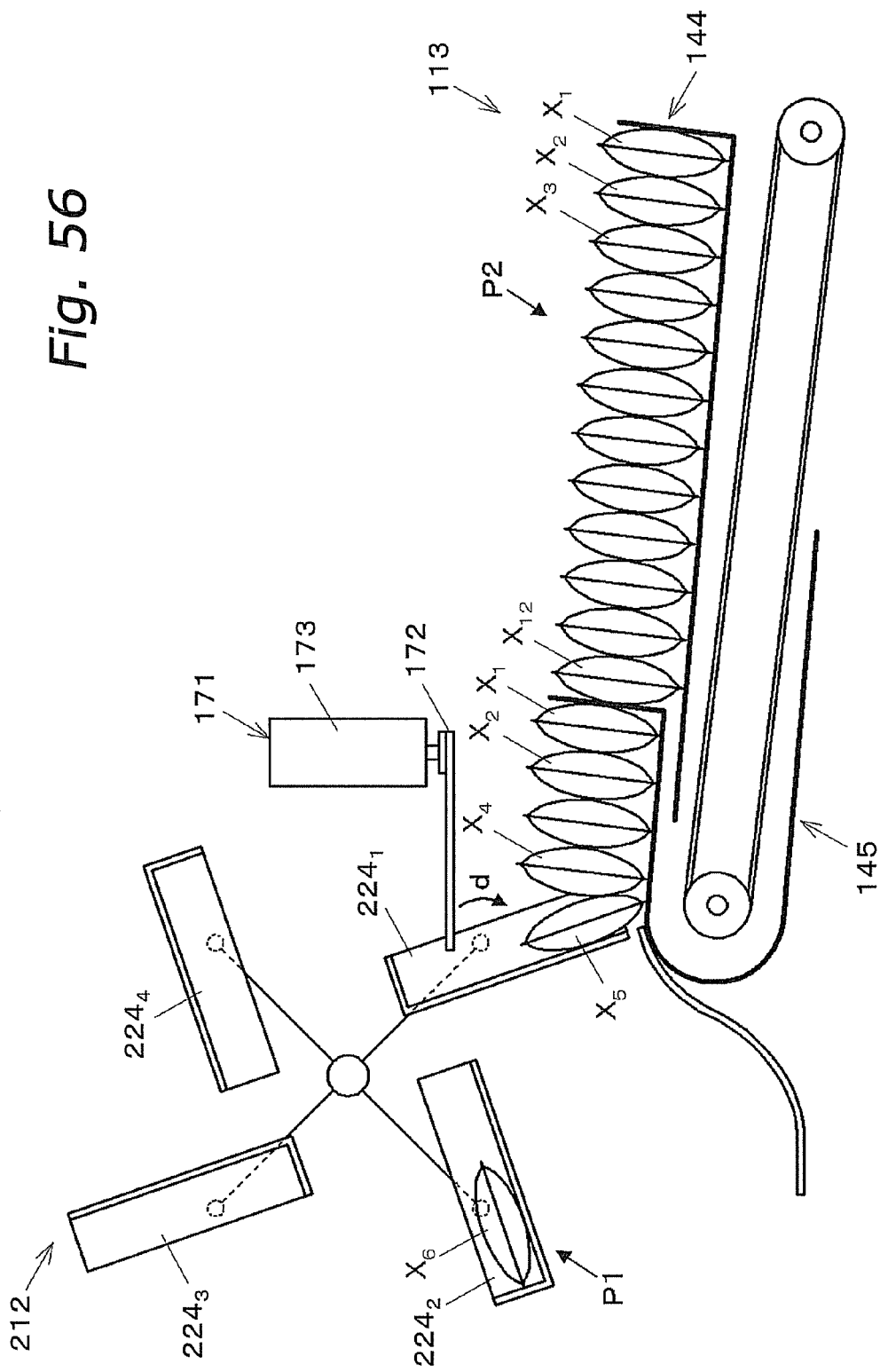
FIG. 56 is a schematic lateral view which describes an accumulation operation, showing a state in which a new article is received by the delivery table.

In addition, as shown in FIG. 56, a rotation shaft 123 of the delivery table 124 is located inwardly from the front side end portion of the delivery table 124 in the receiving position. Consequently, when the delivery table 124 that received the article X rotates, the length of rotation is shortened compared to the conventional case where the rotation support point is located at the front side end portion of the delivery table 124, so that a small driving force will suffice the purpose, and the rotation of the present apparatus will be faster when the driving force is the same between the conventional and present apparatus, which further results in acceleration of the accumulation process.

In addition, the conveying surface of the carry-in conveyor 111 on the article supply side and the loading surface 124a, which is the receiving surface of the delivery table 124 on the article receiving side, substantially coincide with each other and are inclined by the angle α1, so that the delivery and receiving of the articles between the carry-in conveyor 111 and the delivery table 124 will be smoothly conducted. Therefore, the article X will be supplied onto delivery table 124 in a stable manner. As a result, the positions of the articles X . . . X in the buckets 144, 145 will be aligned and therefore the downstream discharge process will be smoothly conducted.

Incidentally, in the case of packaged article X that is inflated in the center, when delivery device 112 receives such articles X, moves the same to the standing position, and delivers the same to the buckets 144, 145 while orderly placing the same from front to back in the buckets 144, 145, the height of the article X delivered to the buckets 144, 145 may vary in each article X along with the variation in the positions of the articles on the delivery table 124, or the article X sandwiched between the articles front and back may be pushed up, causing a disturbance of the positions of the articles X . . . X in the buckets 144, 145. Therefore, the downstream discharge process may not be smoothly conducted. Even in such a case, the above-described problem is reliably eliminated, since this embodiment of the present invention is provided with the upper guide mechanism 171 for aligning an upper portion of the article X in a standing portion.

Further, before the article X is delivered, the air cylinder 173, which is the drive unit of the upper guide mechanism 171, operates so as to move the pushing member 172 up in synchronization with the delivery of the article X from the delivery device 112 to the buckets 144, 145, so that the pushing member 172 will be moved to a position that does not disturb the delivery of the articles X. After the article X is delivered, the air cylinder 173 operates so as to move the pushing member 172 down, so that the pushing member 172 will be caused to push the articles X from above. Consequently, it will be possible to prevent interference between the pushing member 172 and the delivery table 124, which may occur when the pushing member 172 is fixedly provided, or interference between the pushing member 172 and articles X whose height vary and which are delivered to the buckets 144, 145 and therefore a smooth delivery of the articles will be achieved.

The rearmost end of the article among the articles X . . . X held in the accumulation state by the buckets 144, 145 is held by the partition member 151 that serves as a rear end holding member. Consequently, even an article that is specially flat and difficult to stand on its own will stably maintain its position while being conveyed. Further, since the partition member 151 and the delivery table 124 will not interfere with each other, the partition member 151 and the delivery table 124 can be operated in an intersecting manner, which will enable acceleration of the accumulation process.

Further, being constructed as described above, the conveying surface of the conveying unit, i.e., the conveying surface formed by the buckets 144, 145 coupled to the flat belts 143, 143, is inclined in the width direction, so that the article X moved to the standing position via the delivery device 112 and delivered to the buckets 144, 145 transferred by the flat belts 143, 143 will move to the side that is lower, due to inclination, and a lateral portion of the article X will come into contact with the side guide member 161. As a result, the position of a lateral portion of each article X will be aligned in the buckets 144, 145. In other words, the articles X will be conveyed in a stable manner without a disturbance in the arrangement thereof and therefore the downstream discharge process will be smoothly conducted.

Incidentally, usually, the buckets 144, 145 are provided with a front end holding member and a rear end holding member for holding accumulated articles X . . . X from front and back. However, in the present embodiment, the conveying surface of the conveying unit, i.e., the conveying surface formed by the buckets 144, 145 coupled to the flat belts 143, 143 is inclined downwardly in the downstream direction. Consequently, the article X held in the standing position by the buckets 144, 145 will be in a forwardly inclined position and a front portion of the article X will be held by a partition member 151 as the front end holding member, so that the rear end holding member can be omitted.

The accumulation and conveyance apparatus 113 is provided with a pair of flat belts 143, 143 and a pair of buckets 144, 145, however, additional flat belts and buckets may be provided.

Note that the present invention is not limited to the embodiments described in detail above, and various modifications and variations can be made which fall within the spirit and scope of the invention. For example, the inclination angles α1, β, and γ are not specified with a specific number. However, the angle is set within a range in which the conveyance and delivery of the article X can be performed in a stable manner. In particular, the angles β, γ may be zero degrees.

In addition, in the above described embodiment, the side guide member 161 is in a plate shape. However, the side guide member 161 may be in a bar shape. Further, instead of the above described components, a round belt type conveyor or a flat belt type conveyor may be used. In such a case, the articles will be further smoothly conveyed in a direction of the discharging point P2.

In addition, the accumulation and conveyance apparatus 113 is provided with the pair of flat belts 143, 143 and the pair of buckets 144, 145. However, additional flat belts and the buckets may be provided.

Note that as the delivery device related to the present invention, it is possible to adopt a delivery table that receives the article X supplied from the upstream side and rotates in a direction of the standing position but does not move forward.

Tenth Embodiment

Yet another embodiment to carry out the present invention will be described.

Figure 54:
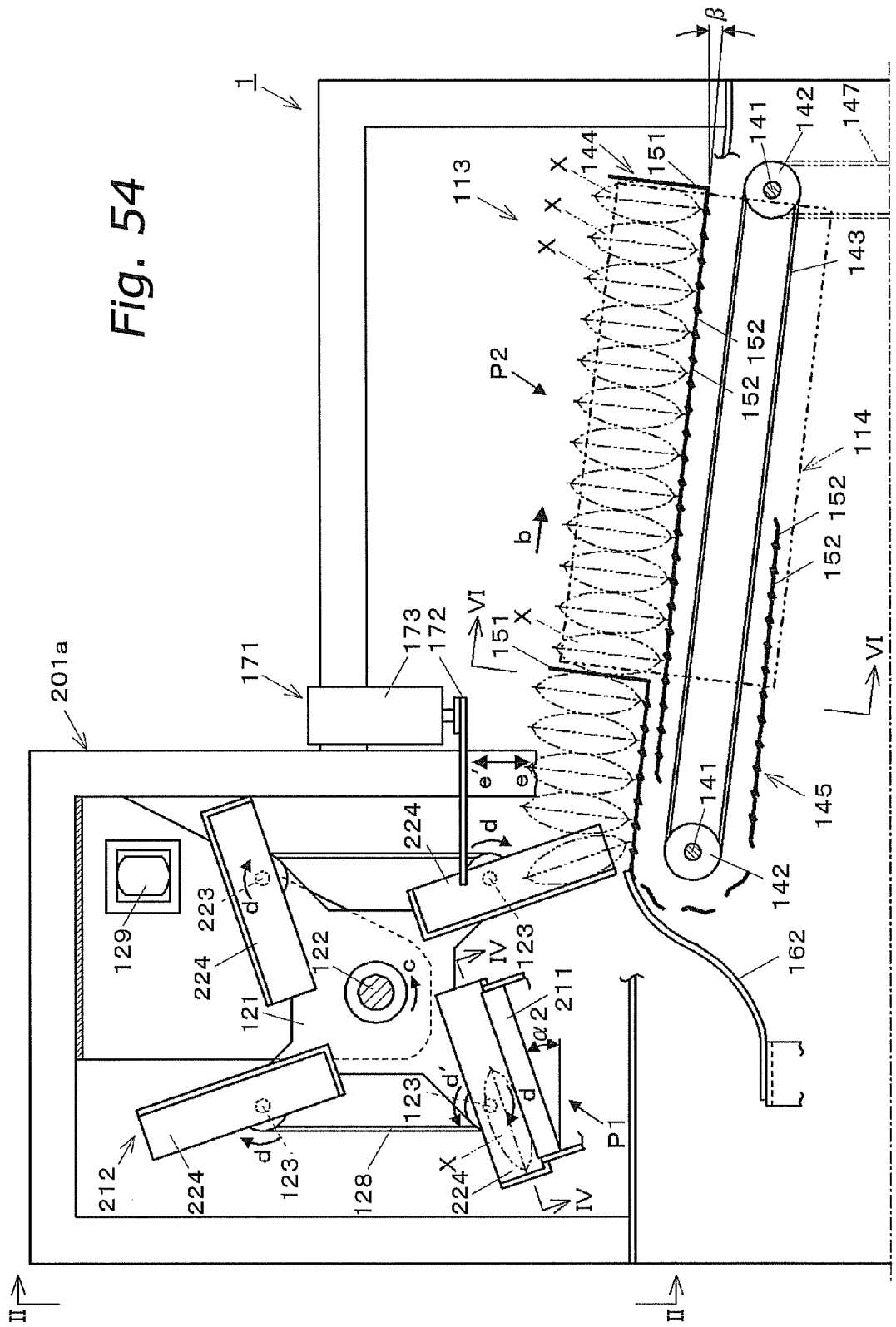
FIG. 54 is a lateral view of a conveyance apparatus according to a tenth embodiment of the present invention.

As shown in FIG. 54, a conveyance apparatus 201 of this embodiment is different from the above described conveyance apparatus 101 of the above described embodiment 9, in that the position of a delivery table 224 at the receiving point P1 is inclined in the opposite rotation direction. However, as for other aspects, the structure of the conveyance apparatus 201 is substantially the same as in the conveyance apparatus 101. Therefore, components having the same functions as described before are denoted by the same reference numerals and description thereof is omitted.

As shown in FIG. 54, the conveyance apparatus 201 is configured to convey a relatively flat packaged article X, such as snack foods and the like. The conveyance apparatus 201 comprises the following components from the upstream side in the following order: a carry-in conveyor 211 that carries in the article X to the receiving point P1 as shown by the arrow "a"; a delivery device 212 that receives the article X from the carry-in conveyor 211 and delivers the same to the downstream side; the accumulation and conveyance apparatus 113 that conveys the articles X . . . X in the accumulation state, which are delivered from the delivery device 212, to the discharging point P2 as shown by the arrow "b"; and the discharge device 114 that discharges a batch of articles X . . . X conveyed to the discharging point P2.

The carry-in conveyor 211 is a flat belt type conveyor, and the conveying surface of the carry-in conveyor 211 is inclined such that the conveying surface substantially coincides with the receiving position of the delivery table 224 of the delivery device 212, which will be described below. In other words, the conveying surface is inclined by the angle $\alpha 2$ so as to be lower toward the side opposite to the side of the accumulation and conveyance apparatus 113.

The delivery device 212 receives the articles X one by one at the receiving point P1 from the carry-in conveyor 211 and moves the article to the standing position. Also, the delivery device 212 delivers the articles X to the accumulation and conveyance apparatus 113 at the downstream side while orderly placing the articles X from front to back on the accumulation and conveyance apparatus 113.

The delivery table 224 moves the article X to the standing position by rotating in a direction of the standing position as shown by the arrow "d", and also delivers the article X to the accumulation and conveyance apparatus 113 by moving forward. In this case, the delivery table 224 is configured such that the receiving position is slightly inclined in an opposite rotation direction "d" from the horizontal position, and in the figure, the delivery table 224 is inclined by the angle $\alpha 2$ in an opposite rotation direction "d" from the horizontal position. A rotation shaft 123, which is a rotation support point of the delivery table 224, is located inwardly from the front side end portion of the delivery table 224 in the receiving position.

Figure 55:
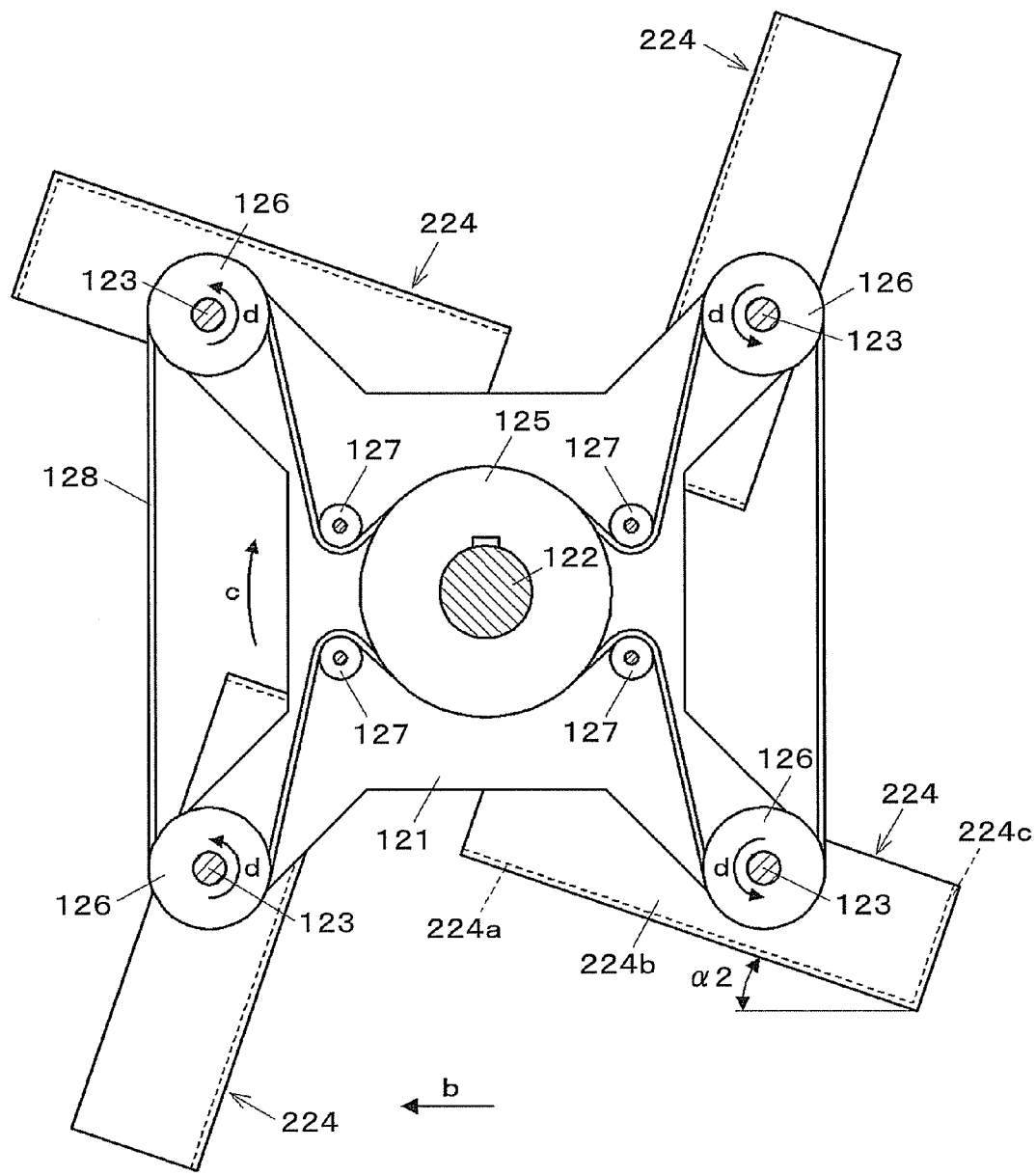
FIG. 55 is an enlarged view of FIG. 54, showing the rotation structure of the delivery table.

As shown in FIG. 55, the delivery table 24, which is configured to receive the article X supplied in the arrow "a" direction and delivers the same in the arrow "b" direction intersecting the direction "a" in which the article X is supplied, includes the loading surface 24a, and the mounting wall 24b and the jump-out prevention wall 24c which extend vertically from the loading surface 24a. The loading surface 24a is a flat surface on which the article X to be supplied is loaded, and is formed in a comb shape such that the loading surface 24a and the accumulation and conveyance apparatus 113 described below can intersect with each other. The mounting wall 24b is a portion to be coupled to the rotation shaft 23. The jump-out prevention wall 24c is located at the lower side of the delivery table 224 due to inclination in the receiving position, which is inclined by the angle $\alpha 2$ in an opposite rotation direction "d" as shown in the figure. The jump-out prevention wall 24c is a portion that prevents the received article X from moving.

Next, the operation of the conveyance apparatus 201 will be described. Note that the series of the operation described below is provided for purposes of example, and it is not necessarily limited to the described order.

As shown in FIG. 54 and the like, when a relatively flat packaged article X is supplied from the carry-in conveyor 211 on the upstream side, whose conveying surface is inclined by the angle $\alpha 2$ in the widthwise direction, the delivery table 224 of the delivery device 212, which is inclined by the above described angle $\alpha 2$ in the opposite rotation direction "d" from the horizontal position at the receiving point P1, receives the articles X one by one, moves the same to the standing position, and delivers the same to the bucket 144 of the accumulation and conveyance apparatus 113 on the downstream side.

Below, the accumulation operation will be described based on FIGS. 56 to 59. In order to avoid complication of the drawing and to clarify the operation of the delivery device 212 and the accumulation and conveyance apparatus 113, the inclination of the conveying surface of the accumulation and conveyance apparatus 113 in the width direction is ignored, and the description of the buckets 144, 145 is simplified. In addition, specific reference numerals are given as needed to each delivery table 224 and each article X in order to clearly show the movement of the delivery table 224.

First, as shown in FIG. 56, for example, the preceding bucket 144 in the accumulation and conveyance apparatus 113 already hold the predetermined twelve articles $X_1$ to $X_{12}$ in the standing position; the bucket 144 has almost reached the discharging point P2; and the following bucket 145 holds the five articles $X_1$ to $X_5$ in the standing position. The preceding delivery table $224_1$ on the delivery device 212 rotates in the arrow "d" direction and further moves the article $X_5$ at the rearmost end to the standing position. At the receiving point P1, a new article $X_6$ is supplied to the following delivery table $224_2$. Remaining delivery tables $224_3$, $224_4$ are in a positional relationship as shown in the figure. The air cylinder 173 of the upper guide mechanism 171 moves the pushing member 172 up so that the pushing member 172 will be moved to a position that does not disturb the delivery of the articles X.

Figure 57:
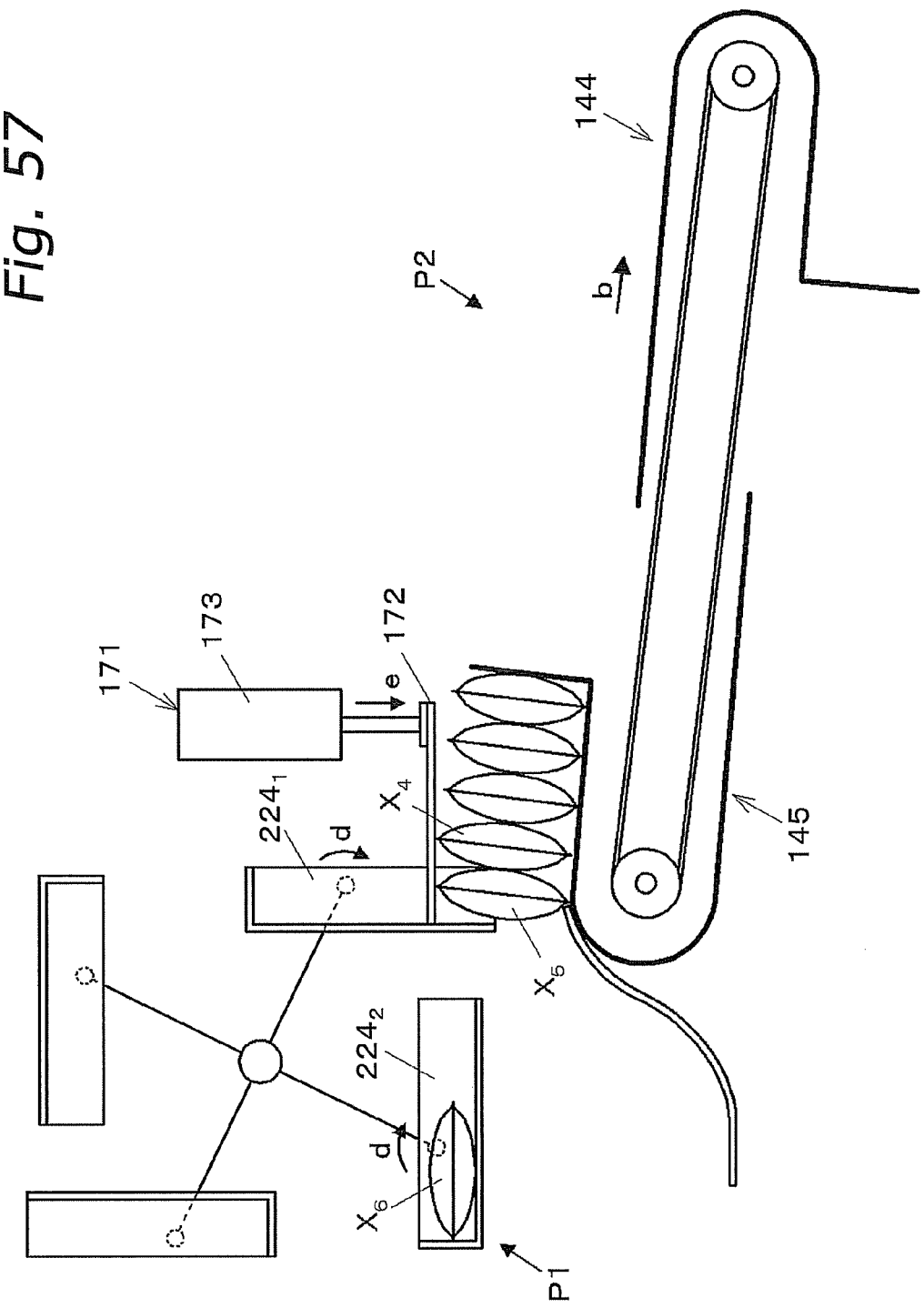
FIG. 57 is a schematic lateral view which describes the accumulation operation, showing a state in which the delivery table is moved to a substantially horizontal position.

Next, as shown in FIG. 57, due to the driving of the pusher device 181 of the discharge device 114 that moves in synchronization with the buckets 144, 145, the article $X_1$ to $X_{12}$ held in the bucket 144 are discharged all together to the discharge guide device 191 while moving. The empty bucket 144 leaves the discharging point P2 as shown by the arrow "b", and moves to reach the upstream side of the following bucket 145.

In addition, the article $X_5$ delivered from the preceding delivery table $224_1$ to the bucket 145 is moved further to the standing position by the delivery table 224, that rotates in the arrow "d" direction. On the other hand, the following delivery table $224_2$ near the receiving point P1 rotates in the arrow "d" direction while holding the article $X_6$, and is moved to a substantially horizontal position.

In such a case, the conveying surface of the bucket 145 is inclined by the angle $\gamma$ in the widthwise direction, so that the article $X_5$ delivered to the bucket 145 will move to the side that is lower due to the inclination, and the movement thereof be controlled by the side guide member 61 located on the lower side.

In addition, as shown in FIG. 54, the conveying surface of the bucket 145 is inclined by the angle $\beta$ downward in the downstream direction, so that the article $X_5$ delivered to the bucket 145 will lean forward and therefore will be held in a packed manner in a direction of inclination.

In addition, the pushing member 172 moves down as shown by the arrow "e" due to the operation of the air cylinder 173 of the upper guide mechanism 171, and pushes the upper end portion of the article $X_5$ or the adjacent article $X_4$ and the like.

Figure 58:
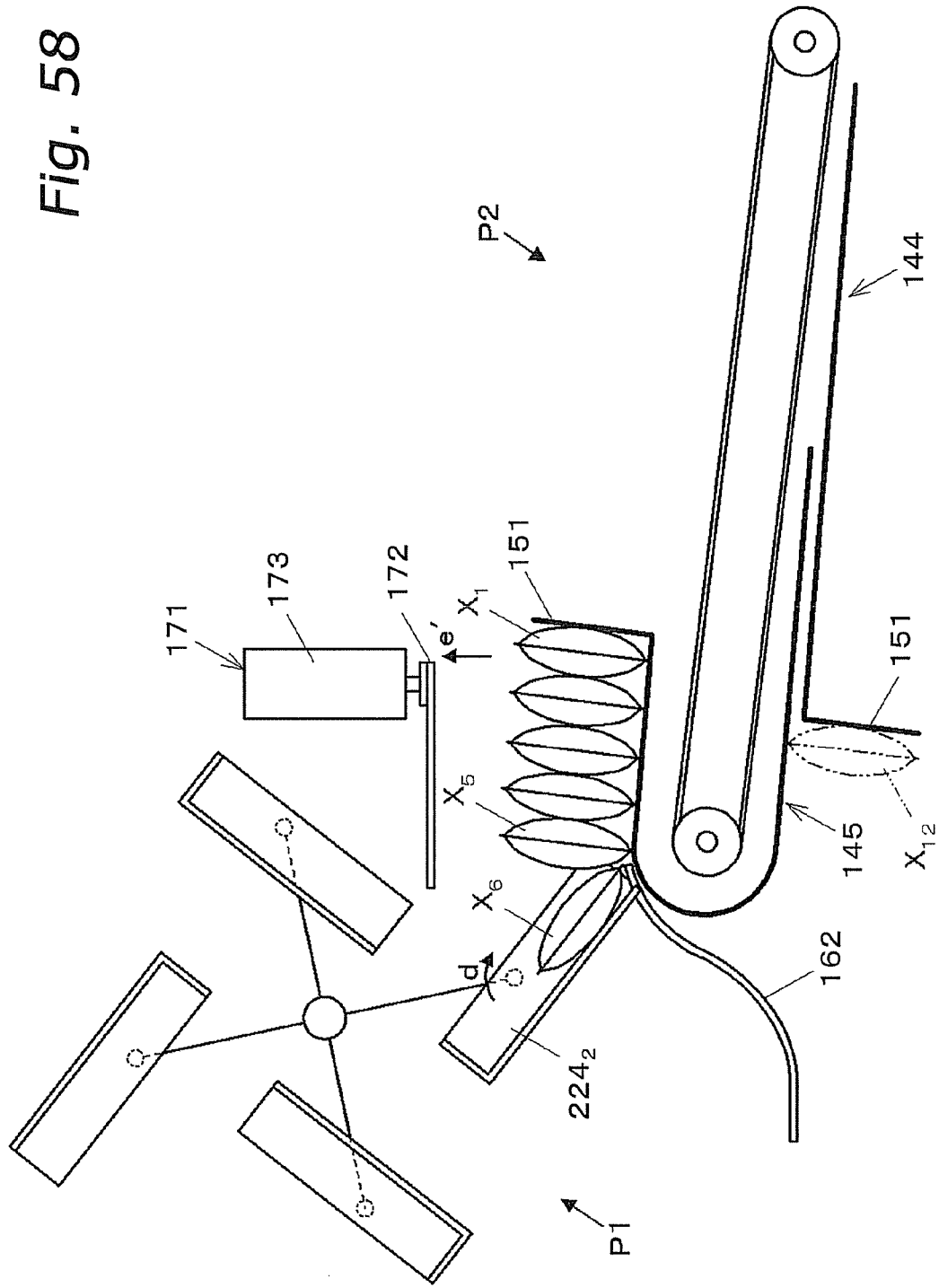
FIG. 58 is a schematic lateral view which describes the accumulation operation, showing a state in which the delivery table is about to deliver an article to the bucket via the lower guide member.

Next, as shown in FIG. 58, the delivery table $224_2$ holding the article $X_6$ away from the receiving point P1 moves closer to the bucket 145 while rotating in the arrow "d" direction, and the article $X_6$ slides down the inclined delivery table $224_2$ and lands on the lower guide member 162. At this time, the delivery table $224_2$ formed so as not to interfere with the lower guide member 162 intersects with the lower guide member 162.

In addition, the empty bucket 144 that left the discharging point P2 overlaps, in a predetermined range, with the upstream side of the bucket 145 in the process of receiving the article X, and a space for holding the predetermined twelve articles $X_1$ to $X_{12}$ is defined by the partition members 151, 151 of the both buckets 144, 145. Note that the both buckets 144, 145 synchronize with each other and move after overlapping with each other. Further, by the operation of the air cylinder 173 of the upper guide mechanism 171, the pushing member 172 that was pushing the upper end portions of the article $X_5$ and the like will move up as shown in the arrow "e".

Figure 59:
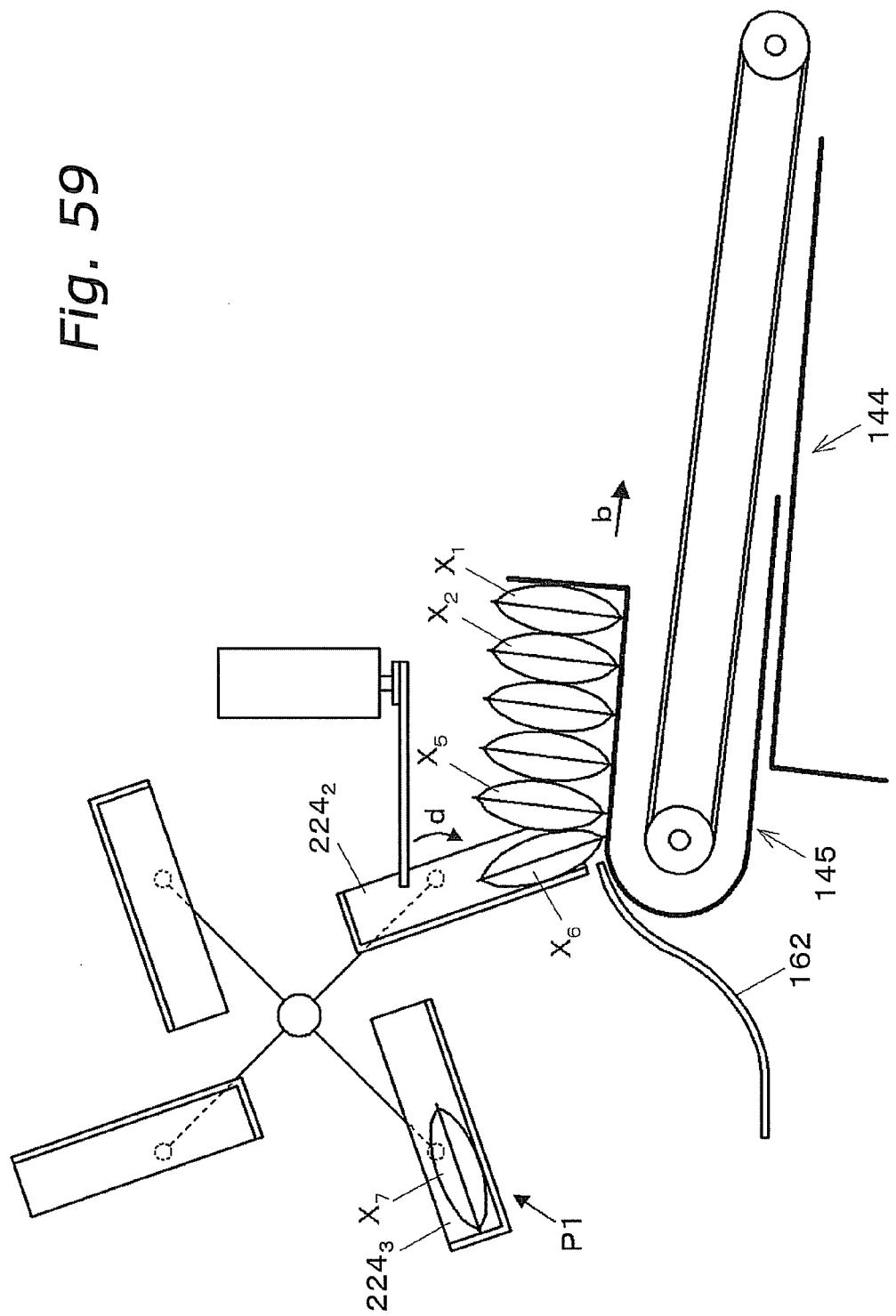
FIG. 59 is a schematic lateral view which describes the accumulation operation, showing a state in which the delivery table is about to deliver the article to the bucket, and a new article is received by the next delivery table.

Next, as shown in FIG. 59, the both buckets 144, 145 synchronize with each other and move in the arrow "b" direction by a distance of one article. The delivery table $224_2$ rotates further in the arrow "d" direction, delivers the article $X_6$ from the lower guide member 162 to the bucket 145, and also, moves the article $X_6$ in the standing position close to the back of the articles $X_1$ to $X_5$ in the bucket 145. Meanwhile, the following delivery table $224_3$ reaches the receiving point P1 and is moved to the predetermined receiving position. A new article $X_7$ is being supplied to the delivery table $224_3$.

In this way, the delivery device 212 is provided with the four delivery tables $224_1$ to $224_4$, and these delivery tables $224_1$ to $224_4$ can receive the article X from the upstream side, each taking turns. As a result, the accumulation of the articles X at the receiving point P1 will be accelerated.

Being constructed as described above, when receiving the article X, the delivery table 224 is in a position slightly inclined in an opposite rotation direction "d" from the horizontal position, so that the article X received will move in an inclined direction on the delivery table 224, and the movement will be controlled by the jump-out prevention wall 224c. Therefore, the position of the article X can be determined at the receiving point P1, which as a result will achieve a conveyance apparatus 201 in which the accumulation position of the articles will not be disturbed.

The conveying surface of the carry-in conveyor 211 on the article supply side is inclined so as to substantially coincide with the receiving surface of the delivery table 224 on the article receiving side, so that the delivery and receiving of the articles between the carry-in conveyor 211 and the delivery table 224 will be smoothly conducted. Further, the position of the article X is inclined before the article X moves to the delivery table 224, so that the effect of the inclination of the above-described delivery table 224 will be further facilitated.

Note that the present invention is not limited to the embodiments described in detail above, and various modifications and variations can be made which fall within the spirit and scope of the invention. For example, the inclination angle α2 is not specified with a specific number. However, the angle is set within a range in which the conveyance and delivery of the article X can be performed in a stable manner.

Other Embodiments (1)

The above described embodiment will be described using an example in which the delivery tables 24, 124 and the like receive the article X conveyed from the carry-in conveyors 2, 111, and the like disposed on the upstream side, without changing the position of the article X, and then move the article to the standing position after receiving the article X. However, the present invention is not limited to the above mentioned example.

Figure 60:
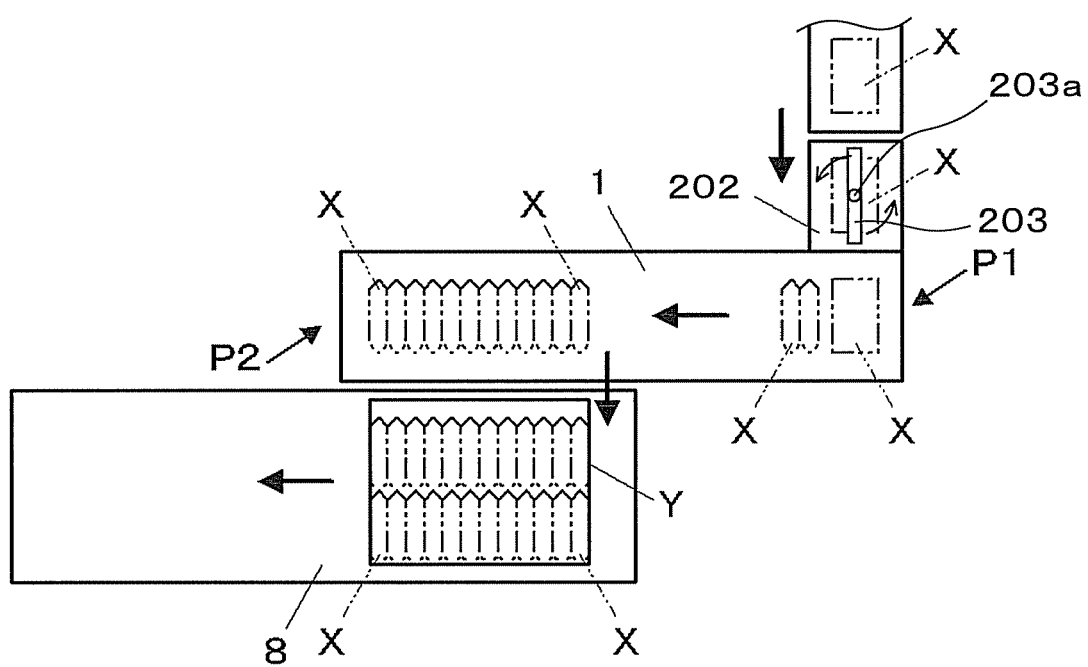
FIG. 60 is a plan view of a structure of a conveyance apparatus according to another embodiment of the present invention.
Figure 61:
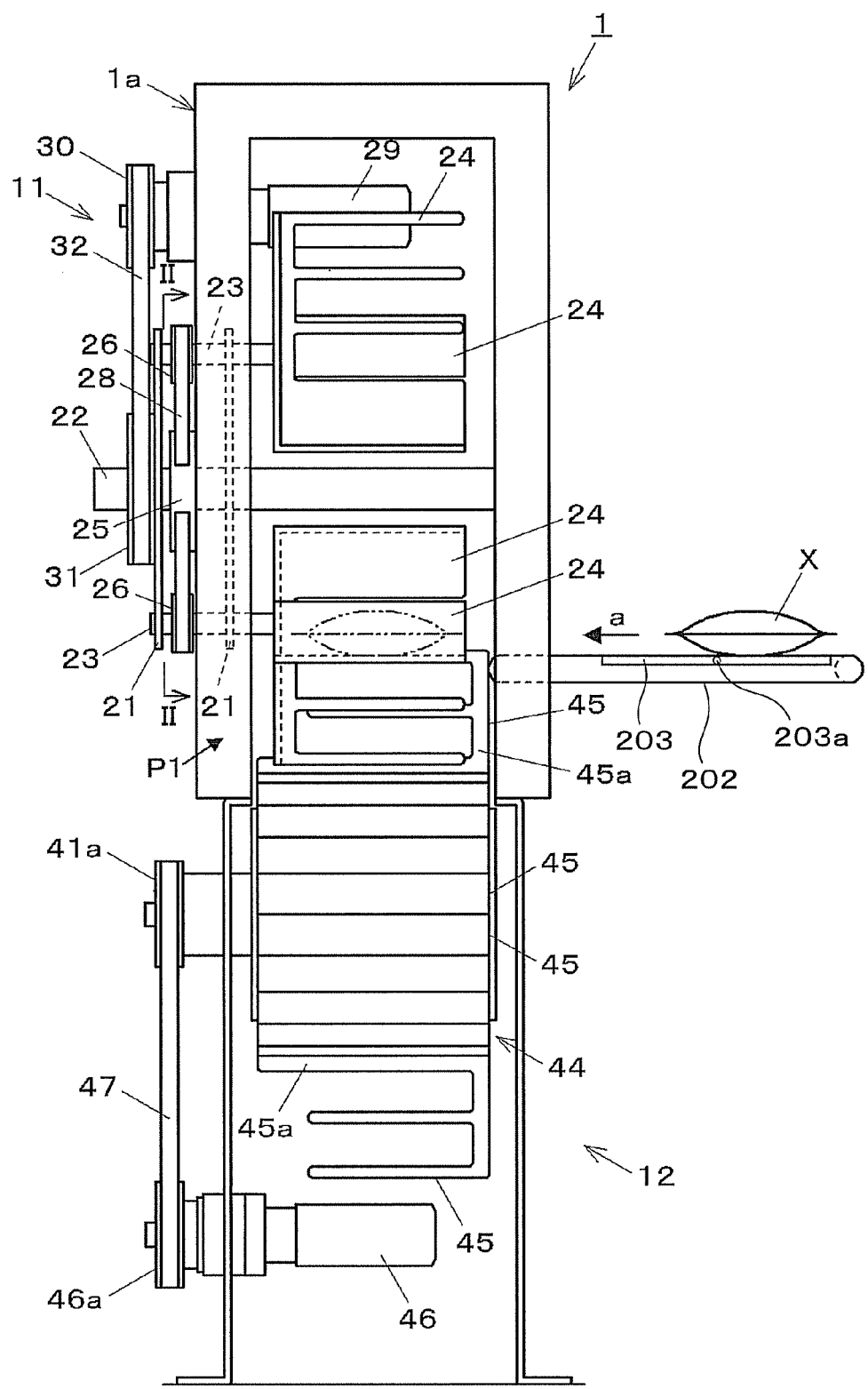
FIG. 61 is a lateral view of the structure of the conveyance apparatus of FIG. 60.
Figure 62:
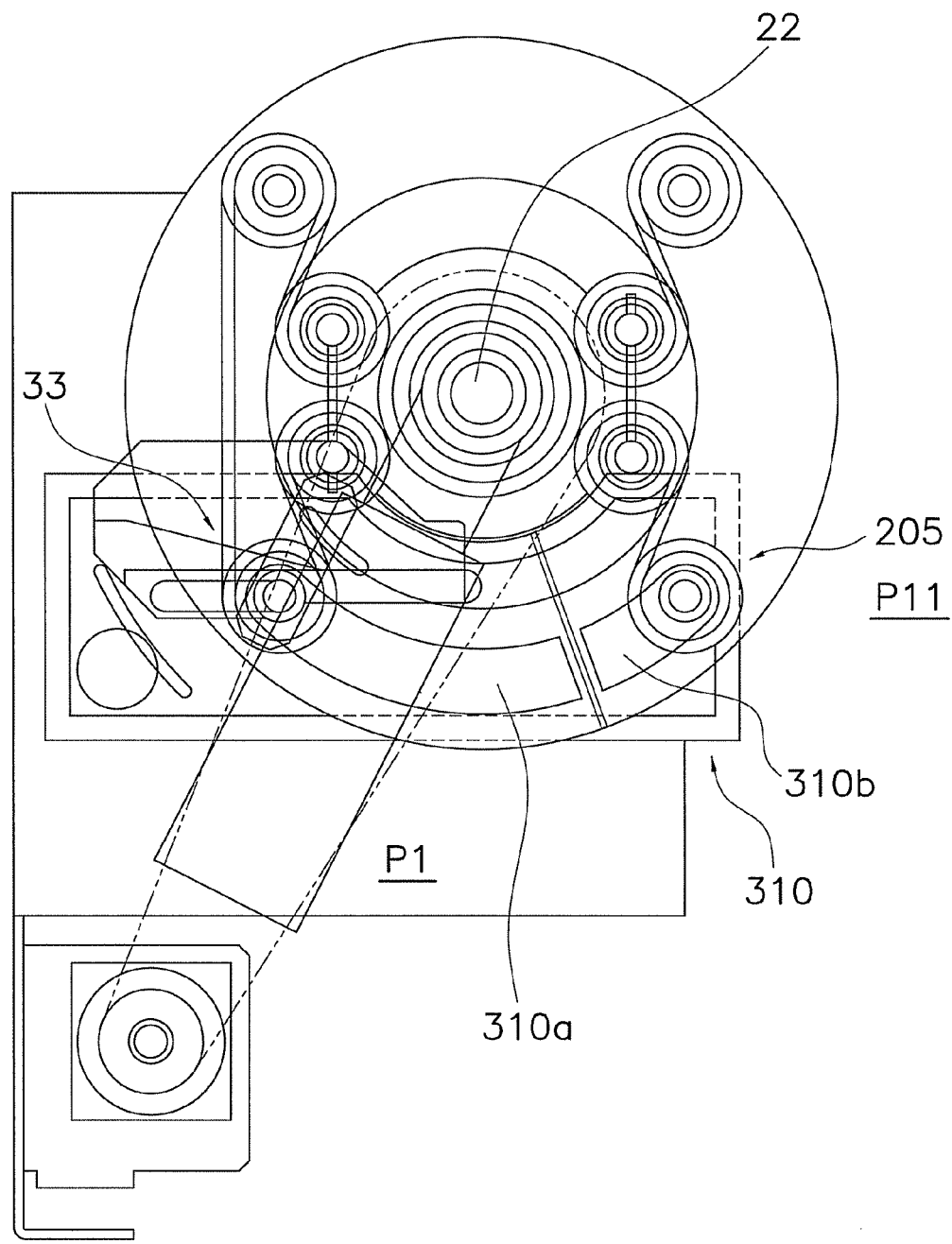
FIG. 62 is an plan view of the structure near a delivery table included in a conveyance apparatus according to yet another embodiment of the present invention.
Figure 63:
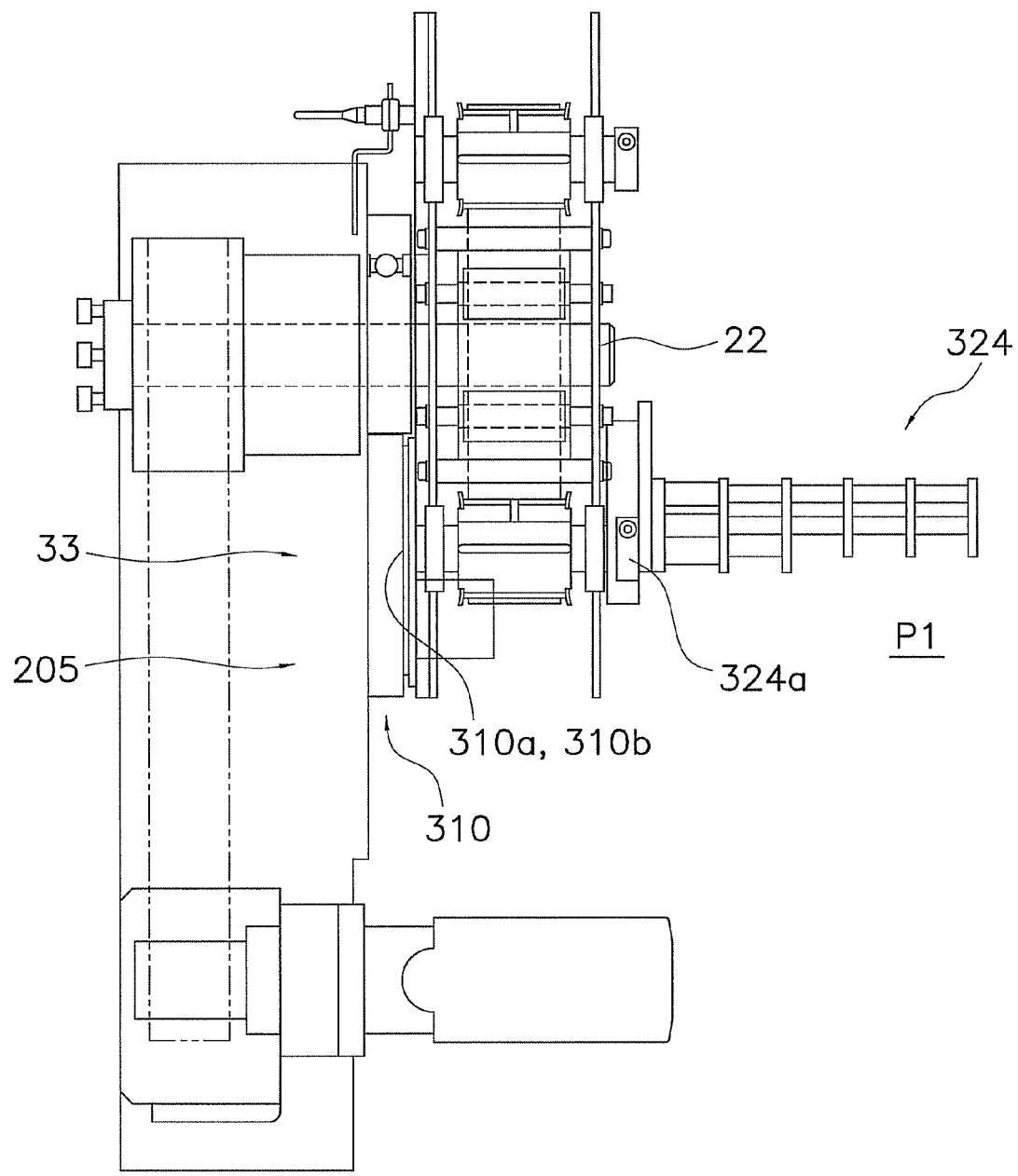
FIG. 63 is a lateral view of the structure around the delivery table of FIG. 61.
Figure 64A:
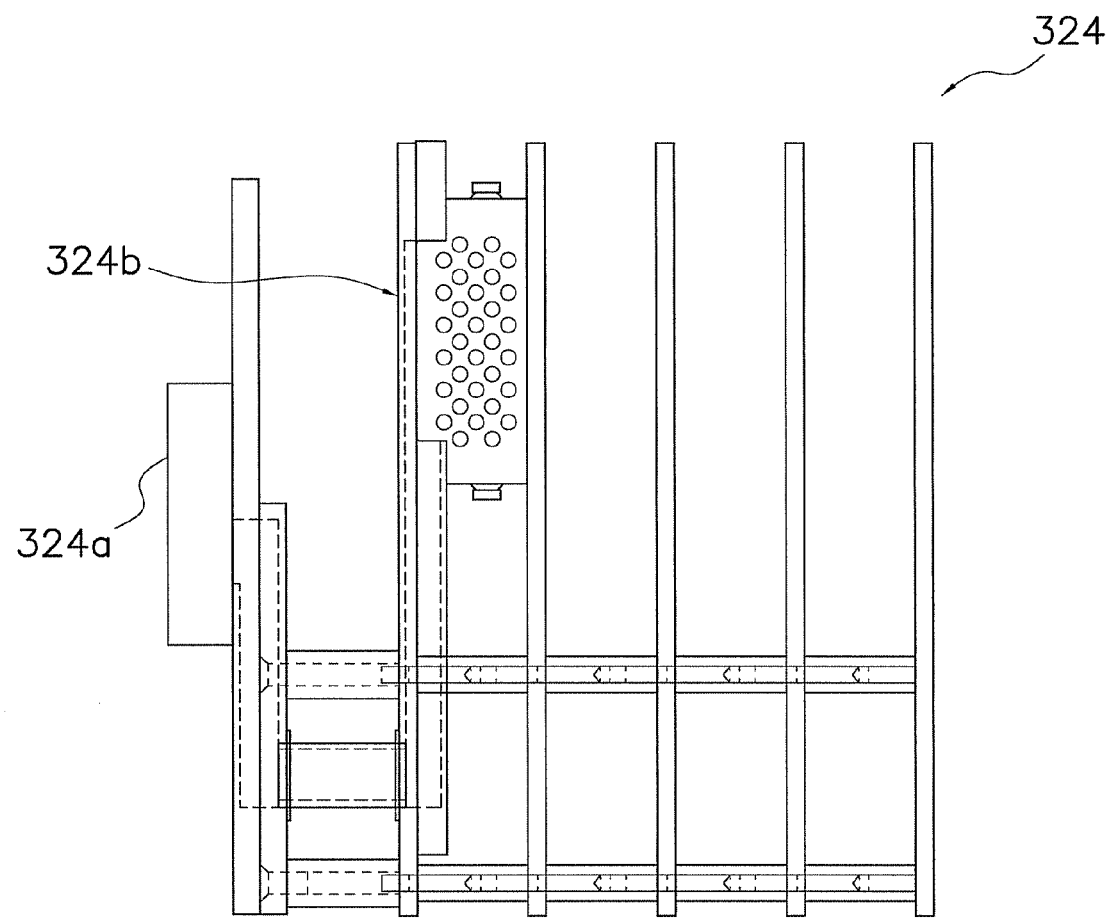
FIGS. 64A and 64B are enlarged views of the structures of the delivery table of FIGS. 62 and 63, respectively.
Figure 64B:
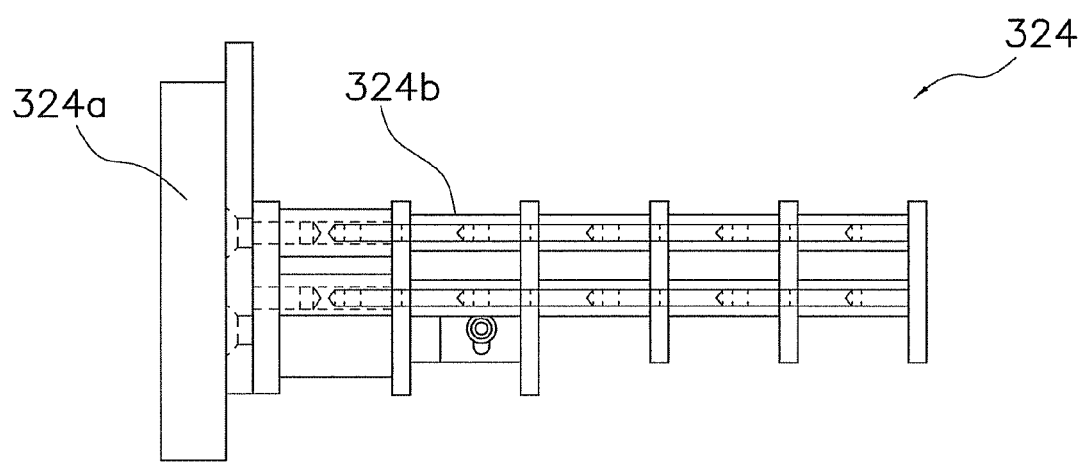

For example, as shown in FIGS. 60 and 61, a direction switching unit 203 that rotates the orientation of the article X conveyed by 90 degrees may be provided in the carry-in conveyor 202 that conveys the article X to the delivery table 24.

The direction switching unit 203 is disposed on the conveying surface of the carry-in conveyor 202, and changes the orientation of the article X, by rotating about a rotation shaft 203a.

In this case, the orientation of the article X can be changed before the article X is moved to the standing position by the delivery table 24 and the like, and therefore the standing position of the article X can be easily changed.

As a result, it will be possible to provide a conveyance apparatus capable of handling various accumulation patterns by increasing the types of accumulation patterns in the accumulation and conveyance apparatus 12.

(2)

The above described embodiment will be described using an example in which the suction mechanism 33 and the like are used to convey the article X received on the delivery table 24 to the accumulation and conveyance apparatus 12 by holding the article X by suction. However, the present invention is not limited to the embodiment described above.

For example, as shown in FIGS. 62 to 64B, it is possible to employ a construction in which a chamber 310 connected to each of the suction mechanism 33 and an air jet (blowout portion) 205 is provided with openings 310a, 310b formed therein along the movement path of a delivery table 324 from the receiving point P1 to the discharging point P11 so that negative pressure and positive pressure will be applied to an opening 324a of the delivery table 324 along with the movement of the delivery table 324.

In this case, by using the opening 310a formed in the chamber 310 as the sucking and holding area, and by using the opening 310b as the delivery area, the suction mechanism 33 will be able to hold the article X by suction on a loading surface 324b from the receiving point P1 where the article X was received to slightly upstream of a discharging point P11. On the other hand, when the delivery table 324 moves closer to the discharging point P11, air from the air jet 205 will blow into the opening 324a of the delivery table 324, which will release the article X from being held by suction on the loading surface 324b of the delivery table 324. As a result, it will be possible to smoothly deliver the article X to the accumulation and conveyance apparatus 12 at the discharging point P11.

As a result, the timing can be switched between holding the article X on the delivery table 324 by suction and discharging the article X, which enables the article X to be smoothly delivered to the downstream, compared to conventional cases.

As described above, the present invention provides a conveyance apparatus capable of accelerating the accumulation process when conveying a plurality of relatively flat articles received at a receiving point to a discharging point while holding the articles in a state of being accumulated in the standing position in a front-to-back direction. In other words, the present invention relates a conveyance apparatus configured to receive relatively flat articles at the receiving point and deliver the articles in the standing position to the discharging point after accumulating a predetermined number of the articles. The present invention is broadly applicable to the technical field of conveying articles.

The term "configured" as used herein to describe a component, section or part of a device includes hardware and/or software that is constructed and/or programmed to carry out the desired function.

Moreover, terms that are expressed as "means-plus function" in the specification and claims should be interpreted to include any structure that can be utilized to carry out the function of that part of the present invention.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A conveyance apparatus, comprising:
    a holding unit configured to hold a plurality of articles received at a predetermined receiving point, the holding unit including a front end holding member arranges on the front end portion thereof, the front end holding member being configured to hold articles at the front end thereof;
    a conveying unit configured to transfer the holding unit from the receiving point through a discharging point; and
    a delivery unit configured to deliver externally supplied articles to the holding unit at the receiving point, the delivery unit comprising one or more delivery tables configured to sequentially receive the articles at a predetermined receiving position, rotate to a standing position in order to place the articles in a standing position, and deliver the articles to the holding unit; and a drive unit configured to rotate and move the one or more delivery tables forward in synchronization with the movement of the holding unit;
    wherein a rotation support point of each delivery table is arranged above a lower end portion of each delivery table when in the standing position.

2. The conveyance apparatus according to claim 1, wherein the drive unit is configured to rotate the one or more delivery tables, and move the one or more delivery tables forward with a single drive source.

3. The conveyance apparatus according to claim 1, wherein the rotation support point is arranged substantially in the center of each delivery table.

4. The conveyance apparatus according to claim 1, wherein the rotation support point is located closer to the lower end portion of each delivery table when in the standing position.

5. The conveyance apparatus according to claim 1, wherein the rotation support point is located closer to an upper end portion of each delivery table when in the standing position.

6. The conveyance apparatus according to claim 1, wherein
    the conveyance apparatus is configured such that the direction in which the articles are supplied to the delivery unit coincides with the direction in which the articles are delivered from the delivery unit to the holding unit; and
    the conveyance apparatus further comprises a movement control wall arranged at a forward end portion of each delivery table, the movement control wall configured to prevent the articles from moving forward on each delivery table.

7. The conveyance apparatus according to claim 1, wherein
    the conveyance apparatus is configured such that the direction in which the articles are supplied to the delivery unit intersects with the direction in which the articles are delivered from the delivery unit to the holding unit; and
    the conveyance apparatus further comprises a jump-out prevention wall arranged on a rear end portion of each delivery table, the jump-out prevention wall configured to prevent the articles from jumping out of each delivery table.

8. The conveyance apparatus according to claim 1, further comprising a carry-in unit configured to deliver the articles to the receiving position of each delivery table; wherein the delivery unit comprises a direction switching unit configured to change the orientation of the articles before the articles are conveyed to the receiving position of each delivery table.

9. The conveyance apparatus according to claim 1, wherein the holding unit comprises a plurality of individual holding members configured to individually hold the articles, the individual holding members arranged at intervals that are substantially equal to the thickness of each article, and configured so as to not interfere with each delivery table when delivering an article to the holding unit.

10. The conveyance apparatus according to claim 1, wherein
    a receiving surface of each delivery table on which an article is received comprises an open portion; and
    the conveyance apparatus further comprises a suction unit configured to hold an article received on the receiving surface by means of suction via the opening portion.

11. The conveyance apparatus according to claim 10, wherein
    the suction unit comprises a suction source and a suction chamber connected to the suction source;
    the suction chamber is arranged below each delivery table at the receiving point such that the suction chamber does not interfere with the movement of each delivery table; and
    the suction chamber comprises a suction port that faces the opening portion in the receiving surface of each delivery table.

12. The conveyance apparatus according to claim 11, wherein
    the suction source generates a constant suction force in the suction chamber.

13. The conveyance apparatus according to claim 11, wherein
the suction port of the suction chamber is arranged on a rear side of the receiving surface of each delivery table in the direction in which an article is supplied thereto.

14. The conveyance apparatus according to claim 11, further comprising a control unit configured to control the timing at which the suction unit applies and releases the suction.

15. The conveyance apparatus according to claim 11, wherein
the suction port extends over substantially the entire surface of the side of the suction chamber facing the underside of each delivery table.

16. The conveyance apparatus according to claim 10, wherein
the suction unit comprises a suction source and a suction chamber connected to the suction source;
the suction chamber is attached to the underside of each delivery table; and
the suction chamber comprises a suction port that faces the open portion in the receiving surface of each delivery table.

17. The conveyance apparatus according to claim 16, wherein
the suction unit further comprises a suction passage that connects the suction source to the suction chamber, and a passage opening and closing mechanism configured to regulate communication between the suction source and the suction chamber.

18. The conveyance apparatus according to claim 16, further comprising a control unit configured to control the timing at which the suction unit applies and releases the suction.

19. The conveyance apparatus according to claim 10, wherein
the receiving surface of each delivery table is formed into a concave shape.

20. A weighing and packaging system configured to weigh and package a material in order to form an article, and pack a predetermined number of accumulated articles into a container, wherein
the weighing and packaging system comprises the conveyance apparatus according to claim 10 configured to receive articles at the receiving point and convey the same to the discharging point for packing.

21. The conveyance apparatus according to claim 10, further comprising a chamber portion in contact with the open portion of each delivery table, and a blowout portion configured to blow out air from the receiving surface of each delivery table via the open portion;
wherein the chamber portion is connected to the suction unit and the blowout portion, and comprises a suction and holding area in communication with the suction unit, and a delivery area in communication with the blowout portion, according to the position of the delivery table.

22. The conveyance apparatus according to claim 21, wherein
the suction and holding area and the delivery area comprise a plurality of openings formed along the direction in which each delivery table moves.

23. The conveyance apparatus according to claim 1, wherein
each delivery table is configured such that the position thereof at which an article is received is slightly inclined from a horizontal position in the rotational direction.

24. The conveyance apparatus according to claim 23, wherein
the rotation support point of each delivery table is located inward from a front end portion of each delivery table in the receiving position.

25. The conveyance apparatus according to claim 23, further comprising a carry-in unit configured to deliver the articles to the receiving position of each delivery table;
wherein a conveying surface of the carry-in unit is inclined so as to substantially coincide with the receiving position of each delivery table.

26. The conveyance apparatus according to claim 23, further comprising a guide mechanism for aligning upper portions of the articles in the standing position to be delivered from the delivery unit to the holding unit;
wherein the guide mechanism comprises a pushing member configured to push the articles from above, and a drive unit configured to move the pushing member up and down; and
the drive unit operates to move the pushing member up in synchronization with the delivery of each article before delivery to the holding unit so that the pushing member will be moved to a position that does not disturb the delivery of each article, and the drive unit operates to move the pushing member down after each article is delivered.

27. The conveyance apparatus according to claim 23, wherein
the holding unit further comprises a rear end holding member arranged on a rear end thereof; and
the rear end holding member is configured so as to not interfere with each delivery table when each delivery table delivers an article to the holding unit.

28. The conveyance apparatus according to claim 23, wherein
the receiving surface of the delivery table is formed in a concave shape.

29. The conveyance apparatus according to claim 1, wherein
the conveying surface of the conveying unit is inclined in the width direction; and
the conveyance apparatus further comprises a guide member arranged on a lower side of the inclined conveying surface, the guide member being configured to contact and guide a lateral portion of the articles held by the holding unit to be conveyed by the conveying unit.

30. The conveyance apparatus according to claim 29, wherein
the conveying surface of the conveying unit is inclined downward in the downstream direction.

31. The conveyance apparatus according to claim 1, wherein
each delivery table is configured such that the receiving position is slightly inclined from a horizontal position in a direction that is opposite the rotational direction, and
a movement control member configured to prevent the received article from moving is arranged on a lower side of the inclined delivery table.

32. The conveyance apparatus according to claim 31, further comprising a carry-in unit configured to deliver the articles to the receiving position of each delivery table;
wherein the conveying surface of the carry-in unit is inclined so as to substantially coincide with the receiving position of each delivery table.

* * * * *